(12) United States Patent
Nakano et al.

(10) Patent No.: US 6,636,802 B1
(45) Date of Patent: Oct. 21, 2003

(54) DATA STRUCTURE OF DIGITAL MAP FILE

(75) Inventors: Nobuyuki Nakano, Toyonaka (JP);
Yasuhiro Ihara, Walled Lake (JP);
Yoshiki Ueyama, Sakai (JP); Akihiro Suzuki, Neyagawa (JP); Hisaya Fukuda, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/856,541

(22) PCT Filed: Nov. 24, 1999

(86) PCT No.: PCT/JP99/06543

§ 371 (c)(1),
(2), (4) Date: May 23, 2001

(87) PCT Pub. No.: WO00/31663

PCT Pub. Date: Jun. 2, 2000

(30) Foreign Application Priority Data

Nov. 24, 1998 (JP) .............................. 10-332412
Jun. 11, 1999 (JP) .......................... 11-165940

(51) Int. Cl.[7] ................................................. G01C 2/30
(52) U.S. Cl. ...................... 701/208; 701/213; 701/209
(58) Field of Search ........................... 701/208, 207, 701/209, 210, 211, 212, 213, 23, 24, 25; 342/357; 340/990, 995, 450, 451, 457

(56) References Cited

U.S. PATENT DOCUMENTS

| 4,847,788 A | 7/1989 | Shimada | 345/634 |
| 4,924,402 A | 5/1990 | Ando et al. | 701/208 |
| 6,430,499 B1 * | 8/2002 | Nakano et al. | 701/208 |

FOREIGN PATENT DOCUMENTS

| EP | 807803 | 11/1997 |
| EP | 875878 | 11/1998 |
| JP | 61-199173 | 9/1986 |
| JP | 63-086074 | 4/1988 |
| JP | 4-263366 | 9/1992 |
| JP | 5-011692 | 1/1993 |
| JP | 7-103775 | 4/1995 |
| JP | 7-154350 | 6/1995 |
| JP | 7-160982 | 6/1995 |
| JP | 7-262493 | 10/1995 |
| JP | 10-49047 | 2/1998 |
| JP | 10-162068 | 6/1998 |
| JP | 10-255022 | 9/1998 |

* cited by examiner

Primary Examiner—William A. Cuchlinski, Jr.
Assistant Examiner—Arthur D. Donnelly
(74) Attorney, Agent, or Firm—Wenderoth, Lind & Ponack, L.L.P.

(57) ABSTRACT

A terminal device for reading a cartographic file in which updating one cartographic file does not require updating cartographic files in the neighboring units. For this purpose, cartographic files which represent respective units extracted by dividing a map into a plurality of areas each comprise node records generated for respective nodes and link records generated for respective links. Given node records contain coordinate information about neighboring nodes which define connections of roads between its unit and a neighboring unit. The cartographic files are stored in a first storage device. The data processing portion executes a process of searching for a route by using the cartographic files. During the route search, the data processing portion traces the connection from a road in one unit to a road in another, neighboring, unit on the basis of the coordinate information about the neighboring nodes of said one unit and said neighboring another unit.

46 Claims, 67 Drawing Sheets

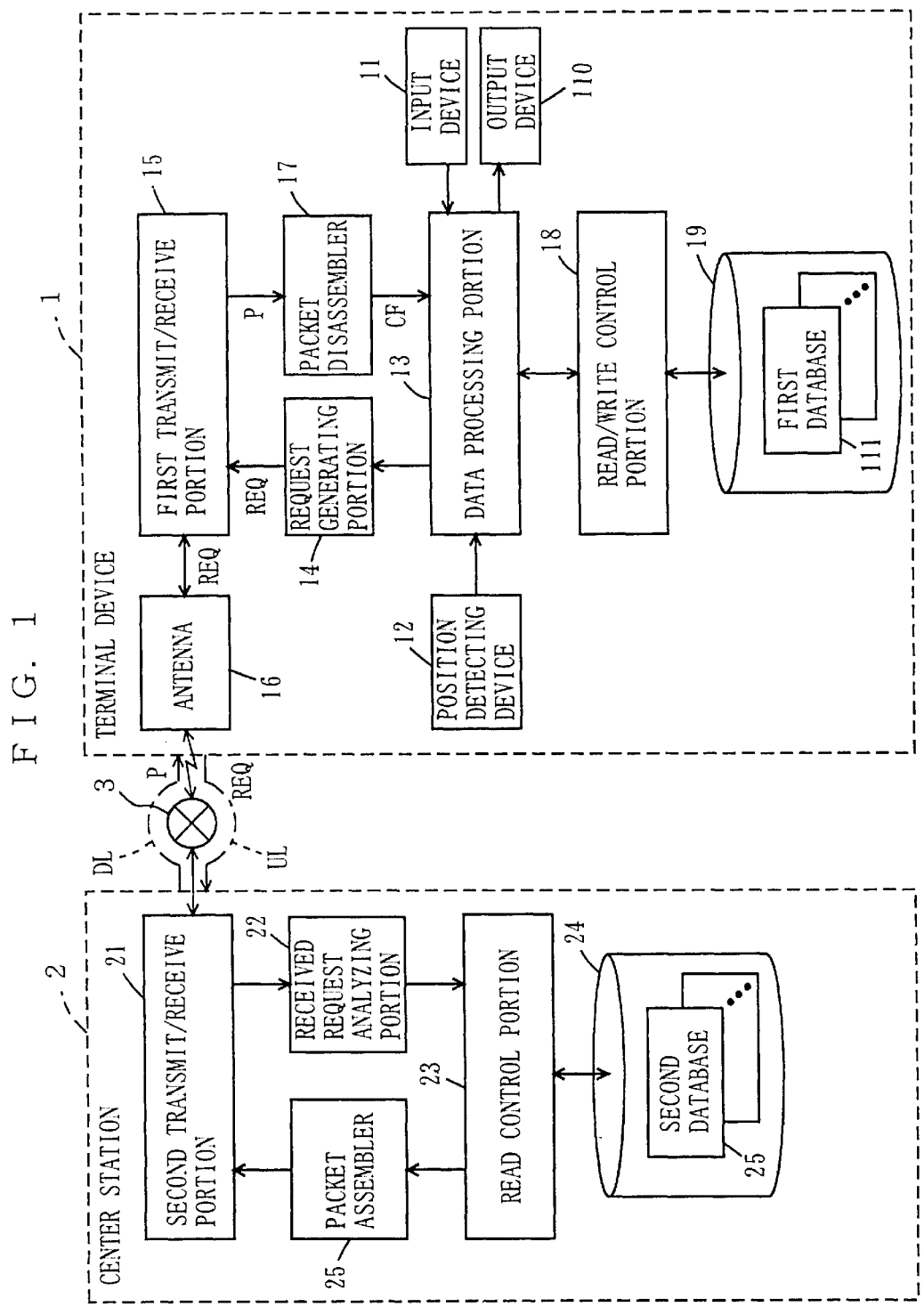

FIG. 8
(a) 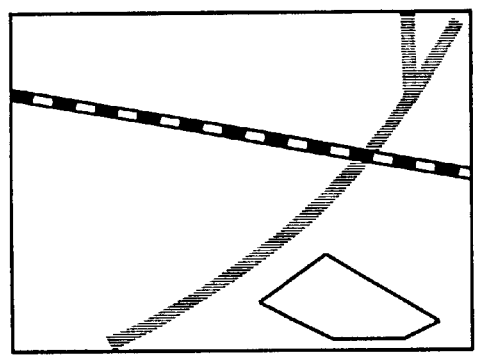
(b) 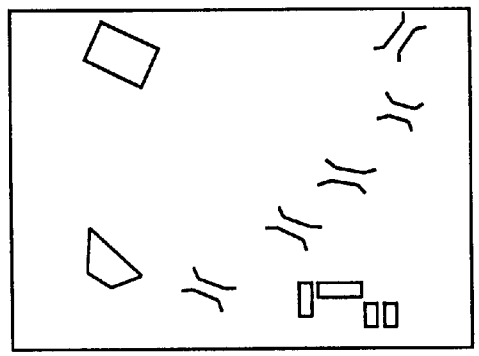
(c) 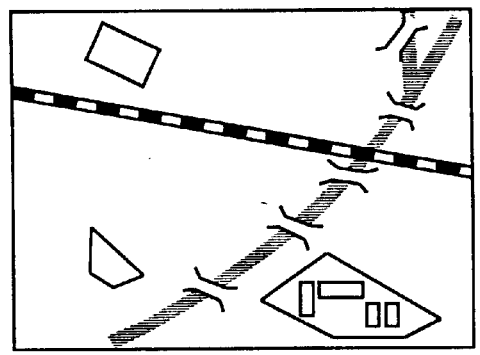

F I G. 1 1
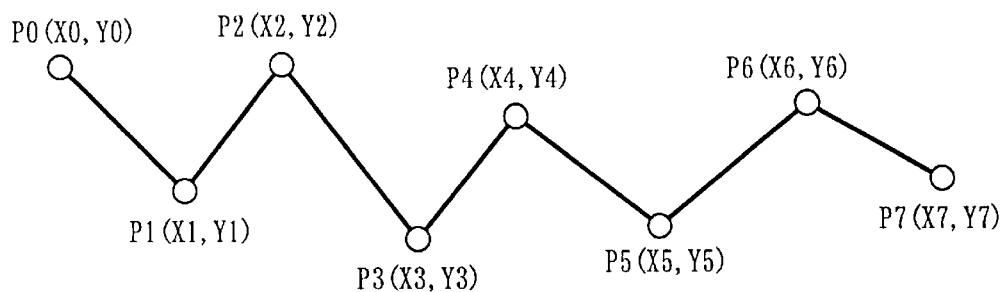

F I G. 1 3
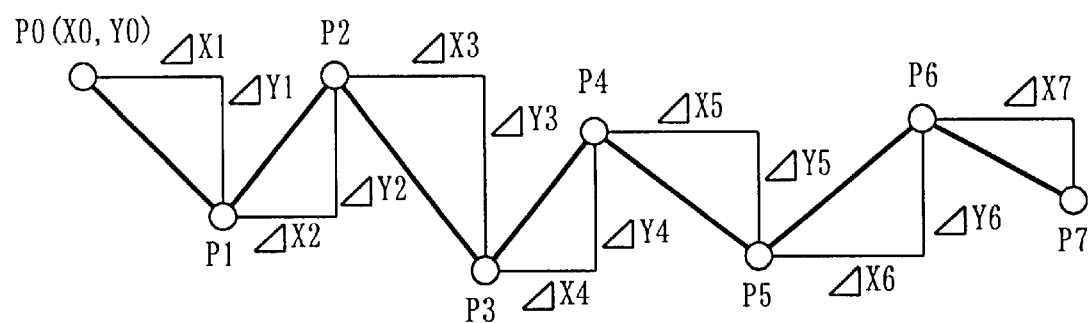

F I G. 1 9
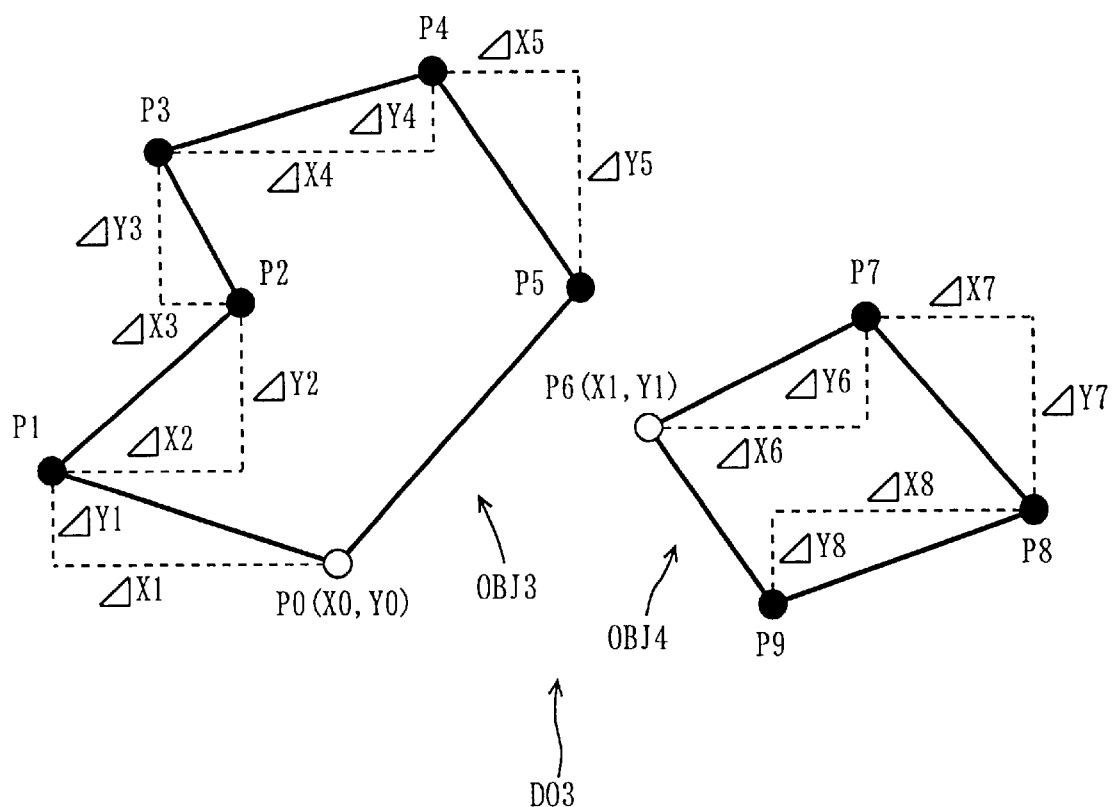

FIG. 23
(a) 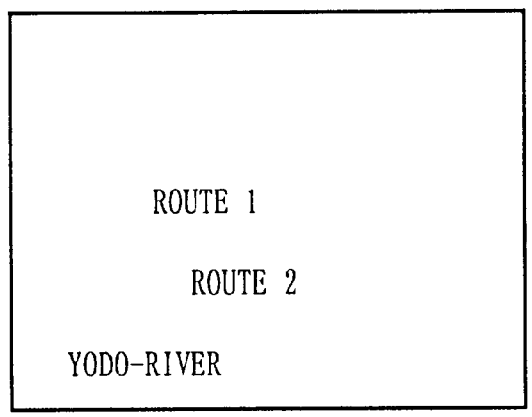
(b) 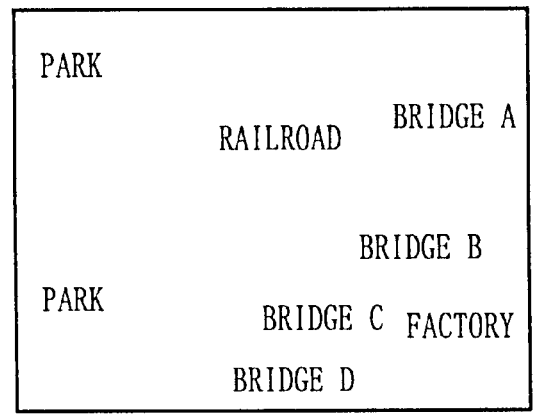
(c) 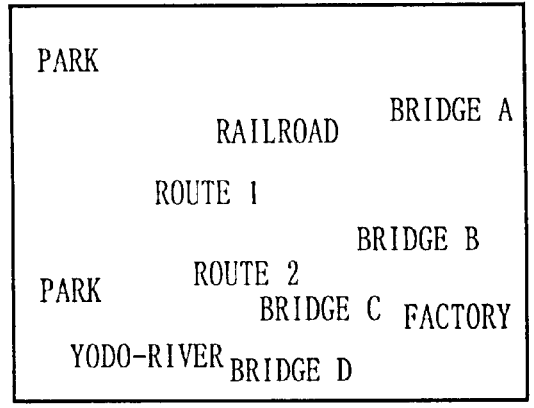

| NODE RECORD No. | NUMBER OF NEIGHBORING NODES, Q (=7) / NUMBER OF NON-NEIGHBORING NODES, R (=4) | | |
|---|---|---|---|
| 0 | NODE RECORD NR1 | N6 | ① NEIGHBORING NODES |
| 1 | NODE RECORD NR2 | N0 | |
| 2 | NODE RECORD NR3 | N4 | ② |
| 3 | NODE RECORD NR4 | N7 | |
| 4 | NODE RECORD NR5 | N10 | ③ |
| 5 | NODE RECORD NR6 | N3 | |
| 6 | NODE RECORD NR7 | N9 | ④ |
| 7 | NODE RECORD NR8 | N8 | NON-NEIGHBORING NODES |
| 8 | NODE RECORD NR9 | N5 | |
| 9 | NODE RECORD NR10 | N2 | |
| 10 | NODE RECORD NR11 | N1 | |

FIG. 43
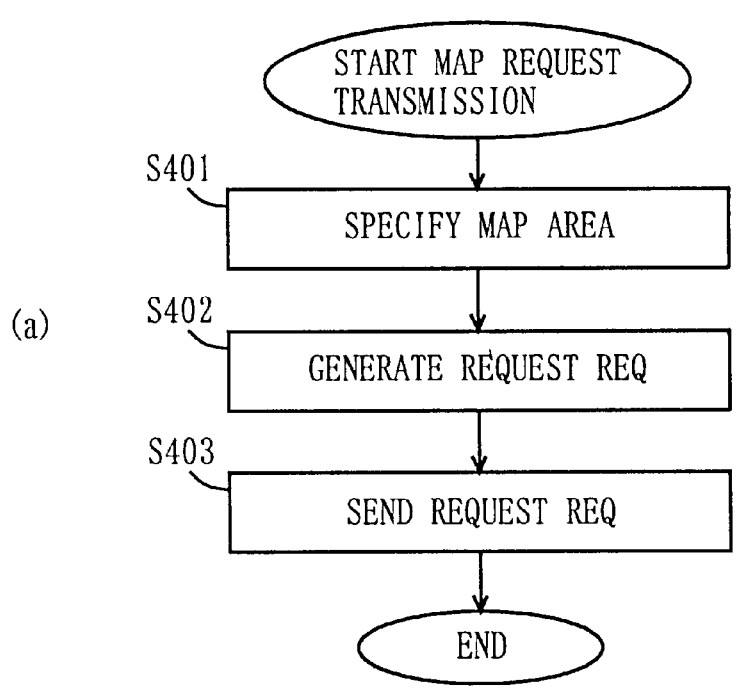
(a)
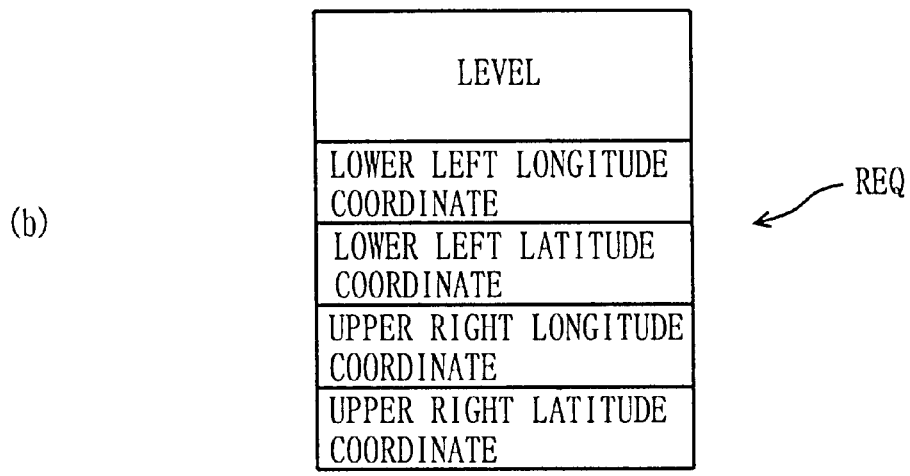
(b)

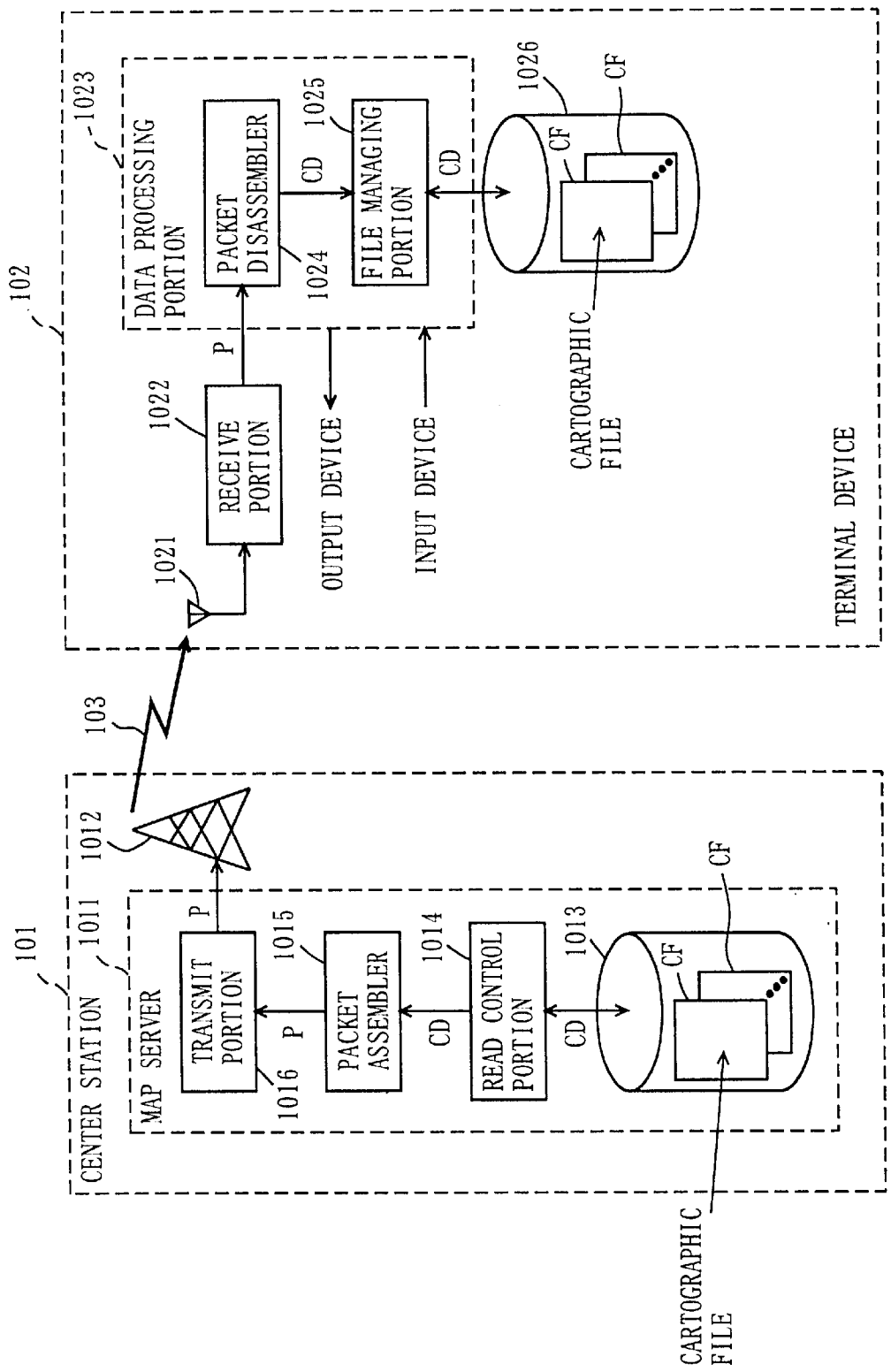

F I G. 5 3
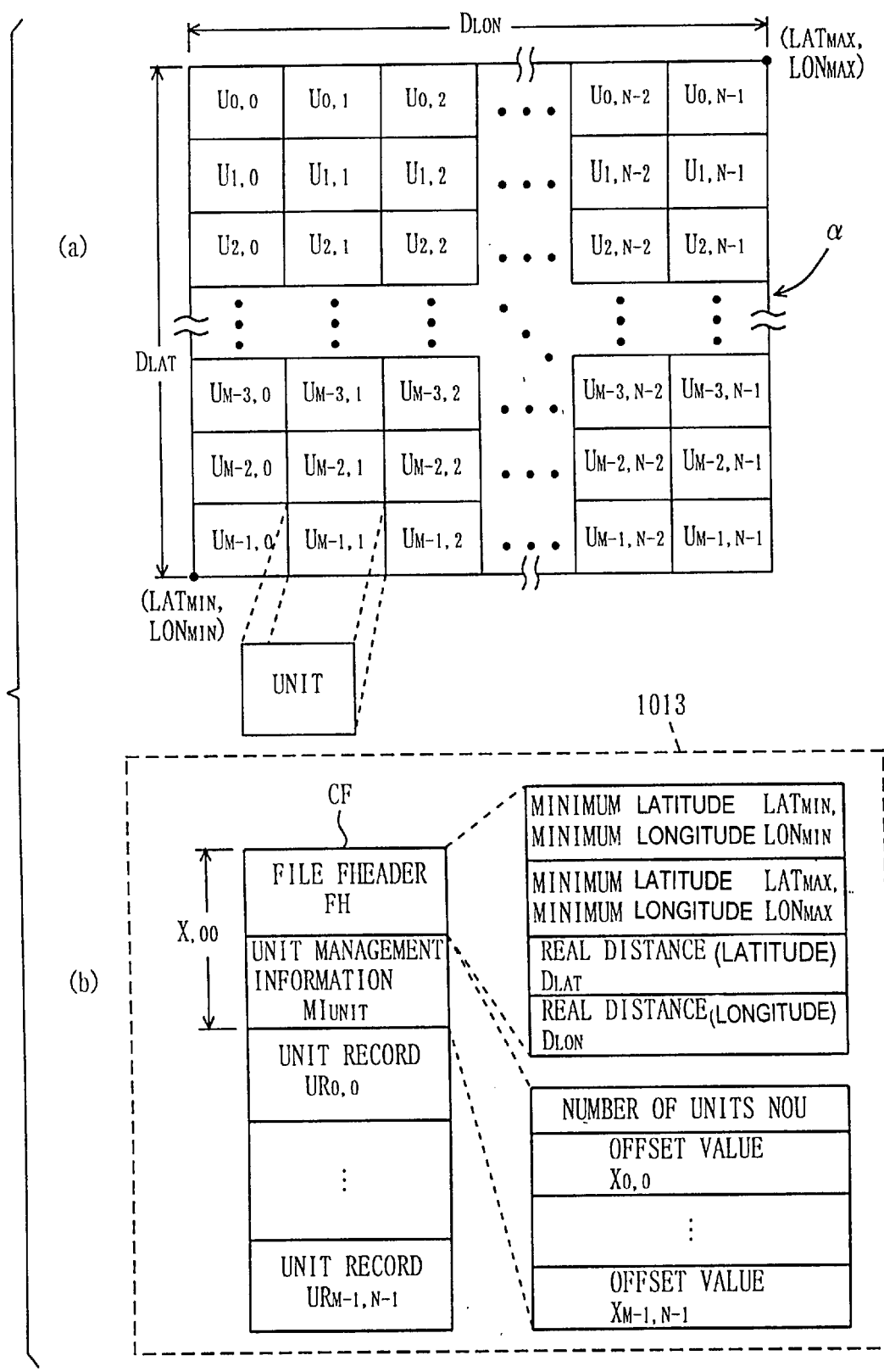

FIG. 58
(a) 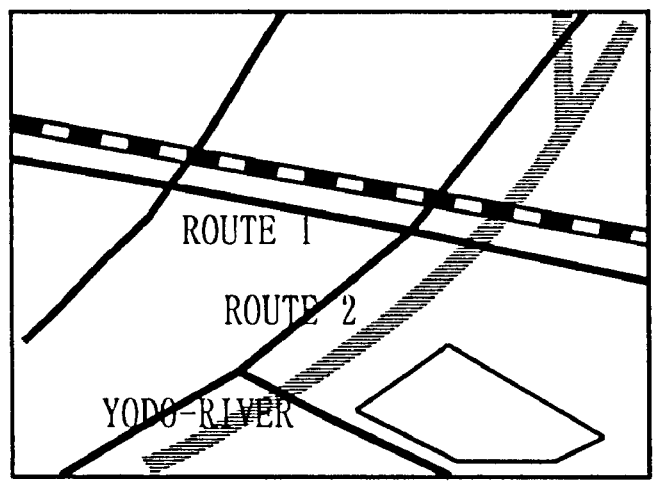
(b) 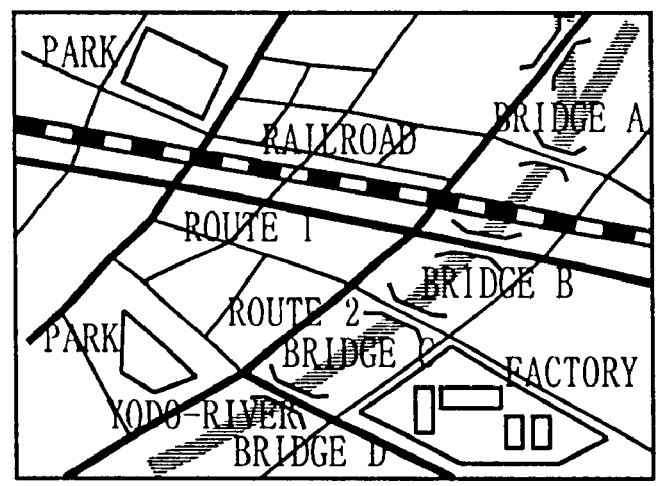

F I G. 6 9
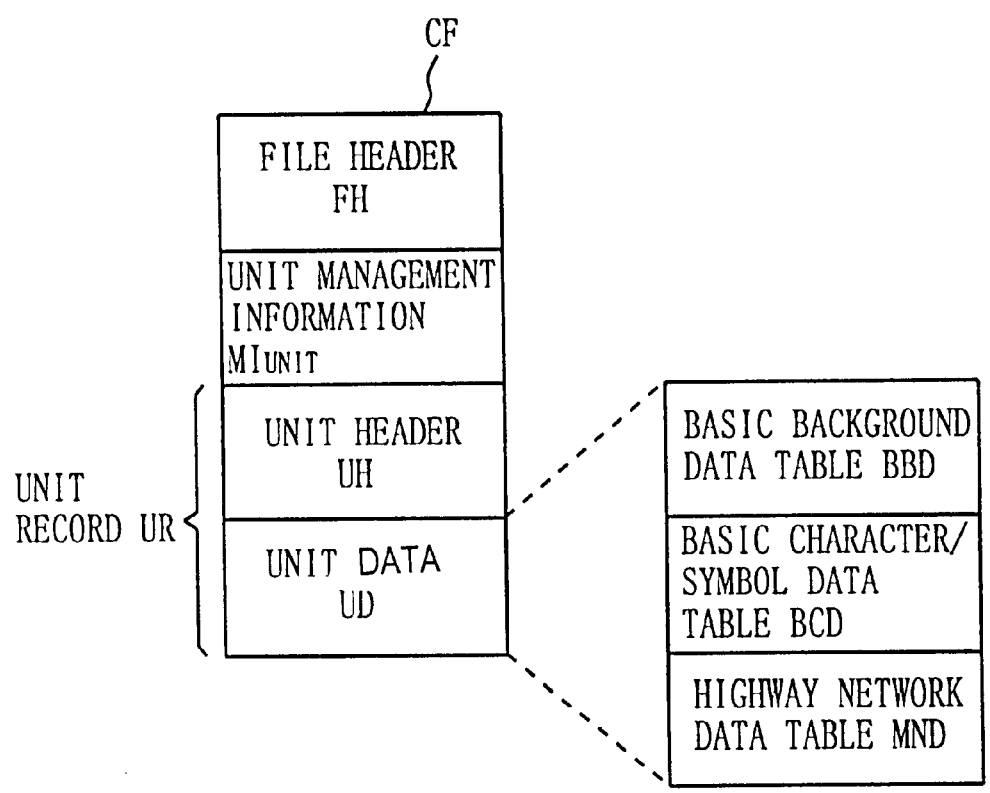

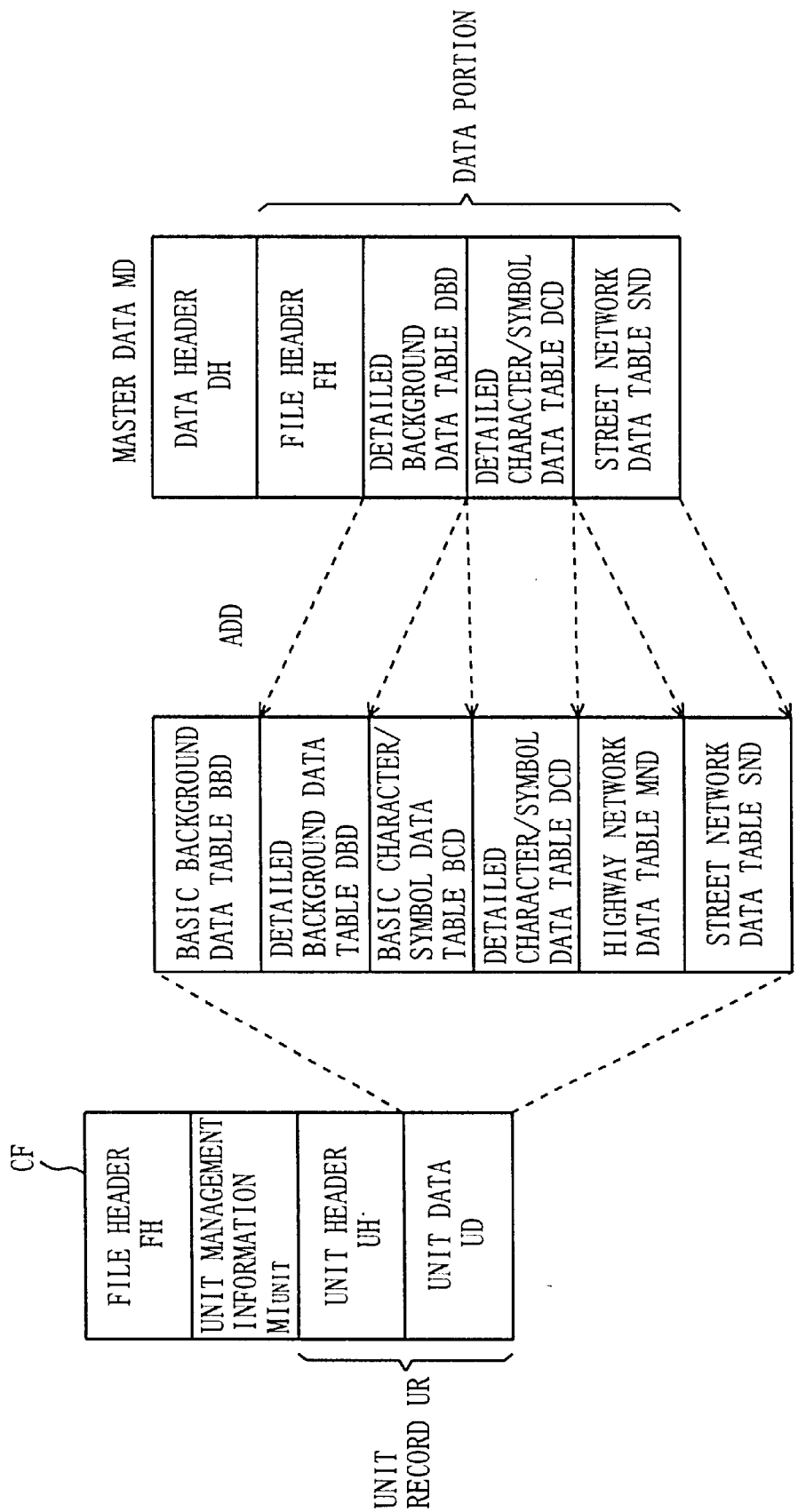

F I G. 7 3 (PRIOR ART)

DATA STRUCTURE OF DIGITAL MAP FILE

TECHNICAL FIELD

The present invention relates to terminal devices, and more particularly to a terminal device for reading cartographic files from an internal storage device in which the cartographic files are stored as digital data generated about individual units defined by dividing a map into a plurality of regions.

BACKGROUND ART (First Background Art)

Recently, an increasing number of vehicles are carrying navigation systems. Early navigation systems were only provided with files for generating maps on a screen (hereinafter referred to as cartographic files). However, recent models can be supplied not only with the cartographic files but also with traffic information and route guide information. Supply of such various information has made the car navigation systems so convenient that they are expected to rapidly prevail more and more.

The earlier navigation systems were equipped with storage devices having read-only storage media such as CD-ROMs. Cartographic files to be provided to users and their relevant data are previously recorded in the storage media. The storage devices read the cartographic files recorded in the storage media when necessary. The read cartographic files are referred to by the users, or used in route search or map matching process.

Generally, in order to efficiently manage a hierarchical structure of maps on different scales, a map is equally divided into rectangular areas in the longitude and latitude directions and a digital cartographic file is generated for each rectangular area. Now, in First Background Art, such a rectangular area is called a unit.

Such cartographic files are used in the car navigation systems typically for the route search process or process of correcting the present position (map matching). The cartographic files therefore contain road network data. The road network data is at least composed of connection information showing connections among nodes and links. Generally, a node is a piece of information which represents an intersection in the road network, and a link is vector information which represents a road between two intersections. A collection of such nodes and links expresses a map which shows the road network in each unit.

While minimum details of the road network can be represented with the nodes, links and their connection information, it is not enough for the purpose of displaying a map. For example, most roads in mountain or seaside areas are curved between intersections. Therefore the road network data further contains information for specifying the link shape to display curved roads. As is clear from this, the links are often represented by vector data.

Further, the roads include various types, such as national roads, prefectural roads, etc. The roads can be classified also according to the number of lanes, whether it has a median strip, etc. The road network data therefore also contains attribute information which shows the road type and the like.

Some intersections have their own names and others don't. Further, some intersections have traffic signals and others don't. Therefore the road network data further contains attribute information for each node. Each piece of the attribute information contains information showing the name of the intersection, presence/absence of traffic signals, etc.

When a road extends over a plurality of units in a cartographic file having the vector data structure, special nodes are separately generated at the boundary between the units (referred to as neighboring nodes hereinafter). The connection of a road can be traced between the neighboring units via the neighboring nodes. To specify the correspondence between a neighboring node of a unit and a neighboring node of a neighboring unit, the conventional cartographic files contain their offset addresses and record numbers. The offset address shows the address location of the neighboring node on the basis of a reference address. The record number shows where the neighboring node is recorded, counted from the first node in the cartographic file of the neighboring unit.

(Second Background Art)

As has been explained in First Background Art, the earlier conventional navigation systems could only use the cartographic files recorded in read-only recording media, so that it was difficult to provide them with real-time information. Typical examples of such real-time information include the traffic and weather information. A map providing system which can provide such real-time information and the cartographic files is disclosed in "Japanese Patent Laid-Open Publication No.7-262493", for example. In the map providing system of this reference, the cartographic files and real-time information are downloaded from an information providing center to a terminal device carried on a car through a communication medium.

The map providing system is constructed on the basis of the mobile communication technology and digital broadcast technology to provide information in real time. In such a map providing system, the center station distributes information to a moving body in the service area by using a given broadcast channel. The center station is typically a communication satellite (so-called CS), a broadcasting satellite (so-called BS), or a ground wave digital broadcast station. A map providing system using the mobile communication technology and digital broadcast technology is disclosed in "Japanese Patent Laid-Open Publication No.7-154350", for example. More specifically, this reference discloses technical contents for limiting the broadcast area for certain information. That is to say, when a center station sends multiplexed information through a broadcast medium, it attaches an area code, like a postal code, to each e of information. A terminal device previously records, in a memory, as an ID, the area code corresponding to its present position. In the terminal device, a data extracting circuit separates the multiplexed information sent from the broadcast station and extracts the area code attached to each piece of the information. The extracted area codes are compared with the recorded ID in the terminal device. When the two agree, the terminal device allows the user to refer to the information having the object area code.

As can be seen from the description above, map providing systems which provide maps through communication or broadcast are being intensively developed in these years. In such a map providing system, a center station reads out target cartographic files by the unit and sends them to a terminal device. The terminal device receives the cartographic data from the center station and stores it in the storage device. The stored cartographic file is used as needed, for user's reference, route search process, or map matching process.

(Problems of the First Background Art)

In the conventional systems, as is clear from the description in First Background Art, a cartographic file of a unit contains information which directly specifies the internal data structure of cartographic files in the neighboring units (the aforementioned offset addresses or record numbers).

For example, when a new road has been constructed in a unit, the cartographic file of this unit is updated, as a matter of course. In the updated cartographic file, the positions of the neighboring nodes have often been changed. Then, in the conventional method using information directly specifying the internal data structure of the cartographic files, it is impossible to correctly trace from a neighboring node recorded in a cartographic file of a neighboring unit to the corresponding neighboring node in the updated cartographic file. That is to say, updating one cartographic file often requires updating the cartographic files of its neighboring units.

Measures for evaluating the quality of the aforementioned digital cartographic files include the degree to which they give the details of the map. However, since the links are represented by vector data in the cartographic files, representing a more detailed map increases the amount of data of the cartographic file.

Such cartographic files have conventionally been used mainly in the car navigation systems. In the car navigation systems, the cartographic files are recorded in large-capacity storage media such as CD-ROMs, DVD-ROMs, hard disks, etc. However, in the future, the cartographic files will be used not only in the car navigation systems but also in portable information devices. It is difficult to equip such portable information devices with such large-capacity storage media as are used in the car navigation systems. In this respect, there is an intensive demand for compression of the amount of data of the cartographic files.

(Problems of the Second Background Art)

By the way, the references cited in Second Background Art do not disclose how the terminal device stores the cartographic files in the storage device. A likely method is that the terminal device generates a cartographic file for each unit received and stores the genera ted cartographic files in the storage device. However, this method is disadvantageous in that the storage region cannot be efficiently used. For example, as shown in FIG. 71, suppose that a map β representing an area is sectioned into 64 rectangular units. Also suppose that the terminal device receives four units 71 to 74 and stores them. As is well known, the storage region in the storage device is managed in clusters; where the data size of each unit does not always agree with an integral multiple of the cluster size. Therefore, when the terminal device generates four files 81 to 84 for the received four units 71 to 74, then, as shown in FIG. 72, some areas will be possibly left unused in the four clusters 91 to 94. In FIG. 72, the dotted parts are regions where the files 81 to 84 have been recorded. The hatched parts show the vacant areas. The vacant areas left in the clusters 91 to 94 are not used. That it to say, even when the terminal device receives a unit 75 other than the units 71 to 74 (see FIG. 71), the file generated on the basis of this unit 75 is not stored in the vacant areas in the clusters 91 to 94. As is clear from this, a larger number of clusters will be left not completely filled as the terminal device receives a larger number of units. That is, the efficiency of use of the storage region is lowered.

When the map is divided into a relatively small number of units, the clusters will be less likely to be left partly unfilled. For example, suppose that the map β covering the area of FIG. 71 is sectioned into 16 rectangular units as shown in FIG. 73. The area represented by the unit 76 of FIG. 73 corresponds to the area covered by the units 71 to 74 in FIG. 71. Also suppose that the terminal device receives and stores one unit 76. Under this assumption, when the terminal device generates one file 86 for the one unit 76, then a vacant area is left only in one cluster 96 as shown in FIG. 74. The dotted part in FIG. 74 shows the area where the file 86 has been recorded. The hatched part shows the vacant area.

As is clear from this, when the map is sectioned into smaller units (see FIG. 71) and cartographic files representing a certain area are stored in the storage device, then relatively large vacant areas are formed in the storage device (see FIG. 72). However, when the map is sectioned into larger units (see FIG. 73), a smaller vacant area is left even when the cartographic data covering the same area is stored in the storage device (see FIG. 74). That is to say, considering the effective use of the storage region, it is desirable to section the map into a less number of units.

However, sectioning the map into a less number of units means a larger amount of data in each unit. Therefore the base station must transmit a larger amount of data at one time to the terminal device. As a result the wireless transmission path will become more susceptible to congestion; that is, this causes another problem that the wireless transmission path cannot be used efficiently. That is to say, while giving priority to the effective use of the storage region reduces the efficiency of use of the wireless transmission path, giving priority to the effective use of the wireless transmission path reduces the efficiency of use of the storage region.

Accordingly, a first object of the present invention is to provide a data structure of the cartographic files in which updating one cartographic file does not require updating cartographic files of the neighboring units. A second object of the present invention is to provide a data structure of the cartographic files in which the amount of data can be compressed. A third object of the invention is to provide a map providing system which can efficiently use the storage region of the terminal device and can also efficiently use the transmission path between the center station and the terminal device.

SUMMARY OF THE INVENTION

An aspect of the invention is directed to a terminal device for reading a cartographic file from a storage device in which cartographic files are stored as digital data generated for individual units formed by dividing a map into a plurality of areas, wherein each unit contains a road network represented by nodes and links, and each cartographic file comprises node records generated for respective nodes and link records generated for respective links, and the node records each contain information about a non-neighboring node representing an intersection on the road network or information about a neighboring node defining a connection of roads between its unit and another unit adjoining the unit, the information about the neighboring node being coordinate information about the neighboring node, and wherein the terminal device comprises: an input device responsive to an operation by a user, for generating information specifying a map area; a data processing portion for specifying a record region where a necessary cartographic file is stored on the basis of the information generated by the input device; and a read control portion for reading the cartographic file from the storage device on the basis of the record region specified by the data processing portion, and wherein the data processing portion performs a given process by using the node records and the link records recorded in the cartographic file read by the read control portion, and the data processing portion traces a connection from a road in one unit to a road in another neighboring unit on the basis of the coordinate information about the neighboring nodes of said one unit and the neighboring another unit.

According to the aspect above, during route search, the data processing portion traces the connection of road extending from one unit into a neighboring unit on the basis of coordinate information about the neighboring nodes of the unit and the neighboring unit. In this way, the data processing portion can trace the connection of road between two units without referring to information which directly specifies the internal data structure in the cartographic files. Accordingly, when a cartographic file of a unit in the storage device has been updated, it is not necessary to update cartographic files of the neighboring units.

Another aspect is directed to a terminal device for reading a cartographic file from a storage device in which cartographic files are stored as digital data generated for individual units formed by dividing a map into a plurality of areas, wherein each cartographic file stored in the storage device is provided with a file name uniquely corresponding to the map area represented by itself, and the terminal device comprises: an input device responsive to an operation by a user, for generating information specifying a map area; a data processing portion for specifying a record region where a necessary cartographic file is recorded on the basis of the information generated by the input device; and a read control portion for reading the cartographic file from the storage device on the basis of the record region specified by the data processing portion.

According to the aspect above, each cartographic file is provided with a file name which uniquely specifies the map area it represents. This allows the data processing portion to identify neighboring cartographic files from their names. In this way, according to this aspect, it is not necessary to record any information which is related to the data structure of cartographic files of the neighboring units, so that the plurality of cartographic files are remotely related. Therefore, updating one cartographic file does not require updating other cartographic files.

A further aspect is directed to a terminal device for reading a cartographic file from a storage device in which cartographic files are stored as digital data generated for individual units formed by dividing a map into a plurality of areas, wherein each unit contains a background which is divided into objects each capable of being drawn with one stroke, and the plurality of objects are grouped so that ones having the same attribute are contained in the same group, and the cartographic file contains background records in which information about the objects is recorded for each group, and wherein the terminal device comprises: an input device responsive to an operation by a user, for generating information specifying a map area; a data processing portion for specifying a record region where a necessary cartographic file is stored on the basis of the information generated by the input device; a read control portion for reading the cartographic file from the storage device on the basis of the record region specified by the data processing portion; and an output device; and wherein the data processing portion causes the output device to display the background on the basis of the background records contained in the cartographic file read by the read control portion.

According to the aspect above, in a cartographic file, objects having the same attribute are recorded together in the same background record, which eliminates the need to redundantly record the information about the attribute and thus enables reduction in the amount of data in each cartographic file.

Another aspect is directed to a terminal device for reading a cartographic file from a storage device in which cartographic files are stored as digital data generated for individual units formed by dividing a plurality of maps on different scales each into a plurality of areas, wherein the plurality of cartographic files have a hierarchical structure based on the scales, each unit contains a road network represented by nodes and links, and each cartographic file at least contains node records which are generated for respective nodes and contain coordinate information about the nodes, and link records which are generated for respective links, and in each cartographic file, the node records are recorded in an ascending or descending order of the coordinate information about the nodes, and wherein the terminal device comprises: an input device for generating information specifying a map area; a data processing portion for specifying a record region where a necessary cartographic file is recorded, on the basis of the information generated by the input device; and a read control portion for reading the cartographic file from the storage device on the basis of the record region specified by the data processing portion; and wherein the data processing portion searches for a node in a unit at a higher level which corresponds to a node contained in a unit at a lower level on the basis of the coordinate information recorded in the cartographic file read by the read control portion.

According to the aspect above, the data processing portion retrieves a node in a higher-level unit which corresponds to a node contained in a lower-level unit on the basis of the node coordinate information, i.e. the coordinate information recorded in the cartographic file read by the read control portion. In this way, the data processing portion can trace nodes having the same coordinates between different levels without the need to refer to any information which directly specifies the internal data structure in the cartographic files. Therefore, updating a cartographic file of a unit contained in the storage device does not require updating the cartographic files of the neighboring units.

A further aspect is directed to a system in which a center station provides a cartographic file to a terminal device through a transmission path, wherein the center station comprises: a first storage device containing the cartographic file, the cartographic file representing a map of a predetermined area, a read control portion for reading, as cartographic data, part or all of the cartographic file from the first storage device; a packet assembler for assembling packets in a form appropriate for the transmission path by using the cartographic data read by the read control portion; and a transmitting portion for transmitting the packets assembled by the packet assembler to the terminal device through the transmission path; and wherein the terminal device comprises; a receiving portion for receiving the packets transmitted by the transmitting portion through the transmission path; a data processing portion for disassembling the packets received by the receiving portion and restoring the cartographic data; and a second storage device having an internal storage medium for storing a cartographic file; wherein when a cartographic file related to the cartographic data restored this time is already stored in the second storage device, the data processing portion reads that cartographic file from the second storage device; and the data processing portion performs the process of adding the restored cartographic data to the second cartographic file thus read and storing the cartographic file in the second storage device.

According to the aspect above, the data processing portion combines together the currently restored cartographic data and the cartographic file read from the second storage device and stores it into the second storage device, thereby updating the cartographic file. In this way, the data processing portion generates a cartographic file not only on the basis of the cartographic data received at the receiving portion. The data processing portion adds the currently received cartographic data to the currently read cartographic file. Thus the second storage device stores not a large number of cartographic files containing small amounts of data but cartographic files containing substantial amounts of data, which prevents formation of vacant areas in the clusters. This realizes a map providing system which can effectively utilize the storage region in the terminal device.

Furthermore, according to the aspect above, even if the center station transmits small-sized cartographic data, the terminal device organizes the cartographic data from the center station into one file to suppress formation of vacant areas in the clusters. In this way, since the center station can send small-sized cartographic data, the transmission path is less apt to be congested. This realizes a map providing system which can efficiently utilize the transmission path.

BRIEF DESCRIPTION OF THE DRAWINGS

FIG. 1 is a block diagram showing the structure of a map providing system according to a first embodiment of the present invention;

FIG. 8 schematically shows maps which are represented by background data;

FIG. 11 is a diagram showing graphic data composed of eight element points P0 to P7;

FIG. 13 is a diagram showing the graphic data of FIG. 11, where the element points P0 to P7 are represented by the relative coordinates;

FIG. 19 is a diagram showing a rendered object DO3, which is used to explain an example in which the relative coordinates are not applied to the boundary between the objects;

FIG. 23 is a diagram used to explain the relation between a basic character/symbol table and a detailed character/symbol table;

FIG. 43 is a diagram used to explain the process in which the terminal device 1 requests transmission of a cartographic file CF;

FIG. 52 is a block diagram showing the structure of a map providing system according to a second embodiment of the invention;

FIG. 53 is a diagram showing the structure of each cartographic file CF stored in a first storage device 1013 shown in FIG. 52;

FIG. 58 is a diagram showing a map displayed by superimposing basic background table data BBD, basic character/symbol data table BCD and highway network data table MND shown in FIG. 54, and a map displayed by superimposing detailed background table data DBD, detailed character/symbol data table DCD and street network data table SND shown in FIG. 54;

FIG. 69 is a diagram showing the structure of a cartographic file CF which is formed when the basic background data table BBD, basic character/symbol data table BCD and highway network data table MND shown in FIG. 54 are already provided in the terminal device 102 in the step S1204;

FIG. 70 is a diagram showing a process the file managing portion 1025 executes in the step S1406 of FIG. 66 when the first and second unit IDs agree with each other;

BEST MODE FOR CARRYING OUT THE INVENTION

First Embodiment (System Structure)

Figure 2:
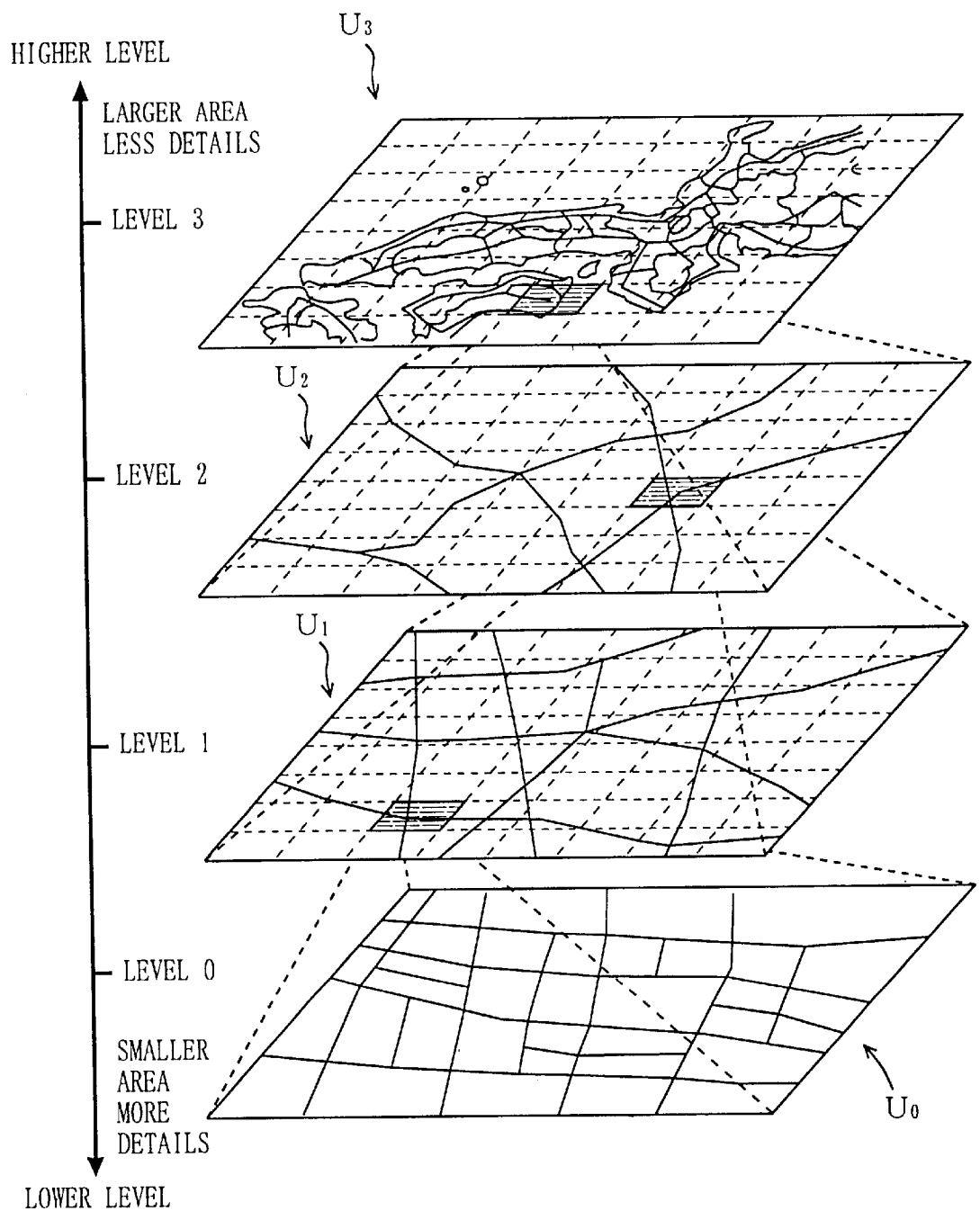
FIG. 2 is a diagram used to explain the hierarchical structure of maps represented by a first cartographic file 111 and a second cartographic file 25 shown in FIG. 1.

FIG. 1 is a block diagram showing the structure of a map providing system according to an embodiment of the present invention. In FIG. 1, this map providing system includes a terminal device 1 and a center station 2. The terminal device 1 and the center station 2 are connected through a communication network 3 to allow bidirectional communication. More specifically, an uplink UL and a downlink DL are extended between the terminal device 1 and the center station 2. The uplink UL is a communication path from the terminal device 1 to the center station 2 and the downlink DL is a communication path from the center station 2 to the terminal device 1. Typical examples of the communication network 3 include communication networks for mobile devices like mobile phones, public networks such as ISDN (Integrated Services Digital Network) and private networks. The communication network 3 may be composed of two or more of the mobile communication network, public and private networks.

Next, the structure of the terminal device 1 is described. The terminal device 1 is typically a car navigation system, which comprises an input device 11, a position detecting device 12, a data processing portion 13, a request generating portion 14, a first transmit/receive portion 15, an antenna 16, a packet disassembler 17, a read/write control portion 18, a first storage device 19, and an output device 110.

The input device 11 can be realized as hardware like a remote controller for remotely controlling the car navigation system or keys arranged on the body of the car navigation system, or it may be realized as software like buttons displayed on a menu screen of the car navigation system. The input device 11 may be realized by utilizing speech recognition techniques. A user of the terminal device 1 operates the input device 11 to make various requests to the terminal device 1, e.g. to scroll the displayed map, change the scale, search for a route, retrieve information, or make connection to the center station 2. For its characteristic operation, the input device 11 outputs to the data processing portion 13 information for specifying a cartographic file CF which the user requires.

The position detecting device 12 is realized with a speed sensor, a gyro sensor, or a GPS (Global Positioning System) antenna and receiver. The position detecting device 12 may be realized by using a combination of two or more of the speed sensor, gyro sensor and antenna and receiver of GPS (Global Positioning System). The position detecting device 12 detects the moving speed of the terminal device 1 with the speed sensor and then calculates the traveled distance on the basis of the detection; or it detects, by using the gyro sensor, the direction in which the terminal device 1 is moving, or it receives, with the antenna and receiver, electric waves from an artificial satellite to detect the absolute position of the terminal device 1 on the earth. The position detecting device 12 detects the present position of the terminal device 1 on the basis of the detected results.

The data processing portion 13 processes various data as will be described later. For example, on the basis of information provided from the input device 11, the data processing portion 13 finds the coordinates which specify the area of a map requested from the user and outputs it to the request generating portion 14.

In response to the input coordinate information, the request generating portion 14 generates a control command for requesting the center station 2 to transmit the cartographic file CF the user requires. The generated control command is hereinafter referred to as a request REQ. The request REQ has a predetermined format, which at least includes the coordinate information inputted to the request generating portion 14. Such a request REQ is outputted to the first transmit/receive portion 15.

The first transmit/receive portion 15 is typically realized with a mobile communication device such as a mobile phone. The first transmit/receive portion 15 sends out the input request REQ onto the uplink UL through the antenna 16.

The request REQ is received at the center station 2 through the uplink UL. The center station 2 analyzes the request REQ to specify the cartographic file CR the user requires. The center station 2 retrieves the specified cartographic file CF from the second storage device 24 and assembles a plurality of packets P. The assembled packets P are sequentially transmitted to the terminal device 1 through the communication network 3 (downlink DL). Operations of the center station 2 will be described in detail later. In the terminal device 1, the first transmit/receive portion 15 receives the packets P through the antenna 16 and outputs them to the packet disassembler 17. The packet disassembler 17 disassembles the input packets P into the original cartographic file CF and outputs it to the data processing portion 13.

Receiving the input cartographic file CF, the data processing portion 13 performs predetermined operations; when a given condition is satisfied, it generates a first database 111 on the basis of the input cartographic file CF and outputs it to the read/write control portion 18. The read/write control portion 18 writes the input cartographic file CF into the first storage device 19, or rewrites an existing cartographic file CF with it. The series of writing operations will be described later.

The first storage device 19 is typically composed of a storage device which is capable of rewriting data, such as a hard disk drive or a flash memory. The first database 111 is stored in the first storage device 19. The first database 111 is a group of data which contains at least one cartographic file CF which allows this terminal device 1 to function as a navigation system.

The output device 110 is typically composed of a display and a speaker. The display displays the map represented by the cartographic file CF together with the present position, or displays the result of route search or route guide performed by the data processing portion 13. The speaker provides the user through speech with the result of route guide processed by the data processing portion 13.

The data processing portion 13 performs various operations by using the cartographic files CF in the first database 111. For example, the data processing portion 13 executes a process of displaying the present position of the terminal device 1. In this case, the data processing portion 13 requires a map representing the vicinity of the present position detected by the position detecting device 12; in cooperation with the read/write control portion 18, it searches the first database 111 and extracts a cartographic file CF representing the map. The data processing portion 13 also performs a process of correcting the position, such as map matching, by using the retrieved cartographic file CF. After the position correcting operation, the data processing portion 13 superimposes a pointer visually showing the detected present position on the map represented by the retrieved cartographic file CF and outputs it to the output device 110.

For example, when the user of the terminal device 1 requests a route search, etc., through the input device 11, the data processing portion 13 has to read, for the route search, etc., cartographic files CF representing maps showing the vicinities of the starting point and the destination point and cartographic files CF representing maps which contain the route to be searched for. Also in this case, the data processing portion 13 cooperates with the read/write control portion 18 to search the first database 111 and take out the cartographic files CF required for the route search, etc. The series of operations for reading the cartographic files CF will be described later.

Next, the structure of the center station 2 is described. The center station 2 comprises a second transmit/receive portion 21, a received request analyzing portion 22, a read control portion 23, a second storage device 24, and a packet assembler 25.

As already explained, the request REQ generated in the terminal device 1 is transmitted to the center station 2 through the communication network 3 (uplink UL). The second transmit/receive portion 21 is typically composed of a communication device such as a modem, terminal adapter, or gateway. The gateway means not only a device or function for interconnecting the center station 2 and the communication network 3 using different communication protocols but it also means a device or function for preventing illegal access to the center station 2 from other stations. The second transmit/receive portion 21 is connected to the communication network 3 to control the data reception from the terminal device 1 and the data transmission to the terminal device 1. More specifically, for example, the second transmit/receive portion 21 receives the request REQ transmitted through the uplink UL and outputs it to the received request analyzing portion 22.

The received request analyzing portion 22 analyzes the input request REQ and outputs the analyzed result to the read control portion 23. The read control portion 23 reads out the cartographic file CF the terminal device I requires from the second storage device 24 on the basis of the input analyzed result. The second storage device 24 is typically composed of a hard disk drive, CD-ROM drive or DVD-ROM drive; it is composed of a storage medium at least capable of reading the stored data and its driver. The second storage device 24 contains a second database 25. The second database 25 is a group of data containing at least one cartographic file CF which allows the center station 2 to function as a station which provides maps to the terminal device 1. That it to say, the cartographic file CF is digital data representing a map which can be provided to the terminal device 1. The first database 111 in the terminal device 1 is generated from the cartographic files CF provided from the center station 2. The read control portion 23 may read out the entirety of the cartographic file CF or part of the cartographic file CF. The read control portion 23 outputs the cartographic file CF to the packet assembler 25. The packet assembler 25 assembles packets P on the basis of the input cartographic file CF and outputs them to the second transmit/receive portion 21. The second transmit/receive portion 21 transmits the input packets P to the terminal device 1 through the downlink DL.

The entire structure of the map providing system of this embodiment and the structure of the terminal device 1 and center station 2 have been described. Next, the hierarchical structure of the above-described cartographic files CF and the file names are described in detail.

<Hierarchical Structure and File Names>

FIG. 2 is a diagram used to explain the hierarchical structure of maps represented by the cartographic files CF of this embodiment. As shown in FIG. 2, first, a plurality of kinds of maps on different scales are prepared. In this embodiment, for convenience of explanation, it is assumed that maps on four scaling levels are prepared. In the description below, the largest scale is referred to as level 0, the second largest scale as level "1", the third largest scale as level "2", and the smallest scale as level "3". As is thus clear, the cartographic data is composed of the four levels, levels "0" to "3", the level "0" being the largest scale. Further, a map at a higher level is referred to as a higher-level map and one at a lower level is referred to as a lower-level map. As shown in FIG. 2, a map at a higher level shows a larger area in less detail. On the other hand, a map at a lower level shows a smaller area in more detail. Maps at each level are sectioned at equal intervals in the longitude and latitude directions.

Figure 3:
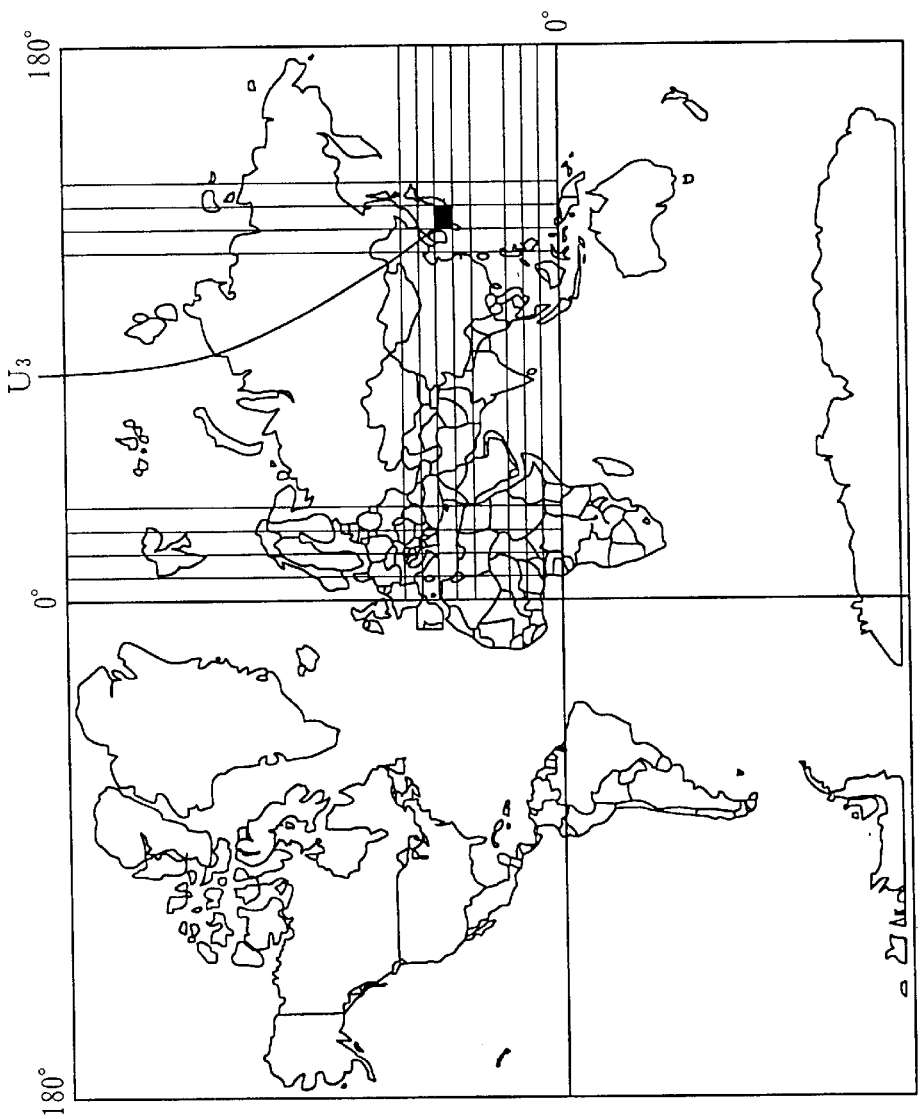
FIG. 3 is a diagram used to explain a unit $U_3$ at the highest level (level "3") shown in FIG. 2.

FIG. 3 is a diagram used to explain units at the highest level (level "3"). The world map of FIG. 3 is sectioned at intervals of 5 degrees 20 minutes in the latitude direction on the basis of latitude 0 degree. This world map is also sectioned at equal intervals of about 8 degrees in the longitude direction on the basis of longitude 0 degree. As a result, the world map is divided into rectangular areas about 640 kilometers square. At the highest level (level "3".), the rectangular area about 640 kilometers square is referred to as a unit. At the level "3", digital data is generated on the basis of such a unit about 640 kilometers square to form one cartographic file CF. A unit $U_3$ (the hatched part) is now explained as an example of such a highest-level (level "3") unit. The highest-level (level "3") unit $U_3$ is a unit which contains KANSAI area of Japan; counted from the origin at latitude 0 degree and longitude 0 degree, it is the 16th in the east longitude direction and 6th in the north latitude direction (note that the unit containing the origin is numbered 0th). This unit $U_3$ is shown at the top of FIG. 2.

As shown in FIG. 2, the map of the unit $U_3$ is sectioned at intervals of 40 minutes in the latitude direction on the basis of one corner, as shown by the dotted lines. The map of the unit $U_3$ is further sectioned in the longitude direction at intervals of 1 degree on the basis of the same corner, as shown by the dotted lines. As a result, the map of the unit $U_3$ is divided into 64 rectangular areas about 80 kilometers square. One unit at the level immediately below (i.e. the level "2") corresponds to a map which shows greater details of one of the rectangular areas about 80 kilometer square. The unit $U_2$ (the hatched part) is explained as an example of a unit at the level "2". Counted from the origin at one corner of the unit $U_3$ (for convenience, the lower left corner), this unit $U_2$ is the 4th in the east longitude direction and the first in the north latitude direction (note that the unit which contains the origin is numbered 0th). This level-"2" unit $U_2$ is shown as the second one from the top of FIG. 2.

Similarly, the map of the unit $U_2$ is sectioned at intervals of 5 minutes in the latitude direction on the basis of one corner and also sectioned at intervals of 7 minutes 30 seconds in the longitude direction, and as a result the map is divided into 64 rectangular areas about 10 kilometers square. One unit at the level immediately below (i.e. the level "1") corresponds to a map showing greater details of one of the rectangular areas about 10 kilometers square. For example, counted from the origin at the lower left corner of the unit $U_2$, the unit $U_1$ (the hatched part) is the 5th in the east longitude direction and the 3rd in the north latitude direction (note that the unit containing the origin is numbered 0th). This level-"1" unit $U_1$ is shown as the third one from the top of FIG. 2.

Similarly, the map of the unit $U_1$ is sectioned into 64 rectangular areas about 1.2 kilometers square. One unit U at the level immediately below (i.e. the level "0") corresponds to a map showing greater details of one of the rectangular areas about 1.2 kilometers square. For example, counted from the origin at the lower left corner of the unit $U_1$, the unit $U_0$ (the hatched part) is the 2nd in the east longitude direction and the 1st in the north latitude direction (note that the unit containing the origin is numbered 0th). This level-"0" unit $U_0$ is shown as the fourth one from the top of FIG. 2.

Figure 4:
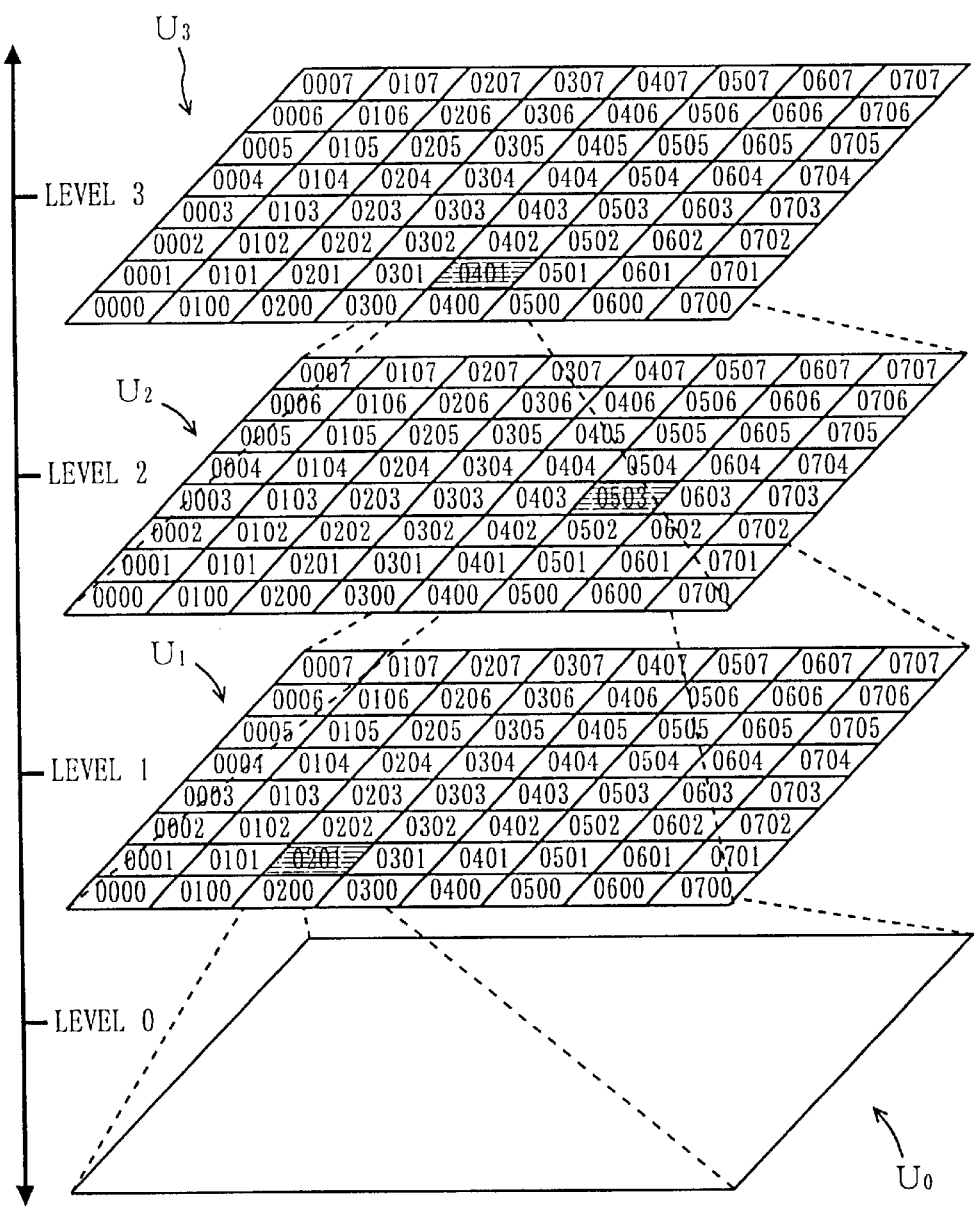
FIG. 4 is a diagram used to explain the parent-child relation between the levels "3" to "0"

FIG. 4 is a diagram used to explain parent-child relation among the units U at the levels "3" to "0". First, in the description below, child units CU mean all units at lower levels which are contained in the area covered by one unit U. In other words, the child units CU are a group of units U which represent parts of the map represented by one unit U at a higher level. At the same time, parent units PU mean all units at higher levels which contain the area covered by a unit U. In other words, the parent units PU are a group of units U which contain, as part of their maps, the map represented by one unit U at a lower level.

Now, the unit $U_3$ of FIG. 4, which corresponds to the unit $U_3$ shown in FIG. 2, is one of the units at the level "3". The 64 units U formed by dividing the unit $U_3$ at eight equal intervals in the longitude and latitude directions are the level-"2" units U associated with their parent unit $PU_3$; i.e. they are the child units CU of the unit $U_3$ which belong to the level "2".

In this way, one parent unit PU has 64 child units CU at the level immediately below. Each child unit CU is provided with a position code. The position code is information which specifies to which part of the parent unit PU the map of the child unit CU corresponds. In other words, the position code is information which specifies the position of the child unit CU on the basis of its parent unit PU.

Now, suppose that the parent unit PU is the unit $U_3$ of FIG. 4. In this case, the position code "0000" is assigned to the child unit CU which represents more details of the part in the lower left corner of the unit $U_3$. On the basis of this position code "0000", "0100" is assigned to the child unit CU which adjoins this child unit CU (having the position code "0000") in the east longitude direction. Similarly, the position code is incremented by "0100" each time the position of the child unit CU shifts one position in the east longitude direction. Further, on the basis of the position code "0000," "0001" is assigned to the child unit CU which adjoins the child unit CU (having the position code "0000") in the north latitude direction. Similarly, the position code is incremented by "0001" each time the position of the child unit CU shifts one position in the north latitude direction.

According to the position codes thus assigned, the unit $U_2$, one of the child units CU of the unit $U_3$, is provided with the position code "0401."

Next, suppose that the parent unit PU is the unit $U_2$. This unit $U_2$, too, has 64 child units CU at the level immediately below (the level "1"). As shown in FIG. 4, the position codes are assigned in the above-described manner to the 64 level-one child units CU. For example, the unit $U_1$, one of the child units CU of the unit $U_2$, is provided with the position code "0503."

Also, the unit $U_1$ as a parent unit PU has 64 child units CU at the level immediately below (the level "0"). Position codes are similarly assigned as shown in FIG. 4 also to the level-"0" child units CU. For example, the unit $U_0$, one of the child units CU of the unit $U_1$, is provided with the position code "0201".

Thus, the position code of this embodiment is incremented by predetermined quantities in the east longitude and north latitude directions as described above. Therefore it is easy to know the relation between neighboring child units CU.

The terminal device 1 and the center station 2 shown in FIG. 1 each comprise a file system. The file system of the terminal device 1 is composed of the data processing portion 13 and the read/write control portion 18. In order to easily management of the first database 111 in the first storage device 19, the file system of the terminal device 1 divides the storage region of the first storage device 19 into some logic regions called "directory." The file system of the terminal device 1 represents the parent-child relation and the neighboring relation between the cartographic files CF in the first database 111 with directory names and file names based on a tree structure.

The file system of the center station 2 is composed of the received request analyzing portion 22 and the read control portion 23. The file system of the center station 2 divides the storage region of the second database 25 in the second storage device 24 into "directories" (logic regions) and represents the parent-child relation and neighboring relation between the cartographic files CF in the second database 25 with the directory names and file names based on a tree structure.

Figure 5:
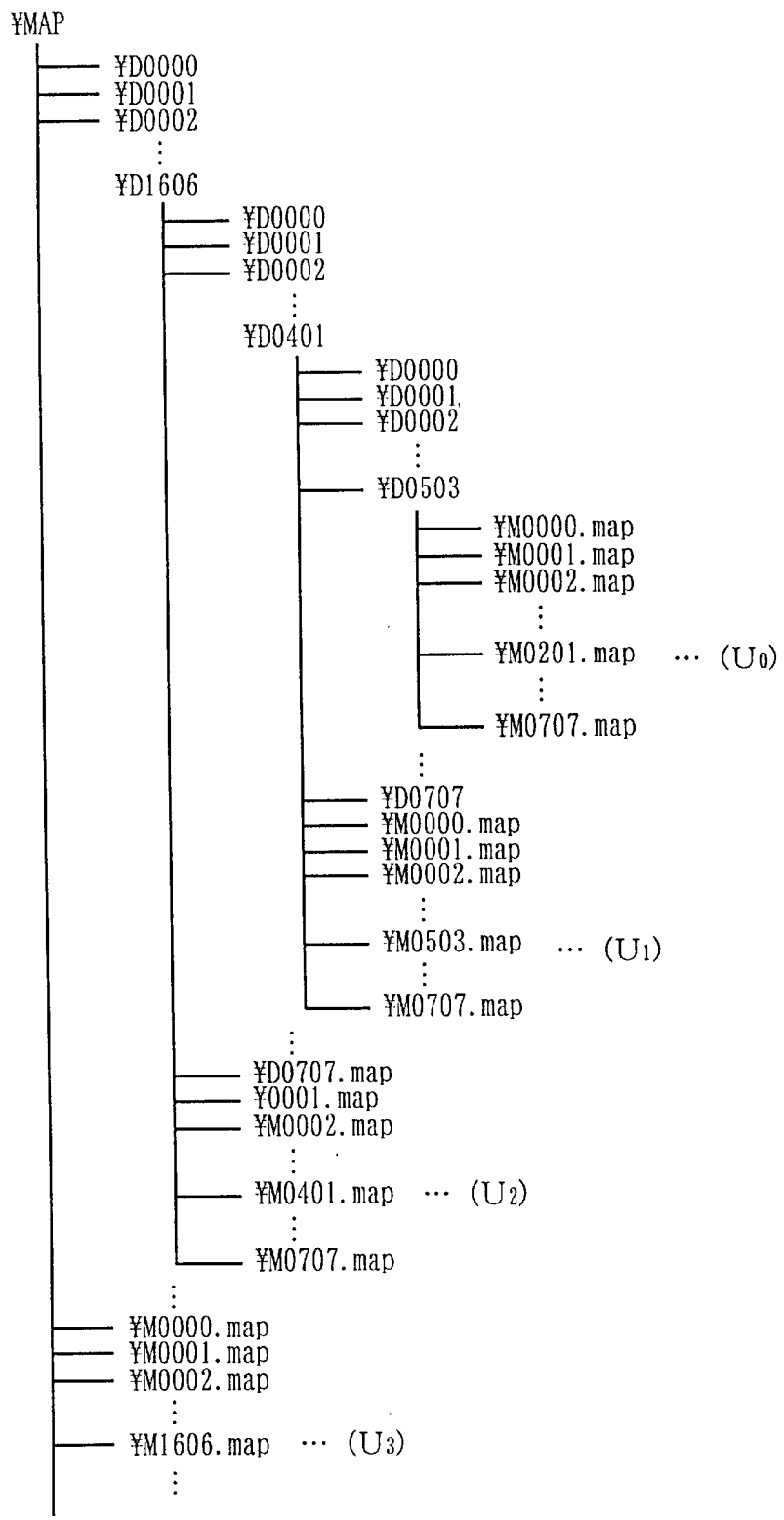
FIG. 5 is a diagram showing a tree structure for managing the first cartographic file 111 and the second cartographic file 25.

FIG. 5 is a diagram showing the tree structure for managing the cartographic files CF shown in FIGS. 2 to 4. As stated above, the directories in each file system take a tree structure as shown in FIG. 5 and are represented with "¥." The mark "¥" is an identifier for identifying the directory. The uppermost directory is called root, which is represented as "¥MAP." Cartographic files CF themselves or subdirectories can be stored in the directories below the root directory "¥MAP." When specifying a required cartographic file CF, the file system has to describe the names of the directories existing between the root "¥MAP" and the directory where that cartographic file exists; the names of the directories are described as "path" in front of the file name. Thus a character string sandwiched between two "¥" marks represents a directory name. The initial of the subdirectory name is defined as "D." The initial of the file name is defined as "M." Further, the extension of the file name is defined as ".map."

Next, a method for assigning the directory names and file names is described, which is one of the features of this embodiment. First, basically, the cartographic files CF representing the maps covered by the individual units at the highest level are provided with their file names according to the given rules and stored in the directories (logic regions) immediately below the root ("¥map"). For example, the unit $U_3$ shown in FIG. 3 belongs to the highest level (the level "3") and corresponds to the 16th unit from the origin in the east longitude direction and the 6th unit in the north latitude direction (the origin is at latitude 0 degree and longitude 0 degree: note that the unit containing the origin is numbered 0th). Therefore the unit $U_3$ is provided with the name "M1606.map" including the initial of the file name and the extension. Further, since the unit $U_3$ at the highest level is stored right below the root ("¥map"), its path is "¥MAP¥M1606.map."

As is seen from the file name of the unit $U_3$, a 4-digit number is interposed between the initial of the file name and the extension. The higher two digits of the number define he position of the unit U counted from the origin in the east longitude direction. The lower two digits of the number define the position of the unit U counted from the origin in the north latitude direction. In this way, the file name defines the position of the unit U. Also, as can be seen from the path of the unit $U_3$, no subdirectory exists between the root ("¥map") and the file name. In this way, the number of subdirectories defines which level the unit U belongs to. In the case of the unit $U_3$, the fact that the number of subdirectories between the root and the file name is zero shows that the unit $U_3$ (M1606.map) belongs to the highest level.

According to the rules above, the paths of other units U at the highest level are represented as: "¥MAP¥M0000.map," "¥MAP¥M0001.map". . . "¥MAP¥M1606.map". . .

Also, subdirectories for storing a group of units related to a highest-level unit U as their parent unit PU are formed immediately below the root. For example, in order to store the group of units U whose parent unit PU is the unit $U_3$, a subdirectory named "¥D1606" is formed right below the root. As is seen from this subdirectory name, the initial of the subdirectory name is followed by a 4-digit number. Like that of the file name, this 4-digit number shows the position of the parent unit PU counted from the origin in the east longitude and north latitude directions. Thus "¥D0000," "¥D00001" . . . "¥D1606" . . . are generated immediately below the root ("¥MAP").

Next, the individual units U belonging to the level "2" are provided with file names on the basis of their position codes and stored in the directories (logic regions) immediately below the subdirectories which represent their parent units PU. For example, referring to FIG. 4 etc., the unit $U_3$ as a parent unit PU has 64 units U at the level "2". One of them, the unit $U_2$, has the position code "0401," so that it is named "M0401.map" including the initial of the file name and the extension. The unit $U_2$ at the level "2" is stored immediately below the subdirectory ("¥map¥D1606") of the unit $U_3$ (parent unit PU), so its path is "¥MAP¥D1606¥M0401.map."

As can be seen from the file name of the unit $U_2$, the position code is interposed between the initial of the file name of the level-"2" unit U and its extension. Thus the file name of a level-"2" unit U, too, defines the position of that unit U. Also, as can be seen from the path of the unit $U_2$, only a single subdirectory exists between the root ("¥map") and the file name. The number of subdirectories defines which level the unit U belongs to. In the case of the unit $U_2$, since the number of subdirectories between the root and the file name is 1, it is known that the unit $U_2$ (M0401.map) belongs to the level "2".

According to the rules above, other paths at the level "2" are represented as: "¥MAP¥D0000¥M0000.map,"
"¥MAP¥D0000¥M0001.map"
"¥MAP¥D0000¥M0007.map,"
"¥MAP¥D0000¥M0100.map"
"¥MAP¥D1606¥M0001.map"
"¥MAP¥D01606¥M0401.map"
"¥MAP¥D1606¥M0707.map" . . .

Similarly, the group of units related to the level-"2" unit $U_2$ as their parent unit PU are stored below directories (logic regions) below the subdirectory "¥D0401." For example, the unit $U_1$ is one of the child units CU of the unit $U_2$ and corresponds to the position code "0503" among the units U formed by dividing the unit $U_2$ into 64. Therefore the path for the unit $U_1$ is represented as "¥MAP¥D1606¥D0401¥M0503.map." Similarly, the paths of the level-"1" units related to the unit $U_2$ as their parent unit PU are: "¥MAP¥D1606¥D0401¥M0000.map,"
"¥MAP¥D1606¥D0401¥M0001.map" . . .
"¥MAP¥D1606¥D0401¥M0707.map."

Further the group of units U related to the unit $U_1$ as their parent unit PU are stored in directories (logic regions) immediately below the subdirectory "¥MAP¥D1606¥D0401¥D0503." Among the units U formed by dividing the unit $U_1$ into 64, the unit $U_0$ belonging to this group corresponds to the position code "0201." Therefore the path of the unit $U_0$ is: "¥MAP¥D1606¥D0401¥D0503¥M0201.map." Similarly, the paths of the level-"0" units related to the unit $U_1$ as their parent unit PU are:
"¥MAP¥D1606¥D0401¥D0503¥M0000.map,"
"¥MAP¥D1606¥D0401¥D0503¥M0001.map". . .
"¥MAP¥D1606¥D0401¥D0503¥M0707.map."

The hierarchical structure realized with the cartographic files CF and their file names have been described. Digital data is generated on the basis of the unit described so far and necessary management information is added to the data to form one cartographic file CF (see FIG. 7 for details). In the description below, unit data means digital data representing a unit U. That is to say, one cartographic file CF contains one piece of unit data. Next, the data structure of the cartographic file CF is described in detail.

<Data Structure of the Cartographic File CF>

Figure 6:
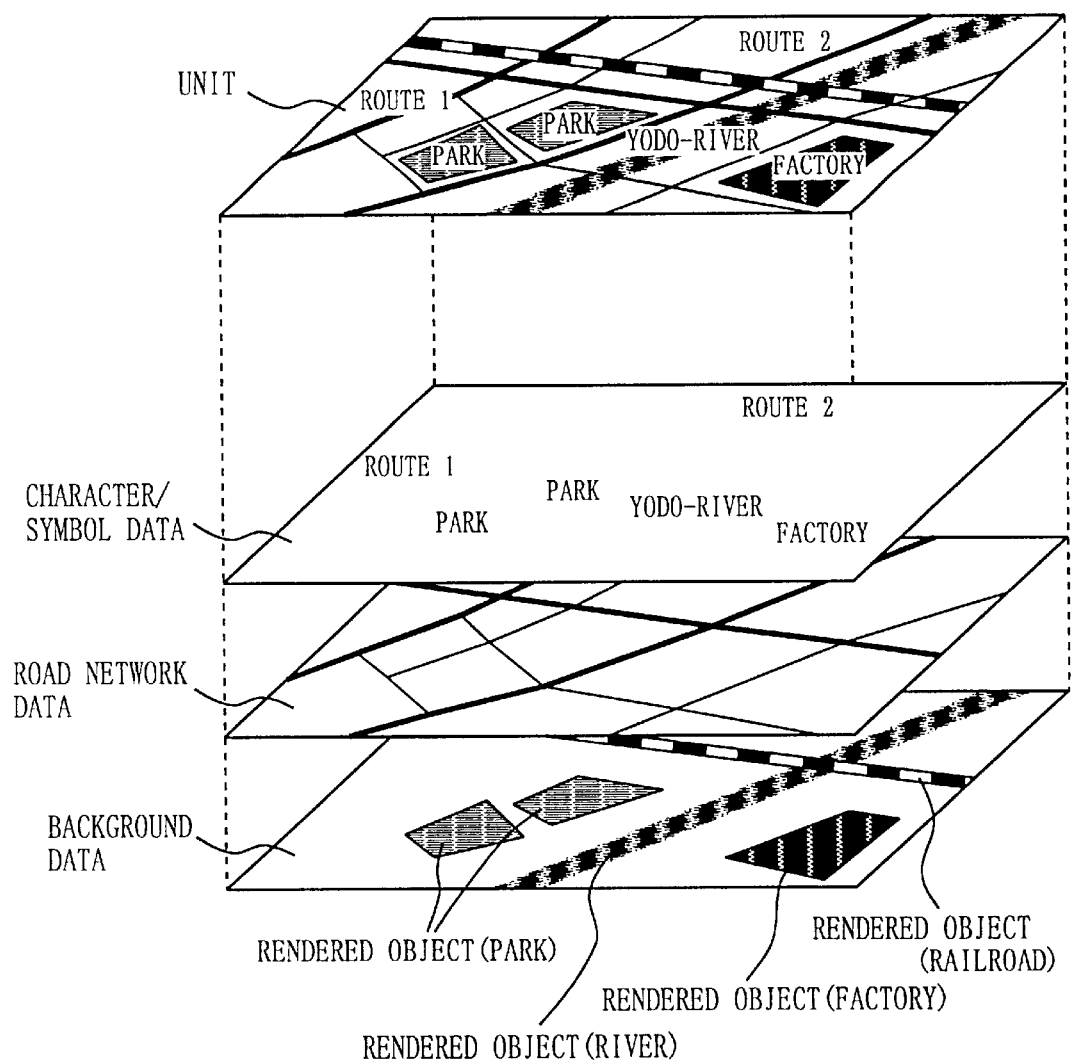
FIG. 6 is a diagram showing the data structure of one unit U belonging to a certain level.
Figure 7:
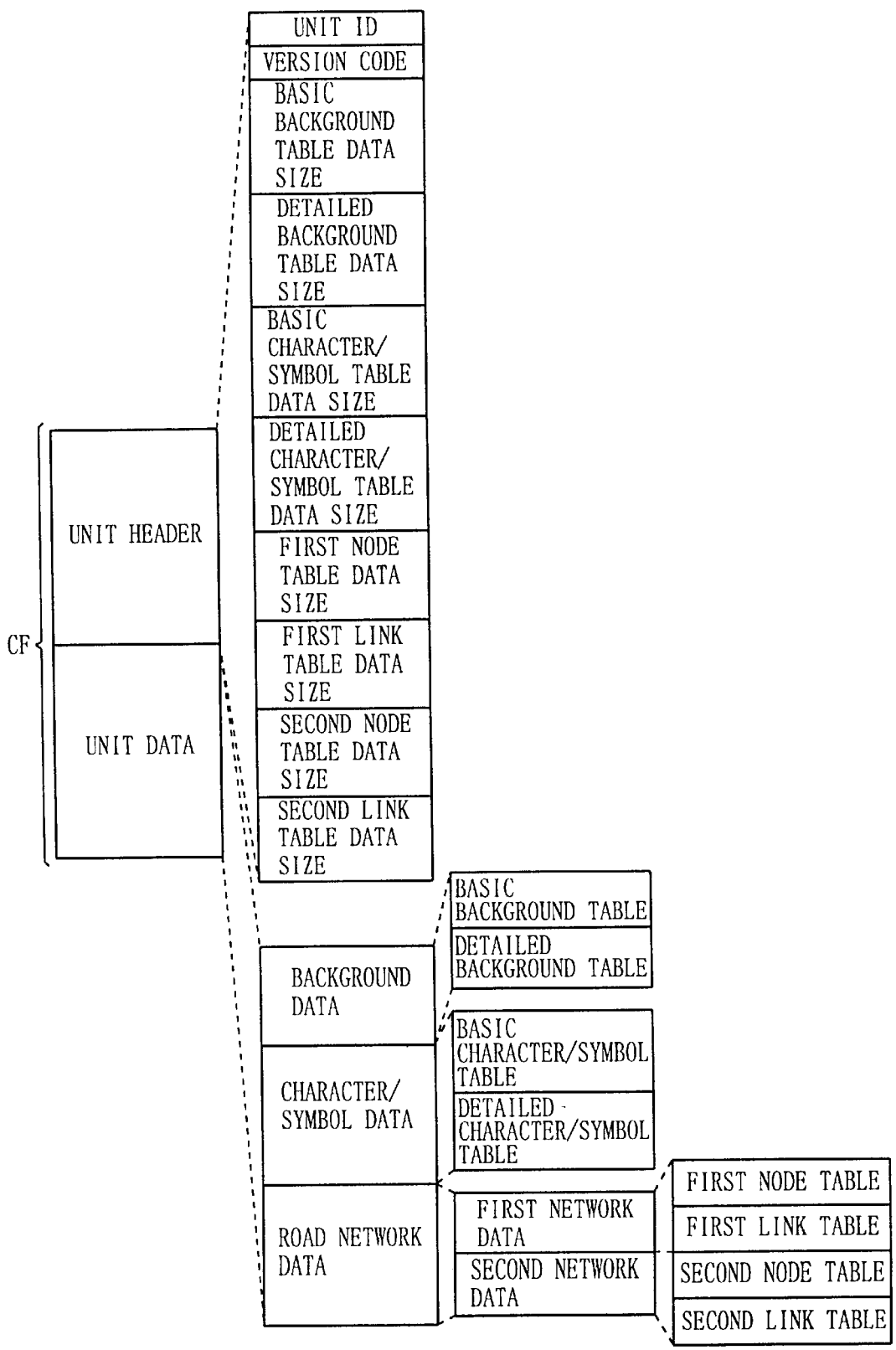
FIG. 7 is a diagram showing the data structure of a cartographic file CF.

FIG. 6 is a diagram used to explain a map rendered on the basis of one cartographic file CF. FIG. 7 shows the data structure of one cartographic file CF. Basically, as shown in FIG. 7, the cartographic file CF includes a unit header and unit data. The unit data is described first. Generally, as shown in FIG. 7, a map is formed with a background, roads, map symbols and characters, according to its usage. The cartographic files CF are mainly used to present an image on the display of the terminal device 1 or used in map matching or route search process. For example, while the route search process requires information about connections among roads, the background is not much required in this process. Therefore, as shown in FIG. 6, a piece of unit data is divided into character/symbol data, road network data and background data. This allows the character/symbol data, road network data and background data to be used individually. The character/symbol data includes data which represents character strings described on the map which the unit U covers (the names of places, intersections, etc.) and data which represents map symbols described on that map. The road network data is graphic data which represents roads shown on the map of the unit U and the connections among them. The background data is graphic data which represents the background on the map the unit U covers, such as water systems, mountains, buildings, etc. Examples of the background include rivers, lakes, mountains, green belts, railroads, buildings, bridges, and parks. The character/symbol data, the road network data and the background data are displayed in a superimposed manner to show the background, roads, map symbols and characters by the unit data.

Next, the data structure of the background data is explained in detail referring to FIGS. 7 and 8. As shown in FIG. 7, the background data is composed of a basic background table and a detailed background table. As can be clearly seen from FIG. 8(a), the basic background table is a group of graphic data which is used as the base when displaying the background of the map, which shows a river, a railroad, and a green belt, for example. On the other hand, as is clear from FIG. 8(b), the detailed background table is a group of graphic data which is used to display greater details of the background of the map, such as bridges, buildings, etc. As is clear from FIG. 7, the basic background table and the detailed background table are separately recorded in the unit data. Furthermore, information which would be referred to by each other is not recorded in the basic background table and the detailed background table. That is to say, the background data in the detailed background table is never referred to during the process of drawing the background data of the basic background table. At the same time, the background data in the basic background table is never referred to during the process of drawing the background data of the detailed background table. The basic background table and the detailed background table thus have their own independent data structures.

Accordingly, the background expressed by the basic background table alone can be displayed on the display, as shown in FIG. 8(a). Then the user of the terminal device 1 can see a schematic map. The background expressed by the basic background table and the detailed background table can also be displayed as shown in FIG. 8(c). In this case, on the basis of a given origin, the detailed background extracted from the detailed background table is superimposed on the rough background extracted from the basic background table. The user of the terminal device 1 can then see a detailed map. This embodiment shows an example in which the background data includes the basic background table and the detailed background table; however, when the first storage device 19 or the second storage device 24 has limited storage capacity, the background data may be formed with only the basic background data, so as to achieve size reduction of the first database 111 or the second database 25. On the other hand, when the background data is formed with the basic background table and the detailed background table as explained in this embodiment, the center station 2 can provide a detailed map to the terminal device 1, which allows the terminal device 1 to display a detailed map on the display.

The above-described basic background table and detailed background table have the same internal data structure. Their data structure is now described in greater detail, where the basic background table and the detailed background table are generically referred to as a background table.

Figure 9:
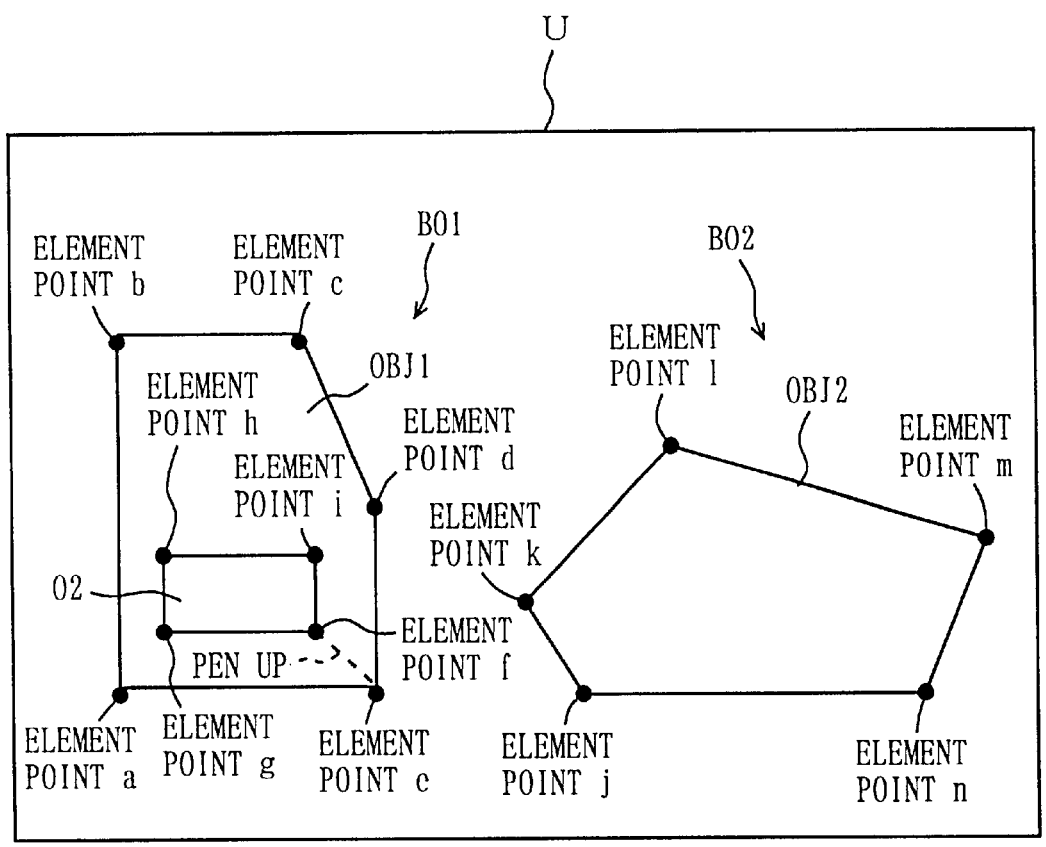
FIG. 9 is a diagram showing rendered objects BO1 and BO2, which is used to explain the concept of the rendered objects.

As already stated, the background table is a group of graphic data used to draw the background of a map on the display. The graphic data express rivers, parks, factories, railroads, etc. on the display. The elements of the background of the map, i.e. rivers, parks, factories, railroads, etc., are generically referred to as rendered objects hereinafter. FIG. 9 is a diagram showing the concept of the rendered objects. As is clear from the description above, a rendered object represents an object which shows something meaningful by itself, like a park, factory, etc., whose data structure includes element points arranged to express the object with a bent line. For example, FIG. 9 shows a rectangular unit U. The area covered by the unit U contains two rendered objects DO1 and DO2. The rendered object DO1 includes objects OBJ1 and O2. The object OBJ1 corresponds to the region surrounded by the bent line drawn with one stroke in the following order: element point a→ element point b→ element point c→ element point d→ element point e→ element point a→ . The object OBJ2 corresponds to the region surrounded by the bent line drawn with one stroke in the following order: element point f→ element point g→ element point h→ element point i→ element point f. The rendered object DO2 includes an object OBJ3. The object OBJ3 corresponds to the region surrounded by the bent line drawn with one stroke in the following order: element point j→ element point k→ element point l→ element point m→ element point n→ element point j. As is clear from this, a rendered object of this embodiment is composed of one or more objects formed by connecting a plurality of element points with one stroke.

Figure 10:
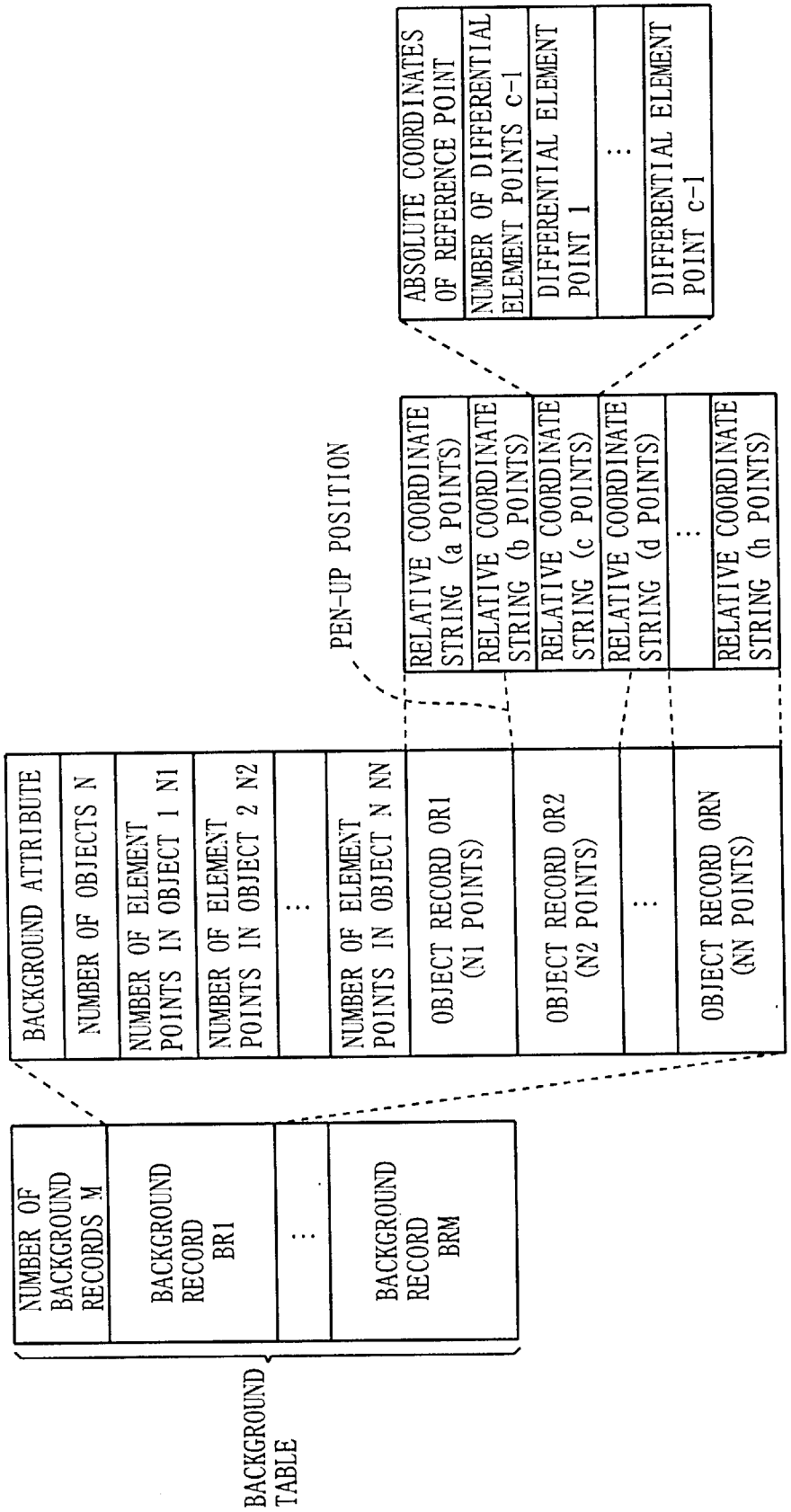
FIG. 10 is a diagram showing the detailed data structure of a background data table.

FIG. 10 is a diagram showing the detailed data structure of the background table, i.e. the basic background table or the detailed background table. In FIG. 10, the background table contains the number of background records M and M pieces of background records BR1 to BRM. M is a natural number of 1 or larger. The number of background records M is information indicating the number of background records BR1 to BRM contained in the background table. The background record BR1 contains the background attribute, the number of objects N, the numbers of element points in the objects OBJ1 to ON, N1 to NN, and the object records OR1 to ORN.

The background attribute is information about attribute of the background expressed by the objects OBJ contained in the background record BR1. More specifically, the background attribute contains a color code and texture mapping code of the objects OBJ in the background record BR1. As one feature of this embodiment, the background attribute describes only one color code or texture mapping code. That is to say, for example, a color code representing blue and a color code representing red are never described together in the background attribute. Only the color code "blue" or the color code "red" is described in the background attribute.

The number of objects, N, is information indicating the number of objects OBJ contained in the background record BR1. The number of element points, N1, shows the number of element points forming the object OBJ1. The number of element points, N2, shows the number of element points forming the object OBJ2. Similarly, the number of element points NN shows the number of element points of the object OBJN. In this way, the background record BR1 contains the numbers of element points forming N pieces of objects 0 contained therein. N is a natural number of 1 or larger.

The object record OR1 is information indicating the coordinates of the element points forming one object OBJ1. It should be noted that, since the object OBJ1 contains a plurality of element points, the object record OR1 contains a plurality of sets of coordinate information. That is to say, the object record OR1 describes information about a string of coordinates. As is clear from this, the number of pieces of the coordinate information described in the object record OR1 corresponds to the number of element points N1. The object record OR2 is information about a string of coordinates of the element points forming the object OBJ2. The number of pieces of the coordinate information described in the object record OR2 is equal to the number of element points, N2. Similarly, the object record ORN is information indicating a string of coordinates of the NN element points forming the object OBJN. The number of pieces of the coordinate information described in the object record ORN corresponds to the number of element points, NN.

As described above, each object record OR describes a string of coordinates of the element points forming the object OBJ. The string of coordinates may be expressed by the absolute coordinates in the unit U or by the relative coordinates, i.e. a difference between the coordinates of an element point and those of the preceding element point. The absolute coordinates, which define the element points on the basis of a given origin in the unit $U_1$ require a large number of bits. Therefore, in order to reduce the data size of the cartographic file CF, it is preferable to use the relative coordinates to represent the string of coordinates. The absolute coordinates and the relative coordinates are now described in detail.

Figure 12:
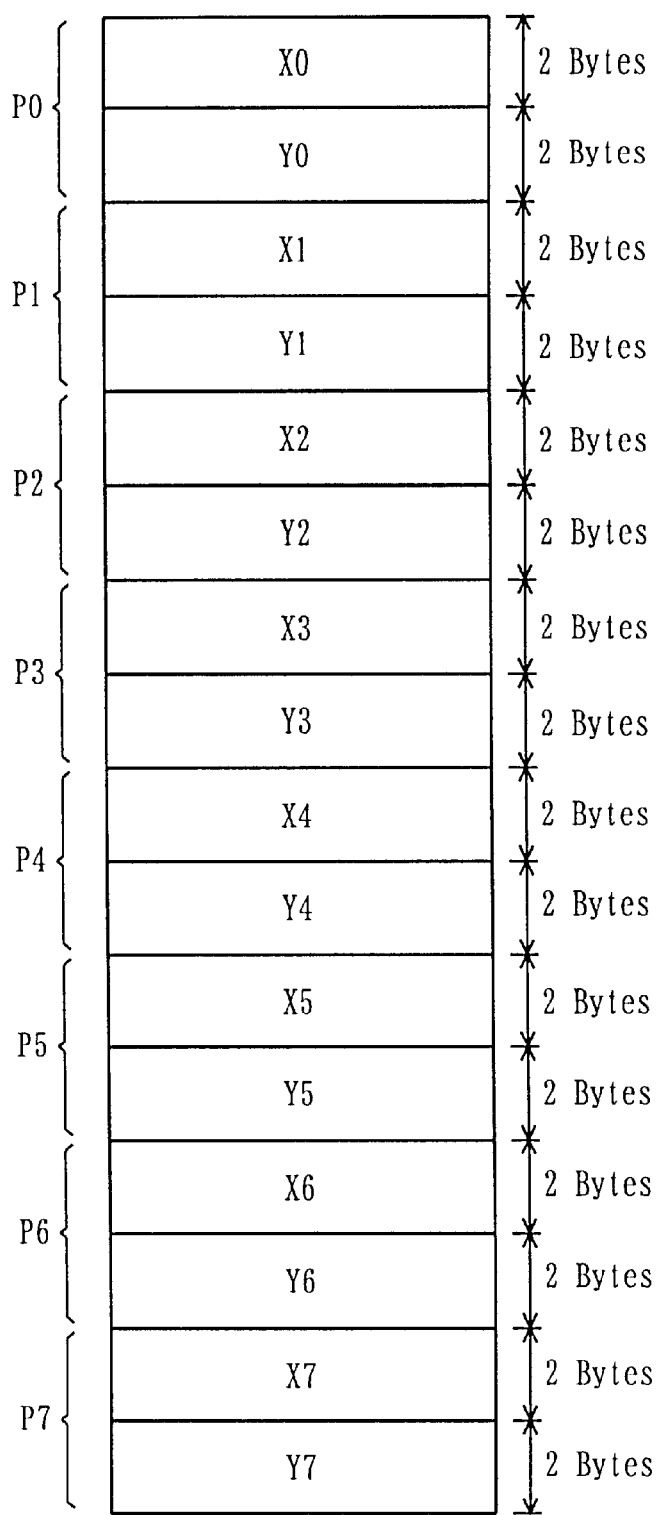
FIG. 12 is a diagram showing the data structure in which the absolute coordinates of P0 to P7 of FIG. 11 are described in an object record.

FIG. 11 is a diagram used to explain the fact that the absolute coordinates require a large number of bits. FIG. 11 shows graphic data composed of the eight element points P0 to P7. The element point P0 is defined by the absolute coordinates (X0, Y0) on the basis of a predetermined origin. Similarly, the element points P1 to P7 have their absolute coordinates (X1, Y1) to (X7, Y7). FIG. 12 is a diagram showing the absolute coordinate information about the points P0 to P7 described in the object record OR. Now, in the absolute coordinates of each of the element points P0 to P7, the coordinate in the east longitude direction (x-axis direction) and that in the north latitude direction (y-axis direction) are each expressed in 2 bytes in this example; in this case, describing the absolute coordinate information about the points P0 to P7 in the object record OR requires 32 bytes.

FIG. 13 shows the element points P0 to P7 of the same graphic data of FIG. 11 with the relative coordinates. In FIG. 13, the graphic data is drawn by connecting the element points with one stroke in the following order: P0→P1→P2→P3→P4→P5→P6→P7. In the relative coordinate representation, as in the absolute coordinate representation, the first element point P0 in the stroke is represented as (X0, Y0) on the basis of a given origin. However, while the next element point P1 is represented as (X1, Y1) in the absolute coordinate representation, the relative coordinates represent the element point P1 as (ΔX1, ΔY1). Where ΔX1 is defined as ΔX1=X1−X0 and ΔY1 as ΔY1=Y1−Y0. Other element points P2 to P7, too, are each represented by using the difference between their absolute coordinates and the absolute coordinates of the preceding element point.

Figure 14:
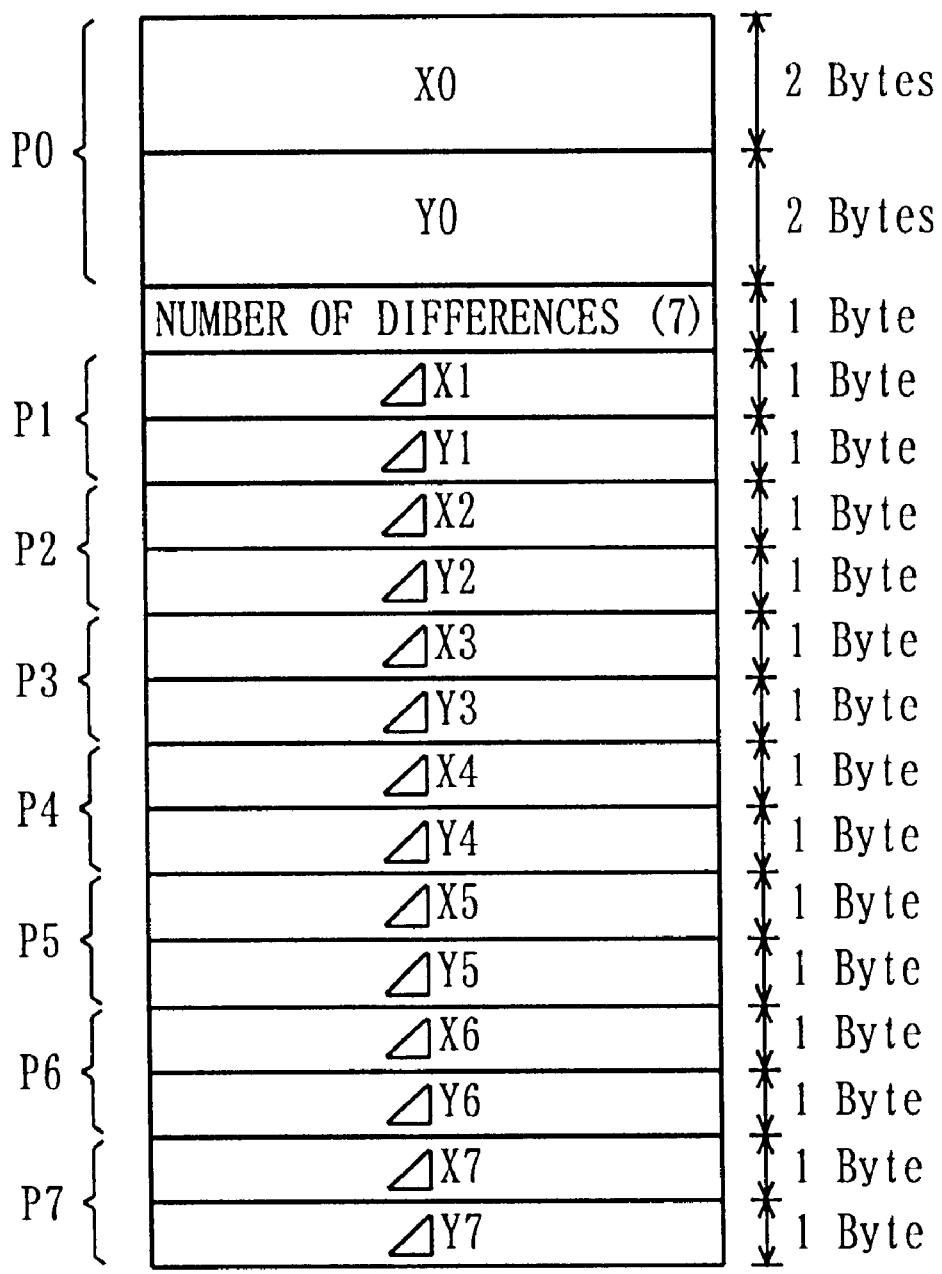
FIG. 14 is a diagram showing the data structure in which the relative coordinates of the element points P0 to P7 of FIG. 13 are described in the object record.

FIG. 14 is a diagram showing the data structure where the relative coordinate information about the element points P0 to P7 is described in the object record OR. It should be noted that, in the relative coordinate representation, ΔX1<<X1, ΔX2<<X2 . . . ΔX7<<X7, since they are represented as differences between their absolute coordinates and the absolute coordinates of the preceding element points. Similarly, ΔY1<<Y1, ΔY2<<Y2 . . . ΔY7<<Y7. Accordingly, in the relative coordinates of the element points P1 to P7, the coordinate in the east longitude direction (x-axis direction) and that in the north latitude direction (y-axis direction) are each expressed not in 2 bytes but in 1 byte. As a result, describing the relative coordinate information about the element points P1 to P7 in the object record OR requires 14 bytes. However, since the first element point P0 has to be described by its absolute coordinates, describing the coordinate information about the element points P0 to P7 in the object record OR requires 19 bytes, including the information about the number of differences (7).

Figure 15:
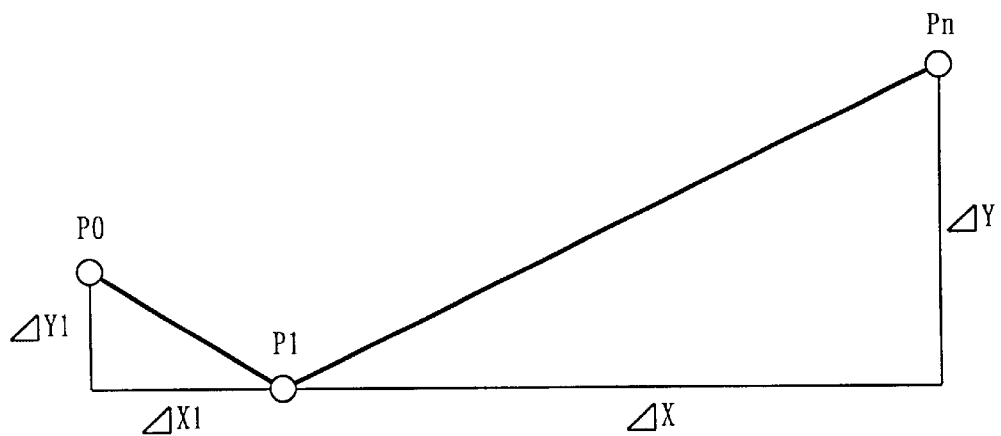
FIG. 15 is a diagram showing an object OBJ composed of element points P0, P1 and Pn.
Figure 16:
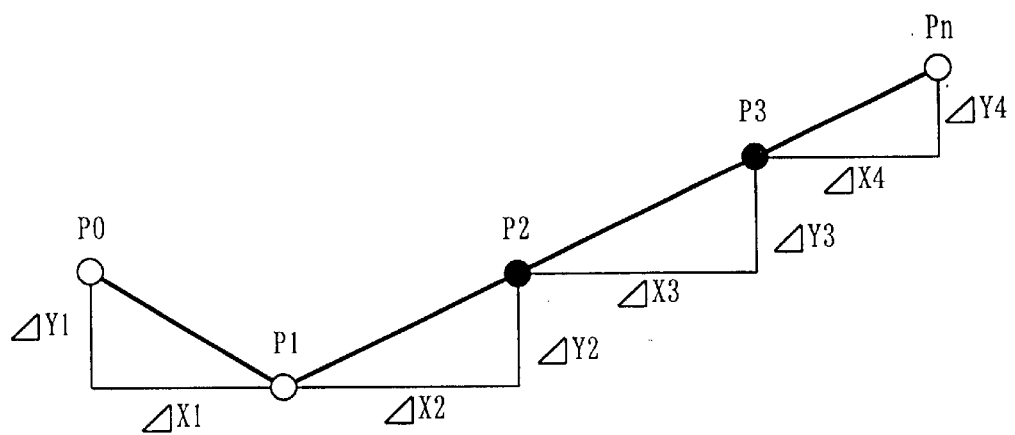
FIG. 16 is a diagram showing supplementary element points P2 and P3 set on the straight line connecting the element points PI and Pn of FIG. 15.

As described referring to FIGS. 11 to 14, the element points P in the object OBJ can be expressed in a smaller-sized object record OR by using the relative coordinates, than by using only the absolute coordinates. However, when the element points of the object OBJ are unconditionally represented by the relative coordinates, the data size will not be reduced in some cases. This problem is now described referring to FIG. 15. FIG. 15 shows an object OBJ composed of element points P0, P1 and Pn. The element point P1 is represented by the relative coordinates (ΔX1, ΔY1). It is assumed that ΔX1 and ΔY1 can be represented in one byte each. Similarly, the element point Pn is represented by the relative coordinates (ΔXn, ΔYn). It is assumed, however, that ΔXn and/or ΔYn cannot be represented in one byte since the element point Pn is so distant from the preceding element point P 1. In such a case, as shown in FIG. 16, new element points P2 and P3 must be set on the straight line connecting the element points P1 and Pn. Then the relative coordinates of the element point Pn is represented as (ΔX4, ΔY4) with respect to the absolute coordinates of the preceding element point P3. The coordinates ΔX4 and ΔY4 can be represented in one byte each, since the element point P3 is closer to the element point Pn than the element point P1. When the relative coordinate information about the element points P0, P1, P2, P3 and Pn is described in the object record OR, 13 bytes are required as shown in FIG. 17.

Figure 17:
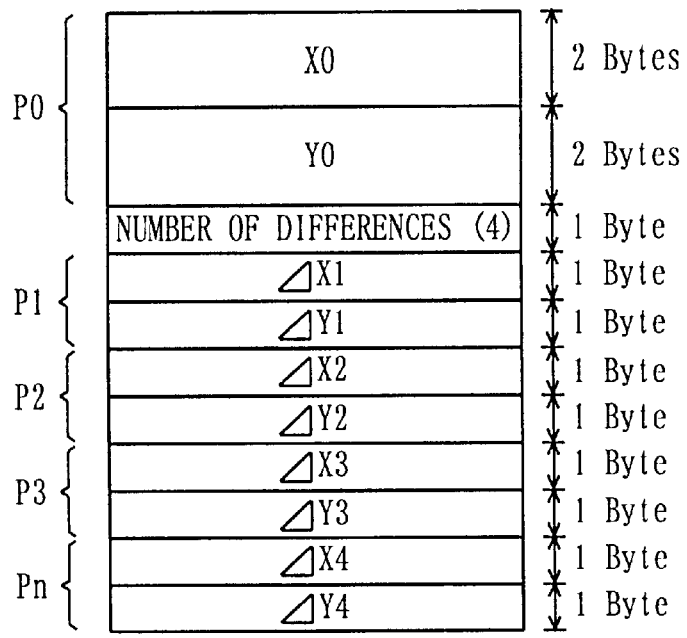
FIG. 17 is a diagram showing the data structure in which the relative coordinate information about the element points P0, P1, P2, P3 and Pn of FIG. 16 is recorded in the object record.

As described referring to FIGS. 15 to 17, new element points P must be provided when two element points P are located at a distance.

Figure 18:
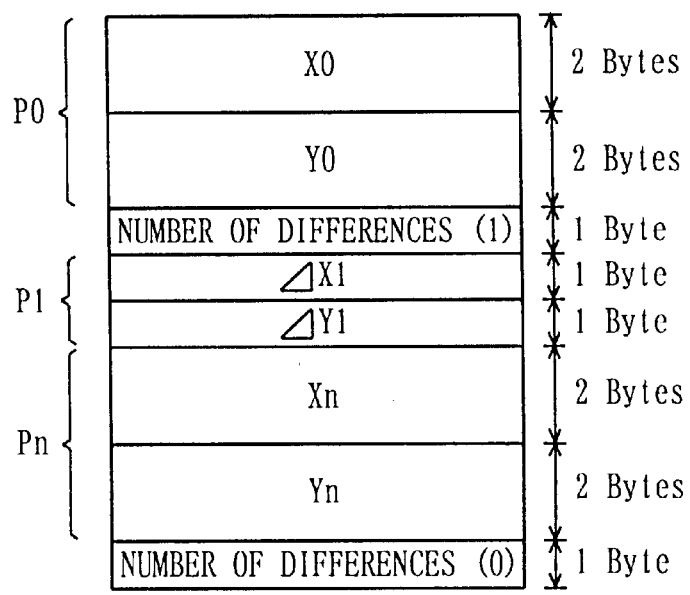
FIG. 18 is a diagram showing the data structure of the object record OR in which the element points P0 and Pn of FIG. 15 are represented by their absolute coordinates and the element point P1 is represented by its relative coordinates.

As a result, it is necessary to describe the relative coordinate information about the supplementary element points P in the object record OR. In this way, when all of the element points P other than the first element point P are represented by the relative coordinates, the number of element points P may be unnecessarily increased, which will unnecessarily increase the data size of the object record OR. It is therefore effective to represent the element points P0 and Pn of FIG. 15 by their absolute coordinates and the element point PI by the relative coordinates with respect to the element point P0. Now, assuming that the absolute coordinates (Xn, Yn) of the element point Pn can be represented in 4 bytes, the coordinate information about PO, P1 and Pn is described in the object record OR as shown in FIG. 18. In FIG. 18, the absolute coordinate information about the element points P0 and Pn is each represented in 4 bytes and the relative coordinate information about the element point P1 is represented in 2 bytes. Further, 2 bytes are used to represent the information about the number of differences which shows how many relative coordinates have been produced on the basis of P0 and Pn represented by the absolute coordinates. The data size of the object record OR is thus 12 bytes in total. This data size is smaller than that of the object record OR represented only by the relative coordinates, i.e., 13 bytes (see FIG. 17).

As has been described referring to FIG. 18, an element point far off from the preceding element point is represented by the absolute coordinates. In this way, in this embodiment, while an element point is mainly represented by the relative coordinates, another element point is represented by the absolute coordinates. This reduces the data size of the object record OR.

Further, as already stated, the relative coordinate representation is applied also to the boundaries between objects in this embodiment. The boundary between objects means a part where pen-up occurs from one element point P of one object OBJ and pen-down occurs onto one element point P of another object OBJ. The application of the relative coordinate representation of this embodiment provides the technical effect of reducing the data size of the background table. Now, first, in order to clearly show this technical effect, an example in which the relative coordinate representation is not applied to the boundary between objects will be described referring to FIGS. 19 and 20. FIG. 19 shows a rendered object DO3. The rendered object BO3 includes objects OBJ3 and OBJ4. The object OBJ3 is formed with six element points P0 to P5. The object OBJ4 is formed with four element points P6 to P9.

Figure 20:
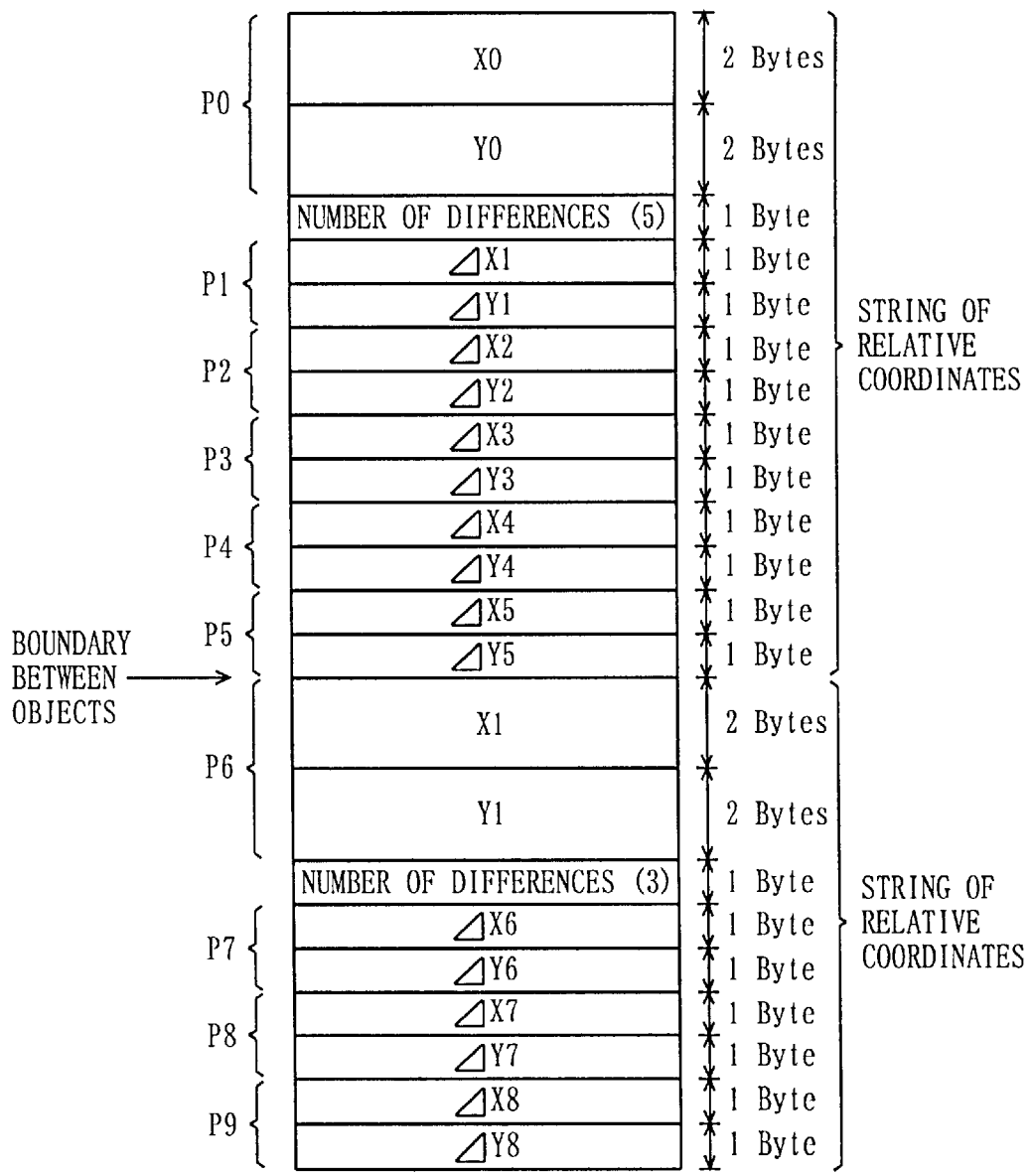
FIG. 20 is a diagram showing the data structure of a string of coordinates about the rendered object DO3, where the relative coordinates are not applied to the boundary between the objects.

The object OBJ3 is drawn by connecting the element points with one stroke in the following order: P0→P1→P2→P3→P4→P5→P0. Then pen-up occurs at the element point P0 and pen-down occurs at the element point P6. The object OBJ4 is then drawn by connecting the element points with one stroke in the following order: P6→P7→P8→P9→P6. At this time, when the relative coordinates are not applied to the boundary between the objects, the coordinate data structure of the element points P0 to P5 and the element points P6 to P9 is generated as shown in FIG. 20. In FIG. 20, first, the absolute coordinates (X0, Y0) of the element point P0 used as the reference point of the object OBJ3 are described in four bytes. When drawing the object OBJ3, pen-down occurs at the element point P0 and then the element points P1 to P5 are traced before pen-up, so that the number of differences (i.e. the number of relative coordinate sets) is 5, which is 1-byte information. Next, the relative coordinates of the element points P1 to P5 are represented in two bytes as stated above, as (ΔX1, ΔY1) to (ΔX5, ΔY5). Since the relative coordinate representation is not applied to the boundary between the objects, the relative coordinates of the element point P5 are followed by the 4-byte absolute coordinates (X1, Y1) of the element point P6 which is used as the reference point of the object OBJ4. When drawing the object OBJ4, pen-down occurs at the element point P6 and then the element points P7 to P9 are traced before pen-up, so that the number of differences (the number of relative coordinate sets) is 3, which is 1-byte information. This is followed by the relative coordinates of the element points P7 to P9 each in two bytes, as (ΔX6, ΔY6) to (ΔX8, ΔY8). Thus, when the relative coordinate representation is not applied to the boundary between the two objects, the string of relative coordinates representing the objects OBJ3 and OBJ4 are expressed in 26 bytes.

Figure 21:
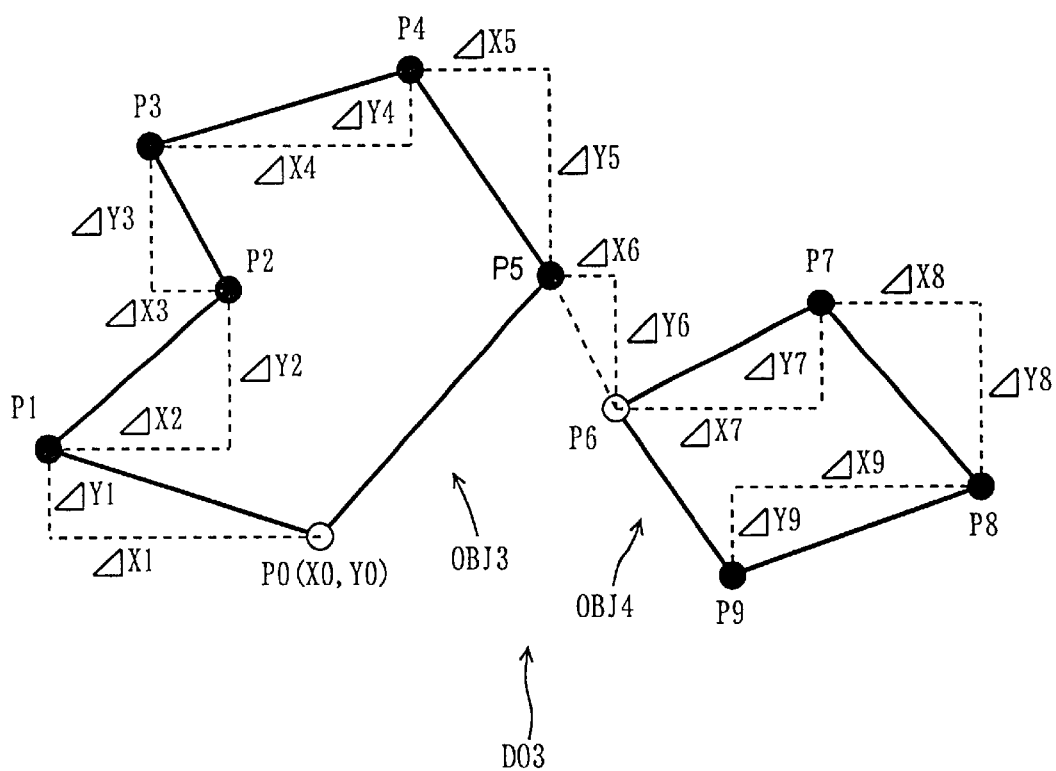
FIG. 21 is a diagram showing the rendered object DO3, which is used to explain the relative coordinates applied to the boundary between the objects.
Figure 22:
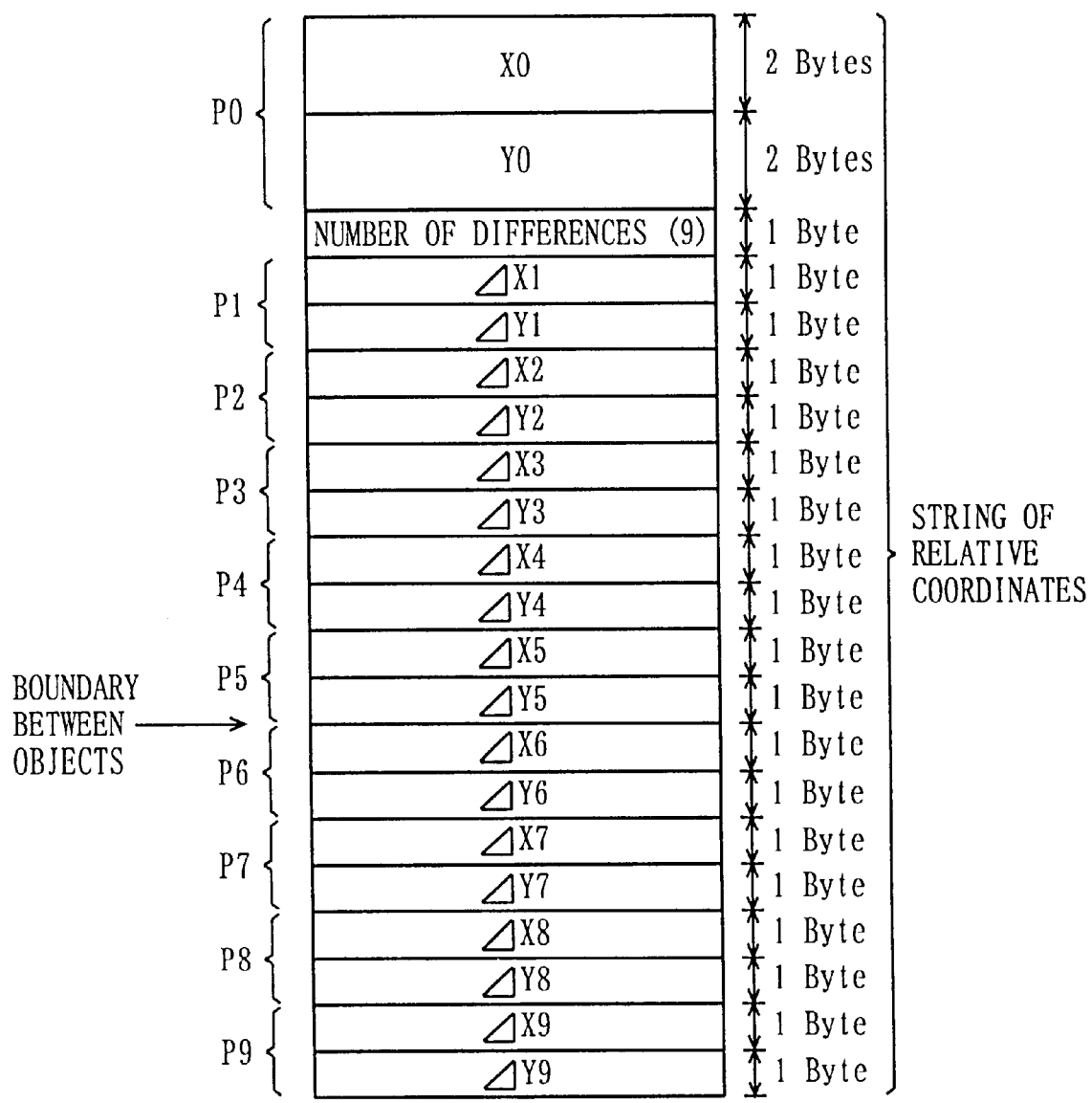
FIG. 22 is a diagram showing the data structure of a string of coordinates about the rendered object DO3, where the relative coordinates are applied to the boundary between the objects.

Next, an example in which the relative coordinate representation is applied to the boundary between objects will be described referring to FIGS. 21 and 22. Like FIG. 19, FIG. 21 shows the rendered object DO3 including two objects OBJ3 and OBJ4. The rendered object DO3 is drawn by connecting the element points with one stroke in the following order: P0→P1→P2→P3→P4→P5. Then pen-up and pen-down occur from the element point P5 to the element point P6 and the rendered object DO3 is then drawn by connecting the element points with one stroke in the following order: P6→P7→P8→P9→P6. In drawing, there is a basic rule that the starting point of one stroke should be connected to the pen-up point, so that the element point P5 and the element point P0 are connected by a line. At this time, when the relative coordinate representation is applied to the boundary between the objects, the coordinate data structure of the element points P0 to P5 and P6 to P9 is generated as shown in FIG. 22. In FIG. 22, first, the absolute coordinates (X0, Y0) of the element point P0 used as the reference point of the object OBJ3 is described in four bytes. When drawing the rendered object DO3, the one stroke starts at the element point P0 and traces the element points P1 to P9 before it is completed, so that the number of relative coordinates, i.e. the number of differences, is 9, which is 1-byte data. Each set of relative coordinates of the element points P1 to P9 is expressed in two bytes as stated above, as (ΔX1, ΔY1) to (ΔX9, ΔY9). Thus, when the relative coordinate representation is applied to the boundary between the two objects, the string of relative coordinates showing the objects OBJ3 and OBJ4 are expressed in 23 bytes.

As has been described above referring to FIGS. 19 to 22, the background table can be smaller in size when the relative coordinate representation is applied to the boundary between objects, than when it is not applied thereto.

Note that the boundary between the objects of FIG. 20 can be found from the absolute coordinates described in the object record OR. In FIG. 22, however, the boundary between the objects cannot be found from the absolute coordinates. This is because the pen-up element point P and the pen-down element point P which define the boundary between the objects may be represented, as shown in FIG. 21, by the relative coordinates; further, when two points are far from each other, the element point P may be represented by the absolute coordinates as shown in FIG. 18. However, in FIG. 22, the boundary between the objects can be correctly identified by referring to the numbers of element points, N1 to NN, shown in FIG. 10. That is to say, in this embodiment, the number of element points N1 to NN each show the number of element points which are traced with one stroke between pen-down and pen-up. Accordingly, in actual drawing operation, the number of coordinates is counted from the beginning of the object record OR and the border of the first object can be correctly identified when the counted value is the same as the number of element points N1. Similarly, when the counted value is the same as the sum of the numbers of element points N1 and N2, the border of the second object can be specified. Subsequently, similarly, the border of an Nth object can be identified when the counted value is the same as the sum of the numbers of element points N1 to NN.

(Detailed Data Structure of the Character/Symbol Data)

Next, the character/symbol data shown in FIG. 7 is described. It is briefly described because the character/symbol data is not a characteristic point of this invention. As already stated, the character/symbol data is composed of data about the character strings described on the map which the unit U covers (the names of places, roads, intersections, etc.) and data about the map symbols described on the map. As shown in FIG. 7, the character/symbol data includes a basic character/symbol table and a detailed character/symbol table. The basic character/symbol table is a group of data which represents basic ones of the character strings and map symbols described on the map the unit U covers. More specifically, as clearly shown in FIG. 23(a), the basic character/symbol table contains character strings and map symbols which schematically show the map the unit U covers, which may include the names of rivers and roads, map symbols, etc. The detailed character/symbol table is a group of data which represents character strings and map symbols which are not described in the basic character/symbol table among the character strings or map symbols described on the map covered by the unit U. More specifically, as clearly shown in FIG. 23(b), the detailed character/symbol table contains character strings and map symbols which show more details of the map the unit U covers, such as the names of parks, railroads, bridges, factories, etc.

The terminal device 1 of this embodiment is supposed to be a car navigation system as stated above. For this reason, it has been described that the basic character data table contains the names of rivers and roads, map symbols, etc., which are important for car navigation. However, the terminal device 1 can be used for other purposes. Thus, the contents of the character strings and map symbols recorded in the basic character/symbol table and the contents of the character strings and map symbols recorded in the detailed character/symbol table depend on the application of the terminal device 1. It should hence be understood that the technical scope of this invention is not limited to the description which says that the names of rivers and roads, map symbols etc., are recorded in the basic character/symbol data table.

As can be clearly seen from FIG. 7, the basic character/symbol table and the detailed character/symbol table are recorded in different fields in the unit data. Further, no information which would be referred to by each other is recorded in the basic character/symbol table and the detailed character/symbol table. That is to say, none of the character strings or map symbols in the detailed character/symbol table is referred to during the process of drawing the character strings or map symbols in the basic character/symbol data table. Conversely, none of the character strings and map symbols in the basic character/symbol table is referred to during the process of drawing the character strings and map symbols in the detailed character/symbol table. In this way, the basic character/symbol table and the detailed character/symbol table have their own independent data structures. Therefore, as shown in FIG. 23(a), the character strings and map symbols represented by the basic character/symbol table alone can be shown on the display. This allows the user of the terminal device 1 to see a schematic map. Further, as shown in FIG. 23(c), it is also possible to display the character strings and map symbols of the basic character/symbol table and the detailed character/symbol table. In this case, on the basis of a given reference origin, the character strings and map symbols extracted from the detailed character/symbol table are superimposed on the schematic character strings and map symbols extracted from the basic character/symbol table. This allows the user of the terminal device 1 to see a detailed map. This embodiment has shown an example in which the character/symbol data is composed of the basic character/symbol table and the detailed character/symbol table; however, when, for example, the first storage device 19 or the second storage device 24 has limited storage capacity, the character/symbol data may be formed of only the basic character/symbol table, in order to achieve size reduction of the first database 111 or the second database 25. On the other hand, when the character/symbol data is composed of the basic character/symbol table and the detailed character/symbol table as described in this embodiment, the center station 2 can provide the terminal device 1 with a detailed map, allowing the terminal device 1 to display a detailed map on the display.

The basic character/symbol table and the detailed character/symbol table have the same internal data structure. Now, generically referring to the basic character/symbol table and the detailed character/symbol table as a character/symbol table, their data structure is described in greater detail.

Figure 24:
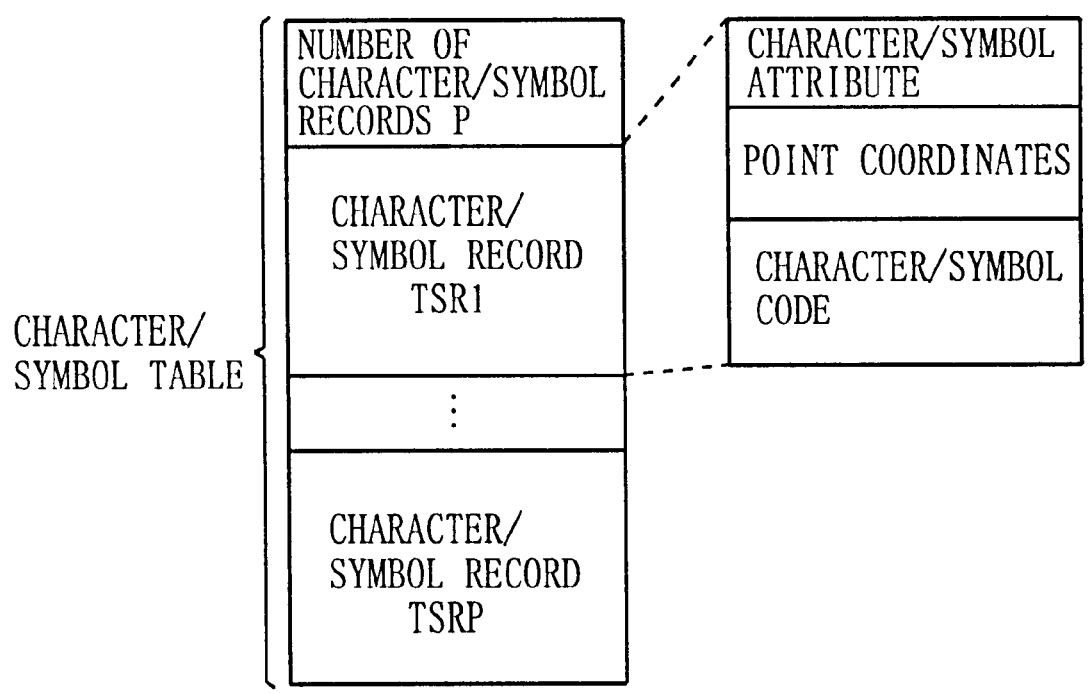
FIG. 24 is a diagram showing the detailed data structure of the character/symbol table.

As stated above, the character/symbol table is a group of data for showing, on the display, character strings and map symbols on the map the unit U covers. FIG. 24 is a diagram showing the detailed data structure of the character/symbol table, i.e. the basic character/symbol table or the detailed character/symbol table. In FIG. 24, the character/symbol table contains the number of character/symbol records P and P pieces of character/symbol records TSR1 to TSRP. The number of character/symbol records P is information indicating the number of character/symbol records TSR1 to TSRP contained in the character/symbol table. P is a natural number of 1 or larger, indicating the total number of the character strings and map symbols on the map the unit U covers. The number of the character/symbol records TSR1 to TSRP is equal to the number of character strings and map symbols on the map of the unit U. The character/symbol record TSR1 includes the character/symbol attribute, point coordinates, and a character/symbol code.

The character/symbol attribute contains information indicating attributes of the character string or map symbol represented by the character/symbol record TSR1. The character/symbol attribute includes information indicating the size of the character string or map symbol and the direction in which the character string is arranged (vertical/horizontal). It should be noted that, for the map symbol, one object is hardly represented by a plurality of symbols, and the names of some places are expressed by one character. In such a case, it is not necessary to record the information showing the direction of the character string arrangement (vertical/horizontal) in the character/symbol attribute. The point coordinates are coordinate information which specifies the position where the character string or map symbol of the character/symbol record TSR1 is displayed on the unit U. The character string or the like represented by the character/symbol record TSR1 is displayed on the display in the position specified by the point coordinates. The character/symbol code is the code number of the character string or map symbol represented by the character/symbol record TSR1. The code number of the character string typically includes the shift JIS code in Japan, which is recorded as information corresponding to the size of the character string which is recorded in the character/symbol attribute. Since there is no standard like the shift JIS about the map symbols, they are created originally. For the code numbers of the map symbols, unused code numbers in the shift JIS are used in Japan. The allotted code number is recorded as the character/symbol code.

Other character/symbol records TSR2 to TSRP are not described herein since they have the same data structure as the character/symbol record TSR1.

(Detailed Data Structure of the Road Network Data)

Next, the road network data shown in FIG. 7 is described. While the road network data is used to display roads on the display in the terminal device 1 as a car navigation system, it is also used for the purposes of map matching, route search or route guide. Therefore, as stated before, the road network data is a group of data which includes graphic data for representing roads shown on the map the unit U covers and data for showing the connections among the roads. More specifically, since the road network data is used for map matching etc., it contains not only the graphic data representing the road network configuration but also data representing the connections among the roads shown on the map in the area the unit U covers.

As shown in FIG. 7, the road network data includes first network data and second network data. The first network data contains road network data about highways. The highways mean roads which satisfy any of the three conditions below. The first condition defines roads constructed by a local government or a higher administrative organization (freeways and national roads). The second condition defines roads constructed by an administrative organization lower than the local government (freeways and national roads) and private roads which have a width of 5.5 meters or larger. The third condition defines roads connected to roads which satisfy the first and second conditions. The second network data contains road network data about streets. The streets are roads, other than the highways, which have a width of 3.0 meters or larger (for example, roads constructed around houses). However, the definitions of the highways and streets are mere examples and other definitions can be adopted. It should therefore be understood that the technical scope of this invention is not limited to the above description which says that the road network data defined as above are recorded in the first and second road network data.

Figure 25:
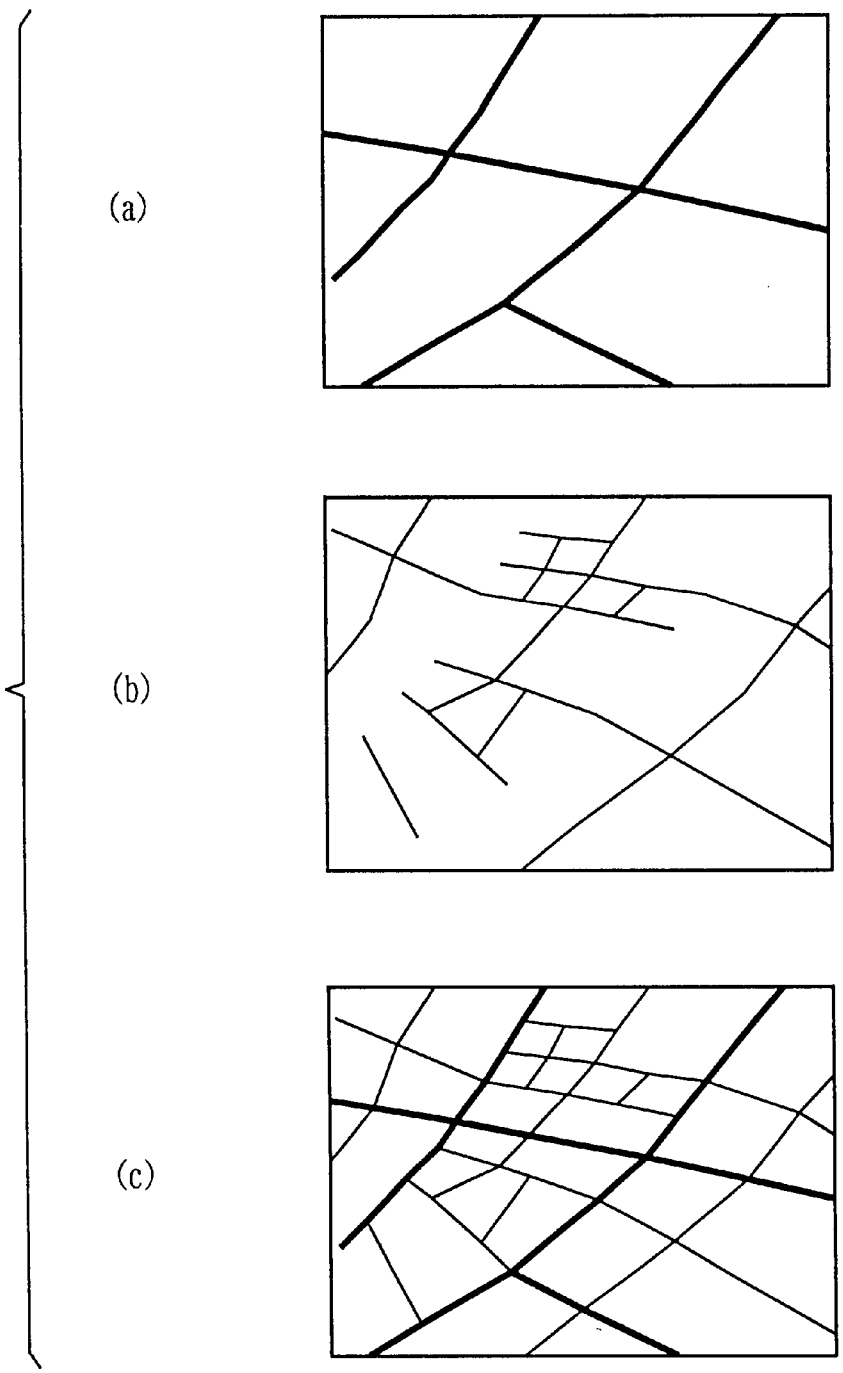
FIG. 25 is a diagram used to explain the relation between first road network data and second road network data.

Next, the relation between the first road network data and the second road network data is described referring to FIG. 25. The first road network data includes road network data about highways. Hence, when the first road network data is displayed on the display of the terminal device 1, figures representing highways are displayed as shown in FIG. 25(*a*). The second road network data is road network data about streets. Hence, when the second road network data is displayed on the display of the terminal device 1, figures representing streets are displayed as shown in FIG. 25(*b*). As is clear from FIG. 7, the first and second road network data are separately recorded in the unit data. It is therefore possible to display, on the display of the terminal device 1, only the highways of the first road network data as shown in FIG. 25(*a*). This allows the user of the terminal device 1 to see a schematic road network. It is also possible to display the highways and streets of the first and second road network data as shown in FIG. 25(*c*). In this case, the street network of the second road network data is superimposed on the highway network of the first road network data on the basis of a given reference origin. The user of the terminal device 1 can thus see a detailed road network. This embodiment describes that the road network data is composed of first and second road network data; however, for example, when the first storage device 19 or the second storage device 24 has limited storage capacity, the road network data may be composed of only the first road network data, so as to achieve size reduction of the first database 111 or second database 25. On the other hand, when the road network data includes the first and second road network data as in this embodiment, the center station 2 can provide a detailed road network to the terminal device 1, which allows the terminal device 1 to display a detailed road network on the display.

The first and second road network data have the same data structure. The structure of the first and second road network data will be described in greater detail.

As is known, road network data is mainly formed with nodes and links. The node is data which mainly represents an intersection or a section point on a road. The link is data which expresses a road connecting two intersections. The nodes and links are used to display, on the display of the terminal device 1, the configuration of roads in the map of the unit U (highways or streets) and the connections among the roads. As shown in FIG. 7, the first road network data includes a first node table and a first link table, and the second road network data includes a second node table and a second link table. The data structure of the first and second node tables is now described.

Figure 26:
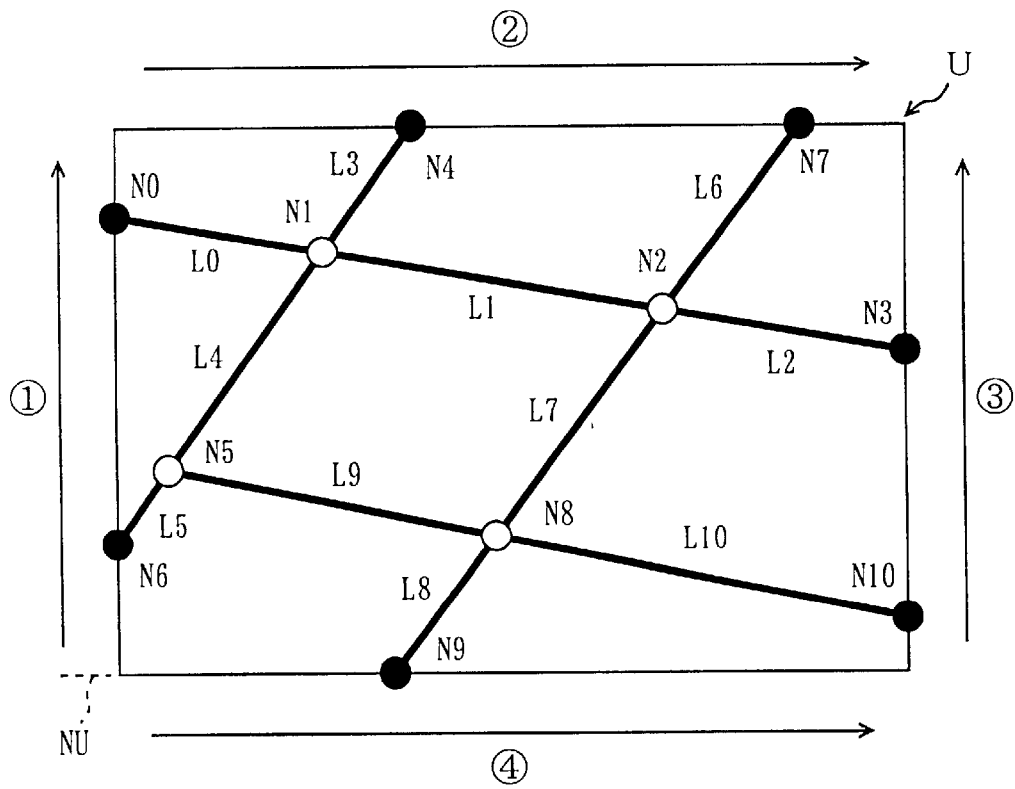
FIG. 26 is a diagram used to explain the concept of nodes and links.

FIG. 26 is a diagram used to explain the concept of the nodes and links. FIG. 26 shows a road network in the area one unit U covers. The road network of FIG. 26 is formed with 11 nodes N0 to N10 and 11 links L0 to L10. The 11 nodes N0 to N10 are generally classified into non-neighboring nodes and neighboring nodes. The non-neighboring node is a node which is generated at an ordinary intersection or at a point where the road type or attribute changes (which corresponds to the aforementioned section point), which stands for a branching point representing the connection between the roads in the unit U. Now, some units U at the same level adjoin the unit U of FIG. 26 (see FIG. 2). Therefore one road may pass through a plurality of adjacent units U. In the description below, for the sake of convenience, the units U which adjoin the unit U of FIG. 26 are referred to as neighboring units NU. FIG. 26 shows one of the neighboring units NU with a dotted line. When a road passes over the boundary between the unit U of FIG. 26 and a neighboring unit NU, a neighboring node is formed on the boundary of the unit U (i.e. on a side of the rectangular area), which point represents the connection of road between the unit U and the neighboring unit NU. According to this definition, the four nodes N1, N2, N5 and N8 of FIG. 26 (shown by ○) are classified as the non-neighboring nodes. Also, the seven nodes N0, N3, N4, N6, N7, N9 and N10 (shown by ●) are classified as the neighboring nodes. It should be noted that when a node N representing an intersection or a section point of a road is located on the boundary of the unit U. a problem arises as to whether this node N should be classified as a neighboring node or as a non-neighboring node. In such a case, for one measure, the node N representing an intersection or a section point of the road may be shifted from the boundary to form a new non-neighboring node. For another measure, a non-neighboring node may be formed at the same coordinates as the intersection or the section point of the road located on the boundary of the unit U. As is clear from this, a neighboring node should not be formed on the boundary of the unit U.

Figure 27:
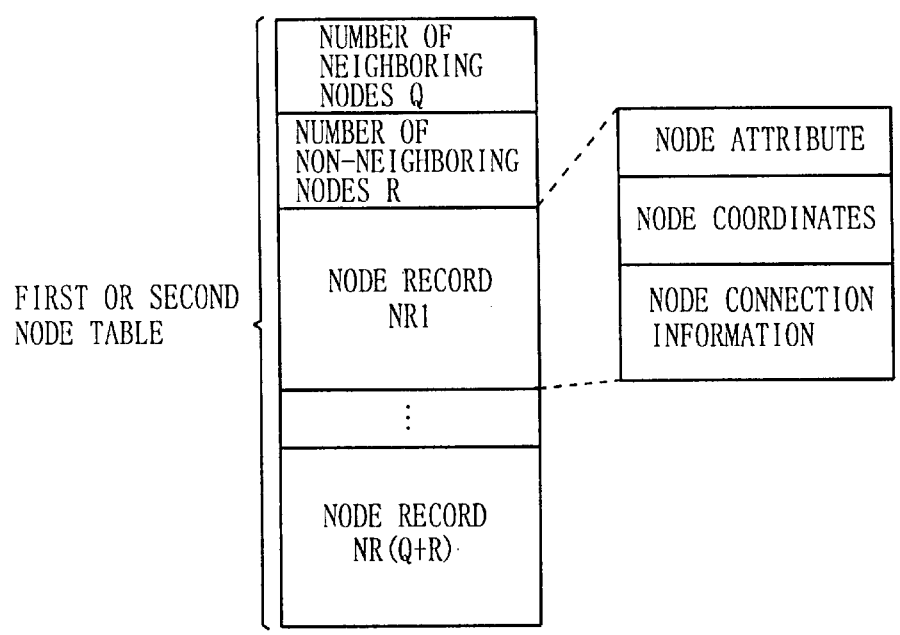
FIG. 27 is a diagram showing the detailed data structure of a first node table.

FIG. 27 is a diagram showing the detailed data structure of the first node table. Note that the first and second node tables have the same data structure but they differ in that they are generated for highways and streets, respectively. Therefore, for simplicity, the second node table is not fully described herein. Now, in FIG. 27, the first node table contains the number of neighboring nodes, Q, the number of non-neighboring nodes, R, and (Q+R) pieces of node records NR1 to NR(Q+R). The number of neighboring nodes, Q, is information which shows the number of neighboring nodes contained in the first node table. Q is a natural number of 1 or larger, which shows how many neighboring nodes are present on the road network in the map of the unit U. The number of non-neighboring nodes, R, is information which shows the number of non-neighboring nodes contained in the first node table. R is a natural number of 1 or larger, which shows how many non neighboring nodes exist on the road network in the map of the unit U.

The number of the node records NR1 to NR(Q+R) is equal to the number of nodes N present on the road network of the map of the unit U. The node records NR1 to NR(Q+R) contain information about the (Q+R) nodes N.

Next, how the node records NR1 to NR(Q+R) are arranged in this embodiment is described. In the first node table, the first Q node records NR1 to NRQ contain information about the Q neighboring nodes and the following R node records NR(Q+1) to NR(Q+R) contain information about the R non-neighboring nodes.

In the Q node records NR1 to NRQ, first, the information about the neighboring nodes located on the left side (see ①) of FIG. 26) of the rectangular area (unit U) is recorded at the beginning. This is followed by the information about the neighboring nodes located on the upper side of the rectangular area (see ② of FIG. 26). This is further followed by the information about the neighboring nodes on the right side of the rectangular area (see ③ of FIG. 26) Finally, the information about the neighboring nodes on the lower side of the rectangular area is recorded (see ④ of FIG. 26).

The node records NR of the neighboring nodes on the right side or left side are arranged in the order of ascending latitudes. The node records NR of the neighboring nodes on the upper side or lower side are arranged in the order of ascending longitudes.

Further, the node records NR of the non-neighboring nodes are, at first, arranged in the order of ascending latitudes. If some non-neighboring nodes are at the same latitude, these node records NR are arranged in the order of ascending longitudes of the non-neighboring nodes.

Figures 28, 29:
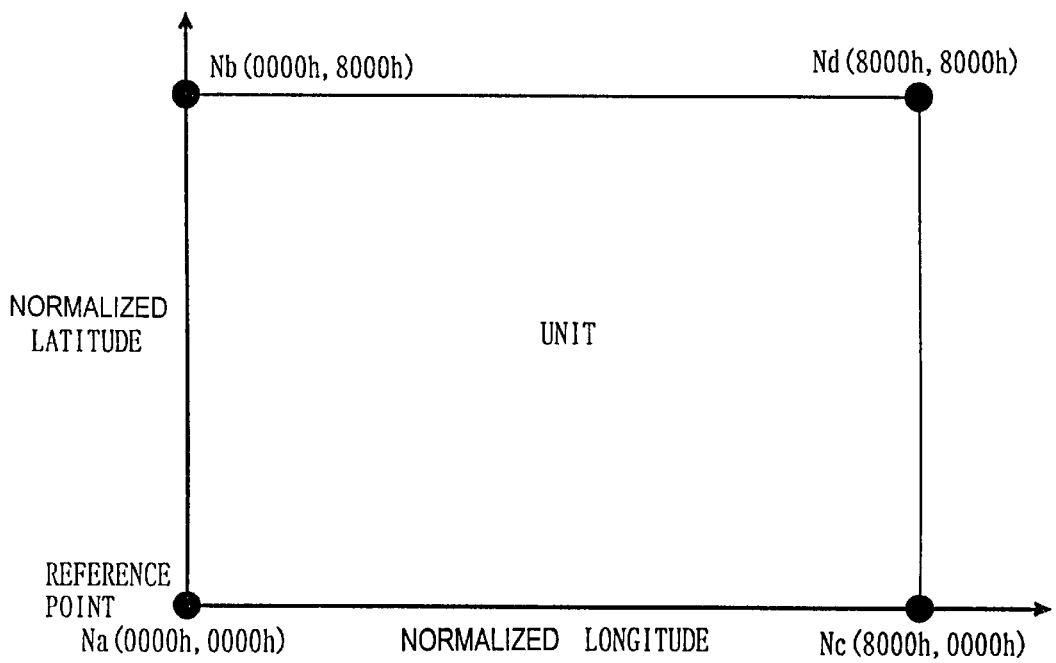
FIG. 28 is a diagram showing an order in which the node records NR1 to NR11 about the nodes N0 to N10 of FIG. 26 are arranged.
FIG. 29 is a diagram used to explain a normalized coordinate system which is a method for representing the coordinates of nodes in the longitude and latitude directions.

For the nodes N0 to N10 of FIG. 26, according to the rules, the information about the neighboring node N6 is recorded in the first node record NR1 as shown in FIG. 28. The information about the neighboring node N0 is recorded in the next node record NR2. The pieces of information about the neighboring nodes N4, N7, N10, N3 and N9 are recorded in the node records NR3, NR4, NR5, NR6 and NR7, respectively. Signs ① to ④ of FIG. 28 correspond to ① to ④ of FIG. 26, which show the order in which the neighboring nodes are arranged. The information about the non-neighboring node N8 is recorded in the next node record NR8. The pieces of information about the non-neighboring nodes N5, N2 and N1 are recorded in the node records NR9, NR10 and NR11, respectively. In this embodiment, the information pieces about the nodes N contained in the unit U are thus recorded in the node records NR not at random but in the order according to the rules above. In the description below, node record numbers are numbers which specify where the node record NR2 and others are recorded, counted from the first node record NR1 numbered 0. When the node record number is applied to the node records NR1 to NR11 of FIG. 28, the node record numbers of the node records NR1 to NR11 are "0" to "10." This arrangement produces the effects that the connection of a road passing over the unit U and the neighboring unit NU can be traced at high speed and that the nodes and links can be properly associated with each other between parent/child units U; these processes and effects will be fully described later.

Referring to FIG. 27 again, the internal data structure of the node record NR1 is described in detail. The node record NR1 includes node attributes, node coordinates and node connection information. The node attributes are information indicating attributes of the node recorded in the node record NR1. Examples of the node attributes include information indicating whether the traffic is regulated at the intersection of the recorded node, information indicating whether the intersection represented by the node has a name, and information indicating whether the intersection represented by the node has traffic signals. When the information about the traffic regulation or as to whether the intersection has a name is recorded as the node attribute, tables like an intersection regulation table and intersection name table are separately generated to record the information, though they are not explained in this embodiment.

The node coordinates are information which represents the coordinates in the longitude and latitude directions of the node recorded in the node record NR1. While the absolute longitude and latitude coordinates may be recorded as the coordinates of the node in the longitude and latitude directions, they are usually represented in a coordinate system in which the longitude and latitude widths of the area of the unit U are normalized with values of 2-bytes or so, on the basis of the lower left corner of the unit U (rectangular area) containing the recorded node. For example, as shown in FIG. 29, with the lower left corner Na of the unit U represented by coordinates (0000h, 0000h) (where h indicates a hexadecimal value), the coordinate system of the unit U is normalized with 8000h in both of the longitude and latitude directions. In this case, the coordinates of the upper left corner Nb of the unit are represented as (0000h, 8000h). The coordinates of the lower right corner Nc of the unit are (8000h, 0000h). The coordinates of the upper right corner Nd of the unit are (8000h, 8000h).

The node connection information is information indicating the connection between the node N recorded in the node record NR1 and a link L recorded in a link record LR described later. The node connection information will be fully described later.

The internal data structure of other node records NR2 to NR(Q+R) is not described herein because it is the same as that of the node record NR1. However, note that the other node records NR2 to NR(Q+R) contain information about different nodes N.

Figure 30:
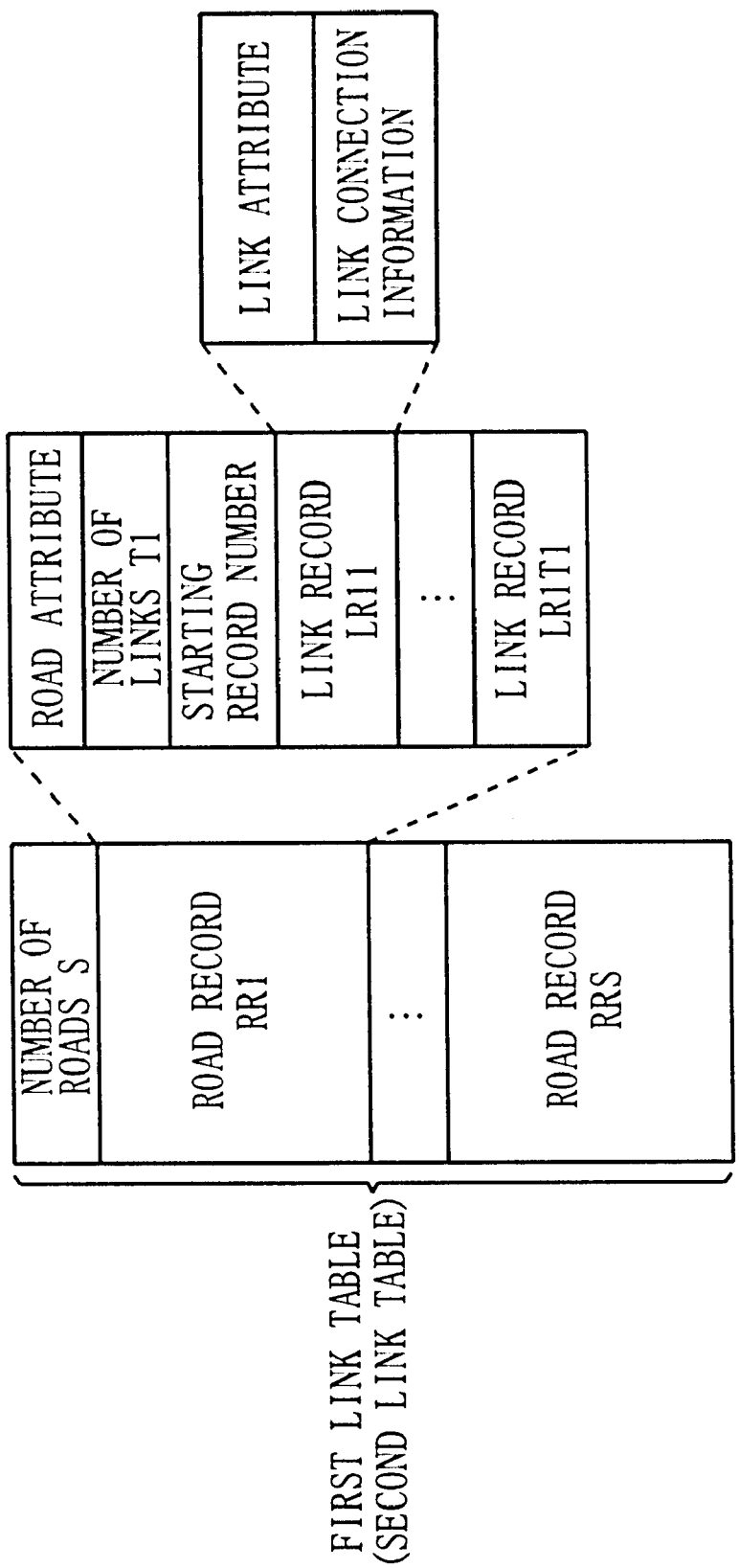
FIG. 30 is a diagram showing the detailed data structure of a first link table.

Next, the data structure of the first link table of FIG. 7 is described. Note that the first and second link tables have the same data structure and they differ from each other in that they are respectively generated for highways and streets. Therefore the second link table is not described in detail below. FIG. 30 is a diagram showing the detailed data structure of the first link table. In FIG. 30, the first link table contains the number of roads S and S road records RR1 to RRS. The number of roads S is information which shows the number of roads contained in the road network expressed by the first node table. S is a natural number of 1 or larger, which shows how many roads exist in the road network on the map represented by the unit U. One road attribute is allotted to the road record RR1; information about links L and nodes N having this same road attribute is recorded in the road record RR1. Another road attribute is assigned to the road record RR2 and information about links L and nodes N having this same road attribute is recorded in the road record RR2. Similarly, one road attribute which has not been assigned to other road records RR1 to RR(S-1) is assigned to the road record RRS, and information about links L and nodes N having this same road attribute is recorded therein. Different road attributes are thus assigned to the road records RR to RRS. The road attribute is information for classifying the roads by type. Typically, the roads are classified into freeway, national road, prefectural road, city road, private road, etc, which are further classified by name. If necessary, information about one-way traffic regulation, etc., may be adopted as the road attribute.

The road record RR1 contains the road attribute, the number of links T1 the starting node record number, and T1 link records LR1 to LRT1. The road attribute is information which shows the road type (freeway, national road, prefectural road etc.), one-way regulation, etc. The number of links T1 is information indicating the number of links L recorded in the road record RR1. T1 is a natural number of 1 or larger, which shows how many links L of the road attribute information exist in the road network on the map of the unit U. The starting node record number is the node record number which specifies a given node record NR. As explained referring to FIG. 28, etc., the node record numbers specify where the node record NR2 and others are recorded, counted from the first node record NR1 numbered "0." The aforementioned certain node record NR is the record which contains the node N located at the beginning of the road network expressed by the road record RR1. The link record LR1 contains information about one of the links L classified by the road attribute in the road network on the map of the unit U. The link record LR1 contains link attribute and link connection information. The link attribute is information indicating the attribute of the link L expressed by the link record LR1. The link attribute typically includes the link type (main link, side link, etc.) or the number of lanes. The link connection information is information about a node(s) N connected to the link(s) L of the link record LR1, or about a link L connected to the link L of the link record LR1 through the node(s) N. The link record LR2 contains information about another one of the links L classified by the road attribute. Similarly, the link record LRT1 contains information about one link L among the links L classified by the road attribute which has not been recorded in other link records LR(T1-1). Like the link record LR1, the link records LR2 to LRT also contain the link attribute and link connection information. Information about different links L are thus recorded in the link records LR1 to LRT1.

Next, a specific example of the information recorded in the first link table is described about the road network of FIG. 26. As stated above, the road network of FIG. 26 contains the 11 nodes N0 to N10 and the 11 links L0 to L10. For clear description, it is assumed that the links L0 to L2 are connected in the order of L0→L1→L2 to form one road (e.g. a national road) starting from the node N0. Under this assumption, the links L0 to L2 have the same road attribute (national road). It is also assumed that the links L3 to L5 are connected in the order of L3→L4→L5 to form one road (e.g. a prefectural road) starting from the node N4. Under this assumption, the links L3 to L5 have the same road attribute (prefectural road). It is also assumed that the links L6 to L8 are connected in the order of L6→L7→L8 to form one road (e.g. a private road having a width of 5.5 meters or larger) starting from the node N7. Under this assumption, the links L6 to L8 have the same road attribute (private road). It is also assumed that the links L9 and L10 are connected in the order of L9→L10 to form one road (e.g. a city road) starting from the node N5. Under this assumption, the links L9 and L10 have the same road attribute (city road).

Under these assumptions, there are four roads, i.e. national road, prefectural road, private road and city road, so that "4" is recorded as the number of roads, S, in the first link table. For the road attribute, since there are four kinds of roads, i.e. national road, prefectural road, private road and city road, four road records RR1 to RR4 are recorded in the first link table. The road record RR1 is described first. Information representing "national road" is recorded as its road attribute. For the number of links T1, information showing "3" is recorded since the national road is formed with the links L0 to L2. The starting point of the road of the links L0 to L2 is represented by the node N0. The node N0 has the record number "1"(see FIG. 28). Therefore "1" is recorded as the number of the starting node N. Next, in the link record LR11 (the record of the link L0), the link attribute is not explained here.

The link connection information recorded in each link record LR and the node connection information shown in FIG. 27 are now described. At the same time, operation of tracing the connection between the nodes N and links L will be described. For example, in FIG. 26, the node N2 is connected with the four links L1, L2, L6 and L7. The four links L1, L2, L6 and L7 are thus connected with each other at the node N2. The information about the node N2 is recorded in the node record NR10 (see FIG. 27). Information pieces about the links L1, L2, L6 and L7 are recorded in the link records LR12, LR13, LR31 and LR32, respectively (see FIG. 31). Information for tracing the links L1, L2, L6 and L7 connected to the node N2 is recorded in the node connection information in the node record NR10 (see FIG. 27) and in the link connection information in the link records LR12, LR13, LR31 and LR32 (see FIG. 31). First, information for enabling reference to the link record LR12 in which the first link L connected to the node N2 (it is assumed to be the link L1) is recorded in the node record NR10 as the node connection information. More specifically, the node connection information may be the offset address from the beginning of the link table to the link record LR12, or it may be the link record number of the link record LR12. Now, the link record numbers are numbers which specify where the link record LR12 and others are recorded in the link table, counted from the first link record LR11 numbered "0." When the link record numbers are assigned to the link records LR of FIG. 31, the link record numbers "0" to "3" are assigned to the link records LR11 to LR13. The link record numbers "4" to "6" are assigned to the link records LR21 to LR23. The link record numbers "7" to "9" are assigned to the link records LR31 to LR33. Further, the link record numbers 10 and 11 are assigned to the link records LR41 and LR42.

Now, it should be noted that the offset address and link record number are recorded in the node connection information only when the road network is traced within the same unit U. Similarly, for the link connection information, the offset address and node record number are referred to only when the road network is traced within the same unit U. The offset address and the link record number are not referred to in a process where the connection is traced in a road network extending over a boundary between a unit U and a neighboring unit NU, which will be fully described later referring to FIGS. 37 and 38.

Figure 32:
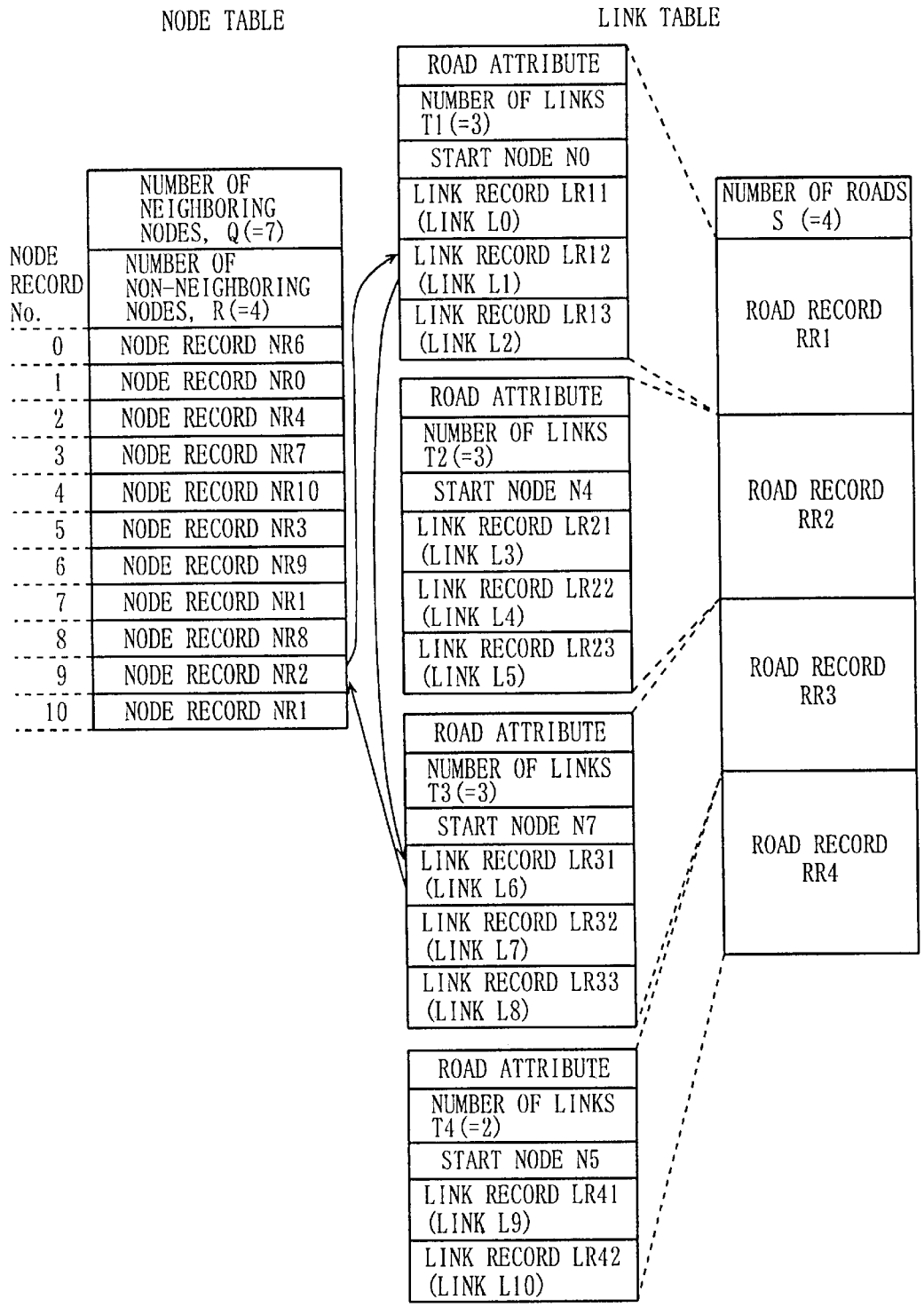
FIG. 32 is a diagram used to explain a process in which the connection of road network is traced on the basis of node connection information and the link connection information.

In the example of FIG. 32, the node connection information in the node record NR10 contains the offset address to the link record LR12 or the link record number of the link record LR12, so that the link record LR12 in the link table can be referred to from the node record NR10. Also, in the example of FIG. 32, since the link record LR31 is referred to from the link record LR13, the offset address to the link record LR31 or the link record number of the link record LR31 is recorded in the link connection information in the link record LR12, so as to enable reference to the link L6 connected to the link L1. The node connection information in the node record NR10 and the link connection information in the link record LR12 show that the link L1 is connected with the link L6 at the node N2.

Now, it should be noted that the link connection information of the link record LR12 contains a flag which shows that this link connection information is related to another link L, as well as the link record number or offset address.

It should also be noted that the link connection information for reference to a link L recorded in the same road record RR is not recorded in the link record LR. This is because links L belonging to the same road record RR can be traced on the basis of the arrangement of the link records LR, without the need to refer to the link connection information. That is to say, the link record LR11 and the link record LR12 are recorded in the successive address regions in the road record RR1, which shows that the link L1 and the link L2 are connected with each other. Similarly, in the road record RR3, the link records LR31 and LR32 are recorded in the successive address regions, which shows that the link L6 and the link L7 are connected with each other.

The link L6 recorded in the link record LR31, which is referred to next to the link record LR12, is not connected to any link L other than those in the road record RR1. Therefore the link connection information about the link record LR31 contains information that allows reference to the node record NR10 where the node N2 at the center among the links L1, L2, L6 and L7 is recorded. The offset address to the node record NR10 or the node record number of the node record NR10 is used as the link connection information of the link record LR31.

It should be noted that the link connection information in the link record LR31 contains a flag which shows that the link connection information is set to the node table NR, as well as the node record number or offset of the node record NR10.

As described above, each node record NR only contains the node connection information to a link L connected to it first; each link record LR contains the link connection information to a link L which is connected to the link L recorded therein and belongs to another road record RR, or it contains the link connection information to a node record NR where the starting node N is recorded. It is thus possible to trace the connection of links L starting from each node N.

(Data Structure of the Unit Header)

Referring to FIG. 7 again, the data structure of the unit header is now described in detail. The unit header contains management information about the unit data in the cartographic file CF. The unit header at least includes the unit ID, the version code, and the data sizes of the eight kinds of tables contained in the unit data. The unit ID is an identification number which uniquely specifies the unit U represented by the cartographic file CF. More specifically, the unit ID is a number which identifies the level L of the unit U and the parent-child relation and neighboring relation of the unit U, which is preferably mutually convertible with the path name of the cartographic file CF. For example, when the unit ID is expressed by a 32-bit (4-byte) code, the two bits from the MSB are used as reserved bits, which are followed by the unit level L in 2 bits, 5-bit sectional position X3 in the longitude direction at the level "3", 5-bit sectional position Y3 in the latitude direction at the level "3", 3-bit sectional position X2 in the longitude direction at the level "2", 3-bit sectional position Y2 in the latitude direction at the level "2", 3-bit sectional position X1 in the longitude direction at the level "1", 3-bit sectional position Y1 in the latitude direction at the level "1", 3-bit sectional position X0 in the longitude direction at the level "0", and 3-bit sectional position Y0 in the latitude direction at the level "0". The sectional position X3 in the longitude direction at the level "3" is a number which shows the position of the unit U counted in the east longitude direction (starting from longitude 0°) when the unit U belongs to the level "3". The sectional position Y3 in the latitude direction at the level "3" is a number which shows the position of the unit U counted in the north latitude direction (starting from latitude 0°N) when the unit U belongs to the level "3". The sectional position X2 in the longitude direction at the level "2" is a number which shows the position of the unit U counted in the east longitude direction (starting from the lower left corner of the unit U at the level "3") when the unit U belongs to the level "2". The sectional position Y2 in the latitude direction at the level "2" is a number which shows the position of the unit U counted in the north latitude direction (starting from the lower left corner of the unit U at the level "3") when the unit U belongs to the level "2". The sectional position X1 in the longitude direction at the level "1" is a number which shows the position of the unit U counted in the east longitude direction (starting from the lower left corner of the unit U at the level "2") when the unit U belongs to the level "1". The sectional position Y1 in the latitude direction at the level "1" is a number which shows the position of the unit U counted in the north latitude direction (starting from the lower left corner of the unit U at the level "2") when the unit U belongs to the level "1". The sectional position X0 in the longitude direction at the level "0" is a number which shows the position of the unit U counted in the east longitude direction (starting from the lower left corner of the unit U at the level "1") when the unit U belongs to the level "0". The sectional position Y0 in the latitude direction at the level "0" is a number which shows the position of the unit U counted in the north latitude direction (starting from the lower left corner of the unit U at the level "1") when the unit U belongs to the level "0".

For example, since the unit $U_0$ at the level "0" shown in FIG. 4 has the path name "¥MAP¥D1606¥D0401¥D0503¥M0201.map," L=0, X3=16, Y3=6, X2=4, Y2=1, X1=5, Y1=3, X0=2 and Y0=1. In this case, the unit ID of the unit $U_0$ is 135928529 (in decimal). As is clear, the unit ID can be uniquely specified from the path name of the cartographic file CF, and the path name can be uniquely specified from the unit ID.

The version code is an identification code that represents the version of the cartographic file CF (unit U). The version code is, for example, represented by a 4-byte code where the format version of the unit is expressed as a 2-byte code and the contents version of the unit is expressed as a 2-byte code. For example, when a cartographic file CF having a certain unit ID is downloaded from the center station 2 into the terminal device 1, this version code is used to decide whether to substitute it for a cartographic file CF of the same unit ID already stored in the first storage device 19 of the terminal device 1. This process will be described in detail later.

For the data size of each table, the data size of each table in the cartographic file CF is recorded in 2 bytes, for example. The offset address of each table from the beginning of the cartographic file CF can be calculated by sequentially adding the data sizes of the tables. The data sizes of the tables contain the data size of the basic background table, data size of the detailed background table, data size of the basic character/symbol table, data size of the detailed character/symbol table, data size of the first node table, data size of the first link table, data size of the second node table, and data size of the second link table. The contents of each table have been already described.

The detailed data structure of the cartographic file CF has been described so far. Next, the operation in which the terminal device 1 reads out the cartographic file CF from the first database 111 will be described referring to the drawings.
(Read Operation)

As has been described referring to FIG. 1, the terminal device 1 of this embodiment is typically a car navigation system. As is known, it executes operations like map matching, route search, route guide, etc. Among these operations, the route search operation is now described in detail, which includes the operation of reading out the cartographic files CF, the operation of tracing the connection of a road extending over a unit U and its neighboring unit NU, and the operation of associating nodes N and links L between different levels. In the following description, the process of finding the shortest route between starting and destination points is not specifically described, since it is not a point of this invention.

Figure 33:
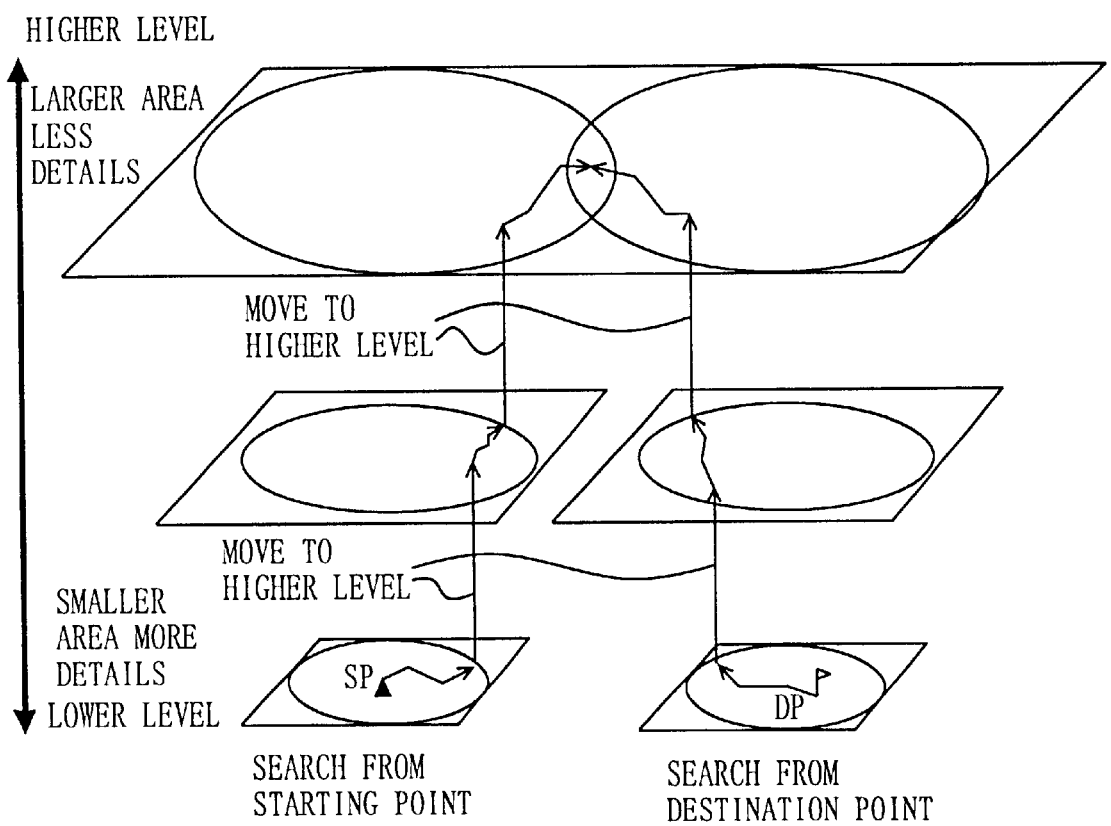
FIG. 33 is a diagram showing the concept of route search performed in the terminal device 1.

FIG. 33 is a diagram showing the concept of the route search operation. As shown in FIG. 33, the search is expanded from both of the starting point SP and the destination point DP to obtain the shortest route. The route search uses cartographic files CF at a plurality of levels from a lower level to a higher level. In this process, in the vicinities of the starting point SP and the destination point DP, the shortest route is searched for by using cartographic files CF at a lower level which show detailed road networks. In the area other than the vicinities of the starting point SP and the destination point DP, the search uses cartographic files CF at higher levels which show rough road networks. The route search shown in FIG. 33 uses the so-called bidirectional interlevel search method. For example, the known Dijkstra method is used to find the shortest route from the starting point SP to the destination point DP by using the cartographic files CF. The Dijkstra method is not described any further herein because it is not a point of this invention and also because it is a known technique.

Figure 34:
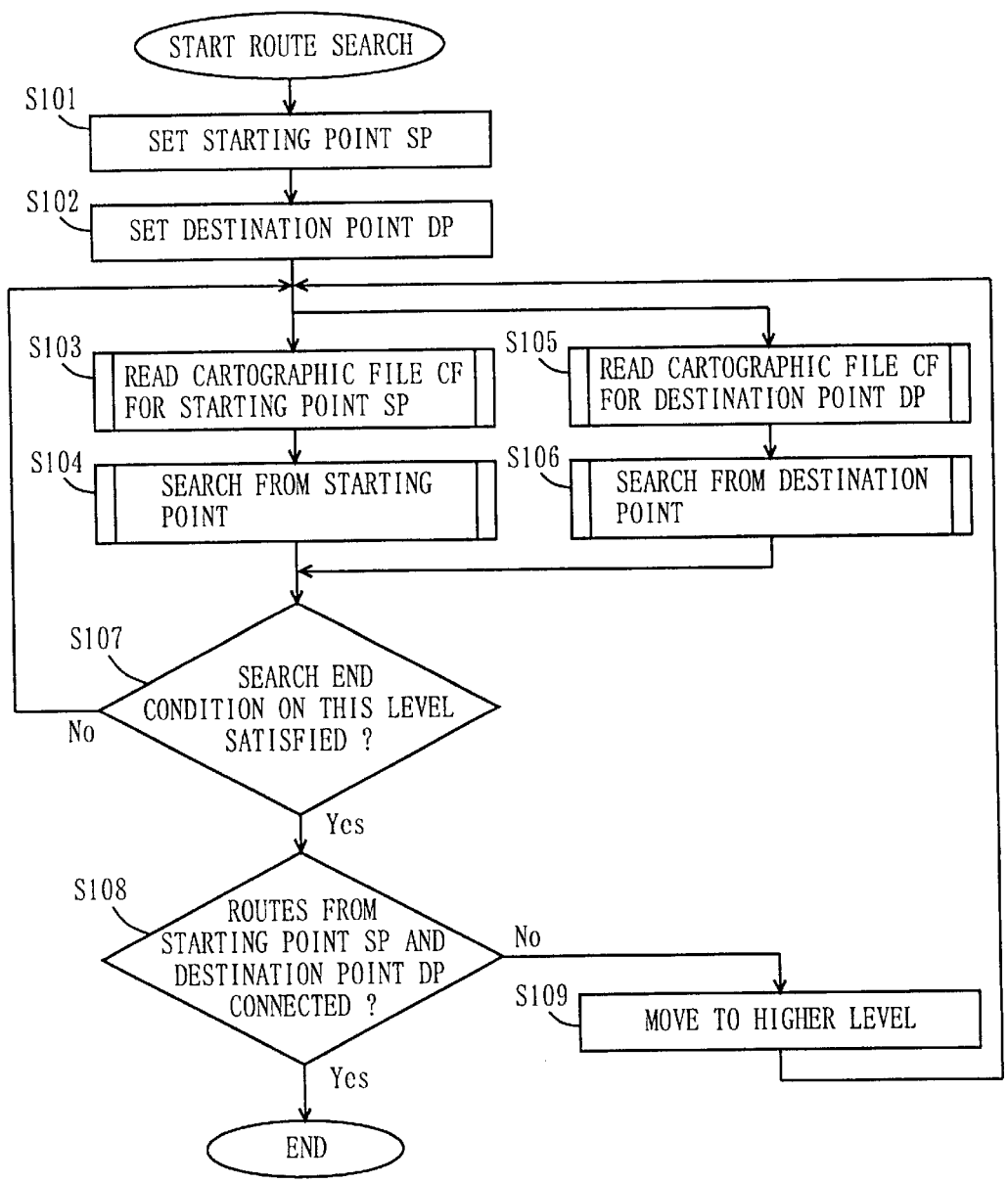
FIG. 34 is a flowchart showing the procedure of bidirectional interlevel search performed in the terminal device 1.

Now, referring to the flowchart of FIG. 34, the procedure of the bidirectional interlevel search performed by the terminal device 1 is described in detail. In the bidirectional interlevel search, the terminal device 1 first sets the starting point SP and the destination point DP (steps S101, S102). In the steps S101 and S102, the user of the terminal device 1 operates the input device 11 according to a menu displayed on the display of the output device 110 to set the starting point SP and the destination point DP. In a recent car navigation system, the starting point SP and the destination point DP are generally set by using addresses, telephone numbers, names of places or facilities, etc. The information specifying the starting point SP and the destination point DP is transferred from the input device 11 to the data processing portion 13.

When the step S102 ends, the data processing portion 13 cooperates with the read/write control portion 18 to sequentially read out cartographic files CF required in the route search from the first storage device 19 into a main storage not shown (step S103). As already stated referring to FIG. 2, etc., the cartographic files CF stored in the first storage device 19 are digital data generated about individual units U defined by dividing a map into rectangular areas. Each cartographic file CF is managed by the file system. The file system generates directories in such a manner that the logic regions in the first storage device 19 form a tree structure. The logic region where a cartographic file CF is stored can thus be uniquely specified by the path including the root, file name, and names of subdirectories interposed between them. As described above, the tree structure and the file names of this embodiment specify the parent-child relation and neighboring relation among the units U. In the first step S103, in order to readout, from the first storage device 19, the cartographic file CF showing the vicinity of the starting point SP transferred from the input device 11, the data processing portion 13 and the read/write control portion 18 forming the file system have to find its path name.

Figure 35:
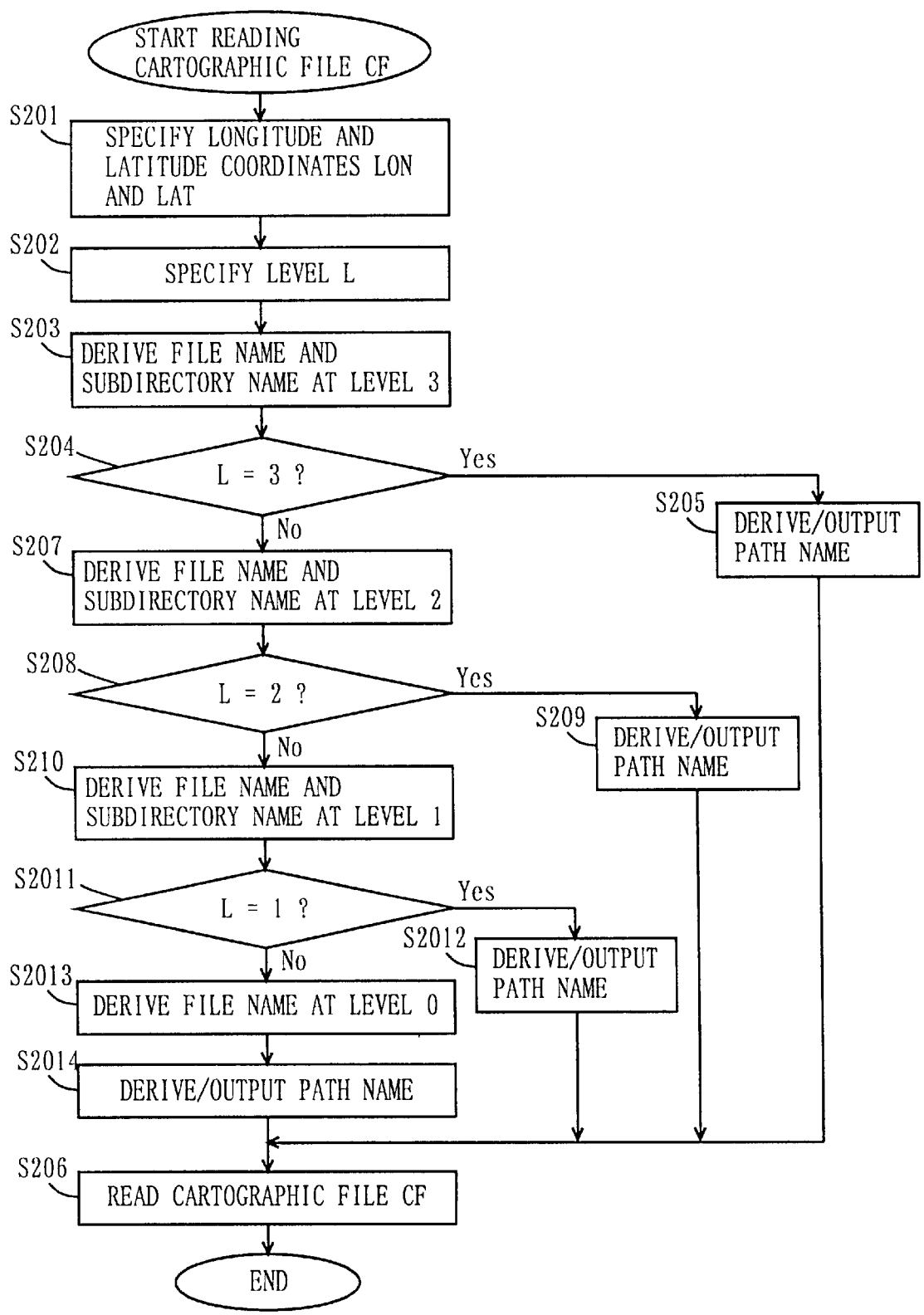
FIG. 35 is a flowchart showing the detailed procedure of the step of FIG. 34 for reading a cartographic file CF (step S103)

FIG. 35 is a flowchart showing the detailed procedure of the step S103 of FIG. 34. The process of FIG. 35 be summarized as follows: the data processing portion 13 finds the path name of the cartographic file CF on the basis of the level (hierarchical level) of the target cartographic file CF and the coordinate information about a representative point. On the basis of the path name found by the data processing portion 13, the read/write control portion 18 reads out the cartographic file CF from the first storage device 19. Now, referring to the flowchart of FIG. 35, the procedure for reading out the cartographic file CF representing the unit $U_0$ at the level "0" shown in FIGS. 4 and 5 ("¥M0201.map") is described.

The representative point is a point which is contained in the area the target cartographic file CF covers. In the description below, the longitude coordinate $LON_0$ and the latitude coordinate $LAT_0$ are coordinates which show the position of the representative point of the unit $U_0$ in the longitude and latitude directions, respectively. In this embodiment, the longitude coordinate $LON_0$ and the latitude coordinate $LAT_0$ are respectively assumed to be east longitude 132 degrees 39 minutes 20 seconds and north latitude 32 degrees 55 minutes 37 seconds.

The process of the step S103 further requires some parameters. In the description below, the longitude width W3 indicates the length of the side extending along the longitude direction of the rectangular area which a level-"3" unit U covers. The latitude width H3 indicates the length of the side extending along the latitude direction of the rectangular area which a level-"3" unit U covers. In this embodiment, when each rectangular area at the level "3" is about 640 kilometers square as has been described referring to FIGS. 2 and 3, the longitude width W3 and the latitude width H3 are 28800 seconds (8 degrees) and 19200 seconds (5 degrees 20 minutes), respectively. The longitude width W2 shows the length of the side extending along the longitude direction of the rectangular area which a unit U belonging to the level "2" covers. The latitude width H2 is the length of the side extending along the latitude direction of the rectangular area which a unit U belonging to the level "2" covers. When the rectangular area at the level "2" 0 is about 80 kilometers square, the longitude width W2 and the latitude width H2 are 3600 seconds (1 degree) and 2400 seconds (40 minutes), respectively. The longitude width W1 shows the length of the side extending along the longitude direction of the rectangular area which a unit U belonging to the level "1" covers. The latitude width H1 shows the length of the side extending along the latitude direction of the rectangular area which a unit U belonging to the level "1" covers. When the rectangular area at the level "1" is about 10 kilometers square, the longitude width W1 and the latitude width H1 are 450 seconds (7 minutes 30 seconds) and 300 seconds (5 minutes), respectively. The longitude width W0 shows the length of the side extending along the longitude direction of the rectangular area which a unit U belonging to the level "0" covers. The latitude width HO shows the length of the side extending along the latitude direction of the rectangular area which a unit U belonging to the level "0" covers. When the rectangular area at the level "0" is about 1.2 kilometers square, the longitude width W0 and the latitude width HO are 56.25 seconds and 37.5 seconds, respectively.

The data processing portion 13 first specifies the longitude coordinate $LON_0$ and the latitude $LAT_0$ of the representative point (step S201) and specifies the level L of the cartographic file CF to be read (L=0 when reading out the cartographic file CF of the unit $U_0$: step S202). The steps S201 and S202 are not described in detail here since they are common operations performed in the bidirectional interlevel search.

Next, the data processing portion 13 moves to the step S203 and divides the longitude coordinate $LON_0$ of the representative point by the longitude width W3 at the level "3" to obtain the quotient DLON3, and divides the latitude $LAT_0$ of the representative point by the latitude width H3 at the level "3" to obtain the quotient DLAT3. Now, the longitude width W3=28800 seconds (8 degrees), the latitude width H3=19200 seconds (5 degrees 20 minutes), the longitude coordinate $LON_0$ =east longitude 132 degrees 39 minutes 20 seconds, and the latitude coordinate $LAT_0$=north latitude 32 degrees 55 minutes and 37 seconds, so that the quotient DLON3=16 and the quotient DLAT3=6. The data processing portion 13 arranges the calculated quotients DLON3 and DLAT3 to form a 4-digit number. The 4-digit number obtained this time is "1606." When the quotient DLON3 and/or quotient DLAT3 have only one digit, "0" is added in the second digit.

The data processing portion 13 adds the directory identifier "¥" and the file name initial "M" at the beginning of the generated 4-digit number and also adds the file name extension ".map" at its end. The data processing portion 13 thus finds the file name of the target cartographic file CF (which contains the unit $U_0$ ) from the longitude coordinate $LON_0$ and the latitude coordinate $LAT_0$ of the representative point (the file name is "¥M1606.map" in this case).

Also, the data processing portion 13 adds the directory identifier "¥" and the subdirectory name initial "D" at the beginning of the generated 4-digit number. The data processing portion 13 thus derives the subdirectory name where the target cartographic file CF is stored ("¥D1606" in this case) from the longitude coordinate $LON_0$ and the latitude coordinate $LAT_0$ of the representative point (step S203).

Next, the data processing portion 13 checks whether the level L specified in the step S202 is the level "3" (step S204). When the level L is 3, the data processing portion 13 moves to the step S205 and attaches the file name derived in the step S203 ("¥M1606.map") after the root ("¥MAP") to derive the path name. The path name is thus "¥MAP¥M1606.map." The data processing portion 13 outputs the derived path name to the read/write control portion 18 (step S205). The read/write control portion 18 reads out the cartographic file CF from the first database 111 in the first storage device 19 according to the input path name ("¥MAP¥M1606.map"). The read/write control portion 18 transfers this cartographic file CF to the main storage (not shown) in the data processing portion 13. The data processing portion 13 has thus read out the cartographic file CF from the first storage device 19 into the main storage (step S206).

Now, since the step S202 specified the level "0" as stated above, the data processing portion 13 decides in the step S204 that the level L is not 3 and it moves to the step S207. The data processing portion 13 calculates the remainder RLON3 of the quotient DLON3 derived in the step S203 and then divides the remainder RLON3 by the level-"2" longitude width W2 to obtain the quotient DLON2. The data processing portion 13 further calculates the remainder RLAT3 of the quotient DLAT3 derived in the step S203 and then divides the remainder RLAT3 by the level-"2" latitude width H2 to obtain the quotient DLAT2. Now, when the quotients DLON2 and DLAT2 are obtained by using the values shown above, then DLON2=4 and DLAT2=1. The data processing portion 13 then arranges the calculated quotients DLON2 and DLAT2 to form a 4-digit number. The 4-digit number formed this time is "0401." When the quotient DLON2 and/or quotient DLAT2 have only one digit, "0" is added in the second digit.

The data processing portion 13 adds the directory identifier "¥" and the file name initial "M" at the beginning of this 4-digit number and also adds the file name extension ".map" to the end thereof. The data processing portion 13 thus derives the file name of the target cartographic file CF ("¥M0401.map" in this case) from the longitude coordinate $LON_O$ and the latitude coordinate $LAT_O$ of the representative point.

Also, the data processing portion 13 adds the directory identifier "¥" and the subdirectory name initial "D" at the beginning of the generated 4-digit number. The data processing portion 13 thus derives the subdirectory name where the target cartographic file CF (which contains the unit $U_O$) is stored ("¥D0401" in this case) from the longitude coordinate $LON_O$ and the latitude coordinate $LAT_O$ of the representative point (step S207).

Next, the data processing portion 13 checks whether the level L specified in the step S202 is the level "2" (step S208). When the level L is "2", the data processing portion 13 moves to the step S209 and attaches the subdirectory name ("¥D 1606") derived in the step S203 and the file name derived in the step S207 ("¥M0401.map") after the root ("¥MAP") to derive the path name. The path name is thus "¥MAP¥D1606¥M0401.map." the data processing portion 13 outputs the derived path name to the read/write control portion 18 (step S209). The read/write control portion 18 reads out the cartographic file CF from the first database 111 in the first storage device 19 according to the input path name ("¥MAP¥D1606¥M0401.map"). The read/write control portion 18 transfers the read cartographic file CF to the main storage (not shown) in the data processing portion 13. The data processing portion 13 has thus read out the cartographic file CF from the first storage device 19 into the main storage (step S206).

Now, since the step S202 specified the level "0" as stated above, the data processing portion 13 decides in the step S208 that the level L is not "2" and it moves to the step S210. The data processing portion 13 calculates the remainder RLON2 of the quotient DLON2 derived in the step S207 and then divides the remainder RLON2 by the level-"1" longitude width W1 to calculate the quotient DLON1. The data processing portion 13 also calculates the remainder RLAT2 of the quotient DLAT2 derived in the step S207 and then divides the remainder RLAT2 by the level-"1" latitude width H1 to obtain the quotient DLAT1. Now, when the quotients DLON1 and DLAT1 are obtained by using the values shown above, then DLON1=5 and DLAT1=3. The data processing portion 13 then arranges the calculated quotients DLON1 and DLAT1 to form a 4-digit number. The 4-digit number formed this time is "0503." When the quotient DLON1 and/or quotient DLAT1 have only one digit, "0" is added in the second digit.

The data processing portion 13 adds the directory identifier "¥" and the file name initial "M" at the beginning of the generated 4-digit number and also adds the file name extension ".map" at its end. The data processing portion 13 thus derives the file name of the target cartographic file CF ("¥M0503.map") from the longitude coordinate $LON_O$ and the latitude coordinate $LAT_O$ of the representative point.

Also, the data processing portion 13 adds the directory identifier "¥" and the subdirectory name initial "D" at the beginning of the generated 4-digit number. The data processing portion 13 thus derives the subdirectory name where the target cartographic file CF (which contains the unit $U_O$) is stored ("¥D0503" in this case) from the longitude coordinate $LON_O$ and the latitude coordinate $LAT_O$ of the representative point (step S2010).

Next, the data processing portion 13 checks whether the level L specified in the step S202 is the level "1" (step S2011). When the level L is "1", the data processing portion 13 moves to the step S2012 and attaches, after the root ("¥MAP"), the subdirectory name ("¥D1606") derived in the step S203, the subdirectory name ("¥D0401") derived in the step S207, and the file name derived in the step S210 ("¥M0503.map") to derive the path name. The path name is thus "¥MAP¥D1606¥D0401¥M0503.map." The data processing portion 13 outputs the derived path name to the read/write control portion 18 (step S2012). The read/write control portion 18 reads out the cartographic file CF from the first database 111 in the first storage device 19 according to the input path name ("¥MAP¥D1606¥D0401 ¥M0503.map"). The read/write control portion 18 transfers the read cartographic file CF to the main storage (not shown) in the data processing portion 13. The data processing portion 13 has thus read out the cartographic file CF from the first storage device 19 into the main storage (step S206).

Now, since the step S202 specified the level "0" as stated above, the data processing portion 13 decides in the step S2011 that the level L is not 1 and it therefore moves to the step S2013. The data processing portion 13 calculates the remainder RLON1 of the quotient DLON1 derived in the step S210 and then divides the remainder RLON1 by the level-"0" longitude width W0 to obtain the quotient DLON0. The data processing portion 13 also calculates the remainder RLAT1 of the quotient DLAT1 derived in the step S210 and then divides the remainder RLAT1 by the level-"0" latitude width H0 to obtain the quotient DLAT0. Now, when the quotient DLON0 and the quotient DLAT0 are obtained by using the values shown above, then DLON0=2 and DLAT0=1. The data processing portion 13 then arranges the calculated quotients DLON0 and DLAT0 to form a 4-digit number. The 4-digit number generated this time is "0201." When the quotient DLON0 and/or quotient DLAT0 have only one digit, "0" is added in the second digit.

The data processing portion 13 adds the directory identifier "¥" and the file name initial "M" at the beginning of the generated 4-digit number and also adds the file name extension ".map" at its end. The data processing portion 13 thus finds the file name of the target cartographic file CF ("¥M0201.map" in this case) from the longitude coordinate $LON_O$ and the latitude coordinate $LAT_O$ of the representative point (step S2013). In the step S2013, it is automatically decided that the level L is the lowest level "0", so that the data processing portion 13 does not derive the subdirectory name.

Next, the data processing portion 13 moves to the step S2014 and derives the path name by attaching, after the root ("¥MAP"), the string of subdirectory names derived in the steps S203, S207 and S210 ("¥D1606¥D0401¥D0503") and the file name derived in the step S2013 ("¥M0201.map" in this case). The path name is thus "¥MAP¥D1606¥D0401¥D0503¥M0201.map." The data processing portion 13 outputs the derived path name to the read/write control portion 18 (step S2014). The read/write control portion 18 reads out the cartographic file CF from the first database 111 in the first storage device 19 according to the input path name ("¥MAP¥D1606¥D0401 ¥M0503.map"). The read/write control portion 18 transfers the read cartographic file CF to the main storage (not shown) in the data processing portion 13. The data processing portion 13 has thus read out the desired cartographic file CF (data for displaying the map of the unit $U_O$) from the first storage device 19 into the main storage (step S206).

After the step S206, the data processing potion 13 exits from the flowchart of FIG. 35 and moves to the step S104 of FIG. 34. The data processing portion 13 performs the route search from the starting point SP by using the cartographic file CF read into the main storage (step S104). It should be noted that the Dijkstra method is not described in detail herein since it is a known technique. Briefly, the Dijkstra method finds the shortest route by tracing the connection in the road network of the cartographic files CF. The procedure of tracing the connection of nodes N and links L in the cartographic files CF has already been described referring to FIG. 32.

After the step S102, the data processing portion 13 executes the step S105 in parallel with the step S103. The data processing portion 13 reads out the cartographic file CF showing the vicinity of the destination point DP set in the step S102 from the first storage device 19 into its internal main storage not shown (step S105). The data processing portion 13 then performs the route search on the side of the destination point DP by using the cartographic file CF read in the step S105 (step S106). The processes in the steps S105 and S106 are not described in detail here since they are similar to the steps S103 and step S104.

After the steps S104 and S106, the data processing portion 13 checks whether a condition has been satisfied to end the search at the level of the cartographic files CF used in the steps S104 and S106 (step S107). In the step S107, whether the search condition has been met is decided generally on the basis of whether the number of read cartographic files CF or the number of searched nodes N has reached a given value. When the step S107 decides that the condition for ending the search has not been satisfied, the data processing portion 13 returns to the steps S103 and S105 to read out cartographic files CF which adjoin the cartographic files CF already read during the search process from the starting point SP and the destination point DP. Now, when an already read cartographic file CF represents the map of a unit U, the neighboring cartographic file CF represents the map of a neighboring unit NU (see FIG. 26). The data processing portion 13 finds the longitude coordinate LON and the latitude coordinate LAT of a new representative point and derives the path name of the neighboring cartographic file CF, and reads out the cartographic file CF specified by the path name into the main storage from the first storage device 19.

Figure 36:
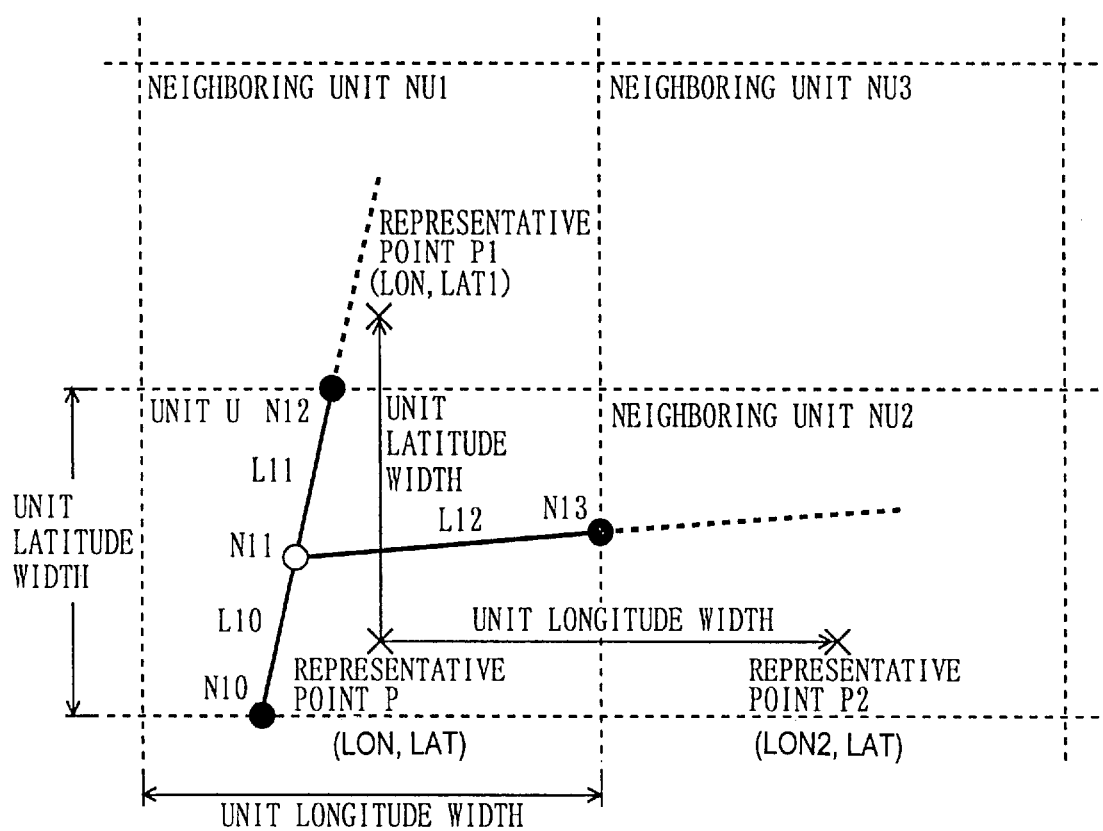
FIG. 36 is a diagram used to explain how new representative points are positioned to determine neighboring units NU.

As shown in FIG. 36, the position of the new representative point for defining the neighboring unit NU depends on through which neighboring node on the unit boundary the link L in the road network is connected to a link L in the neighboring unit NU (see FIG. 26 for details). More specifically, the link L11 of FIG. 36 is connected to a link L in the neighboring unit NU1 through the neighboring node N12 located on the upper side of the boundary (rectangle) of the unit U. Therefore the latitude width H of the level L to which the unit U belongs is added to the latitude coordinate LAT of the representative point P of the unit U to obtain the latitude coordinate LAT1, and the point at this value is defined as the new representation point P1.

Also, the link L12 of FIG. 36 is connected to a link L in the neighboring unit NU2 through the neighboring node N13 located on the right side of the boundary (rectangle) of the unit U. Therefore the longitude width W at the level L to which the unit U belongs is added to the longitude coordinate LON of the representative point P of the unit U to obtain the longitude coordinate LON2 and the point at this value is defined as the new representative point P2.

When performing the process of the steps S103 and S105 in the second time or later, on the basis of the new representative points obtained as described referring to FIG. 36, the data processing portion 13 reads out the cartographic files CF which represent the maps in the areas containing these representative points. This process is carried out as described above. In the next steps S104 and S106, the data processing portion 13 performs the search by using the cartographic files CF read in the steps S103 and S105. This search process is a process of tracing the connection of the road network from the cartographic file CF read last time into that read this time, i.e. over the boundary between the unit U and the neighboring unit NU.

By the way, in the techniques described in Background Art, the neighboring node records in each cartographic file contain numbers or offset addresses etc. which specify the neighboring nodes in the neighboring unit NU so that the connection of the road network can be traced even if it extends over the boundary between the unit U and the neighboring unit NU. However, when such information as is related to the internal data structure of the cartographic file is recorded in the unit, the numbers or offset addresses may be changed when the cartographic file representing the neighboring unit NU has been updated. This causes the problem that updating one cartographic file may require updating all cartographic files which represent the neighboring units NU around it. According to this embodiment, to solve this problem, information which is directly related to the internal data structure of the neighboring units NU is not recorded in the cartographic files CF; the data processing portion 13 executes the process of tracing to a neighboring node N in a neighboring unit NU by using the coordinate information about the nodes N and/or the attribute information about the links L.

Figure 37:
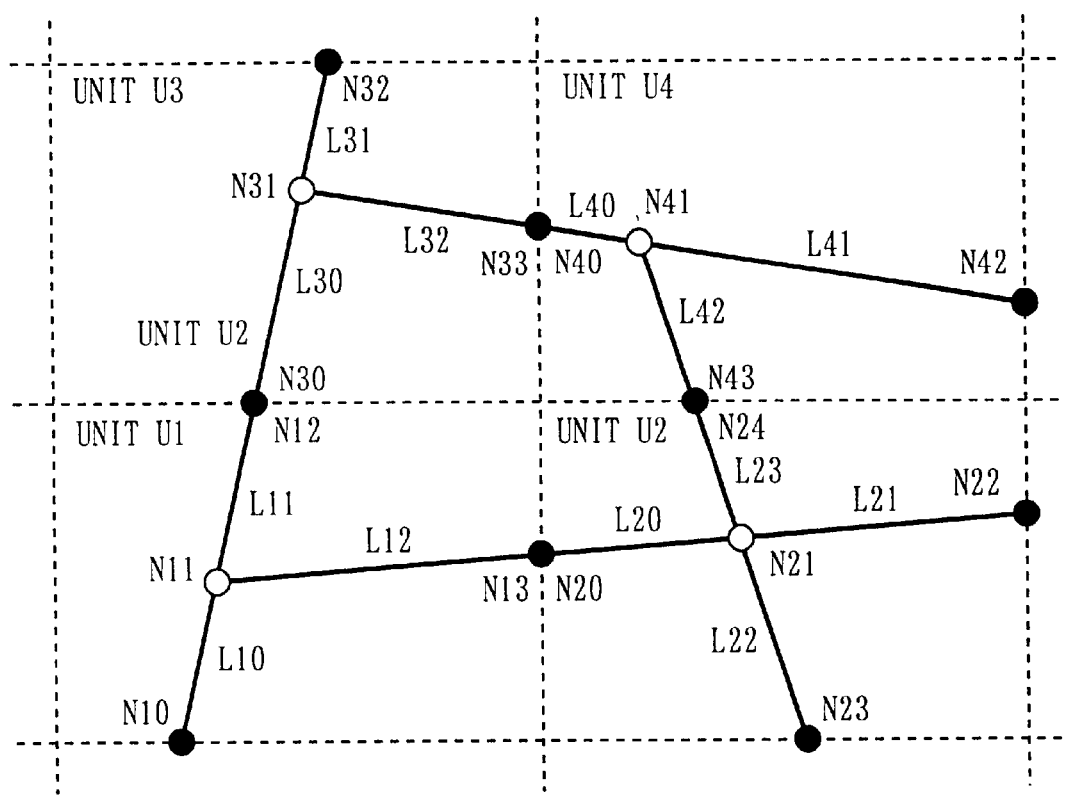
FIG. 37 is a diagram showing a road network which is formed with four neighboring units U1 to U4 adjoining each other.
Figure 38:
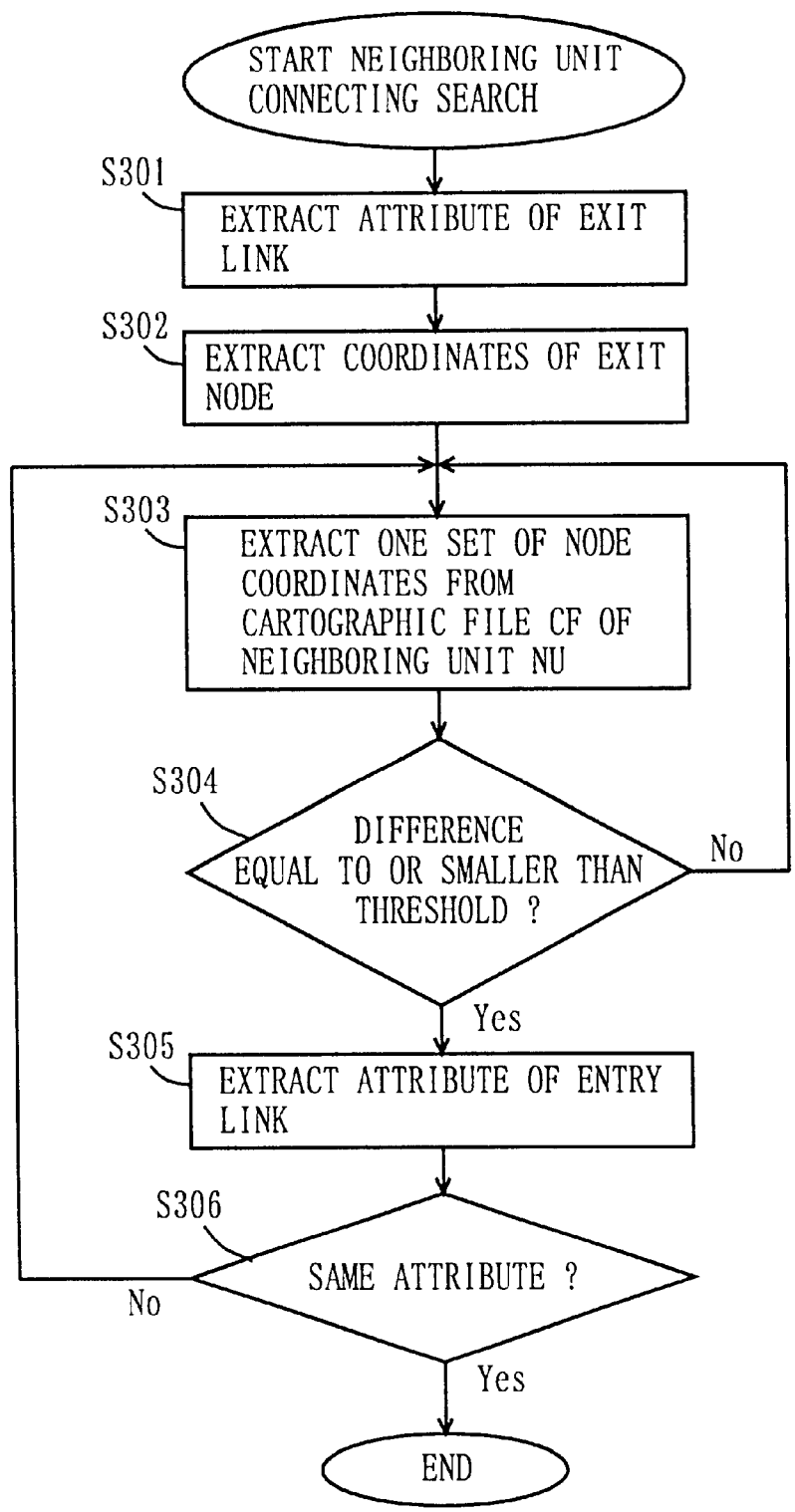
FIG. 38 is a flowchart showing the procedure in which a data processing portion 13 traces the connection of road network over the boundary between two units U.

Now, the process in which the data processing portion 13 traces the connection of a road network over the boundaries between a unit U and its neighboring units NU in the steps S104 or S106 of FIG. 34 will be fully described referring to FIGS. 37 and 38. FIG. 37 shows a road network formed with four adjacent units U1 to U4. The road network contained in the unit U1 includes four nodes N10 to N13 and three links L10 to L12. In the unit U1, the three nodes N10, N12 and N13 (refer to ● marks) are neighboring nodes which are located on the boundary of the unit U1. The road network contained in the unit U2 includes five nodes N20 to N24 and four links L20 to L23. In the unit U2, the four nodes N20 and N22 to 24 (refer to ● marks) are neighboring nodes which are located on the boundary of the unit U2. The road network contained in the unit U3 is formed of four nodes N30 to N33 and three links L30 to L32. In the unit U3, the nodes N30, N32 and N33 (refer to ● marks) are neighboring nodes which are located on the boundary of the unit U3. The road network contained in the unit U4 is formed of four nodes N40 to N43 and three links L40 to L42. The three nodes N40 to N43 (refer to ● marks) are neighboring nodes which are located on the boundary of the unit U4.

In FIG. 37, the nodes N13 and N20 are connected to each other, the nodes N12 and N30 are connected to each other, the nodes N24 and N43 are connected to each other, and the nodes N33 and N40 are connected to each other, thus forming one road network.

In the road network of FIG. 37, the link L12 is connected to the link L20 via the neighboring nodes N13 and N20. As stated above, in the route search process, the data processing portion 13 sequentially reads out cartographic files CF expressing the neighboring units NU and expands the search towards the destination point DP or starting point SP. Therefore the data processing portion 13 has to trace the connection between two links L over the boundary between a unit U and its neighboring unit NU. Thus, first, the data processing portion 13 searches the cartographic file CF of the unit U (i.e. the unit U1) contained in the main storage (more specifically, the link records RR: see FIGS. 30 and 31) and extracts the link attribute of the link L12 extending from the unit U1 into the unit U2 (FIG. 38: step S301). The link L12 extending to reach the boundary of the unit U1 is referred to as an exit link L12 hereinafter.

Next, the data processing portion 13 refers to the connection information of the exit link L12 (a node record number or offset address) and searches for the node record NR of the neighboring node N13 connected to the exit link L12 (see FIG. 27) from the cartographic file CF (more specifically, the first or second node table). Subsequently, the data processing portion 13 extracts the node coordinates of the neighboring node N13 from this node record NR (step S302). The neighboring node N13 connected to the exit link L12 is referred to as exit node N13 hereinafter.

Next, the data processing portion 13 refers to the cartographic file CF of the neighboring unit NU (i.e. the unit U2) contained in the main storage and extracts the node coordinates, one set at a time (more specifically, it reads the node coordinates from the first or second node table: step S303). The data processing portion 13 then calculates the difference between the node coordinates of the exit node N13 extracted in the step S302 and the node coordinates extracted in the step S303 and checks whether the difference exceeds a given threshold (step S304). As has been described referring to FIG. 29, the node coordinates are recorded as normalized values in this embodiment. The given threshold is preferably set around 1 to 2, though it depends on the width of the normalized coordinates. The data processing portion 13 repeats the steps S303 and S304 until the condition of the step S304 has been satisfied. Note that, each time it executes the step S303, the data processing portion 13 extracts node coordinates which have not been extracted before. Now, when the condition of the step S304 is satisfied, the node N having the node coordinates extracted in the step S303 represents the same position as the exit node N13. That is to say, the control portion 13 can find the neighboring node N20 which is located at approximately the same position as the exit node N13 by repeating the steps S303 and S304. The neighboring node N20 thus found is referred to as an entry node hereinafter.

In the step S303, generally, the node coordinates are sequentially extracted one set at a time according to the order of the node record numbers (see FIG. 28). In this embodiment, as has been described referring to FIGS. 26 and 28, the node records NR of the neighboring nodes N precede the node records NR of the non-neighboring nodes N in the first or second node table. This allows the data processing portion 13 to find the entry node without extracting the node coordinates from the node records NR of the non-neighboring nodes N. This minimizes the load of the data processing portion 13 when it searches for the entry node. That is to say, the data processing portion 13 can find the entry node without fail by retrieving as many node records NR as the neighboring nodes from the beginning of the first or second node table; that is, it does not have to retrieve all node records NR from the first or second node table recorded in the cartographic file CF of the neighboring unit NU. In this way, the arrangement of the node records NR of this embodiment contributes also to the speeding up of the entry node search.

Figure 39:
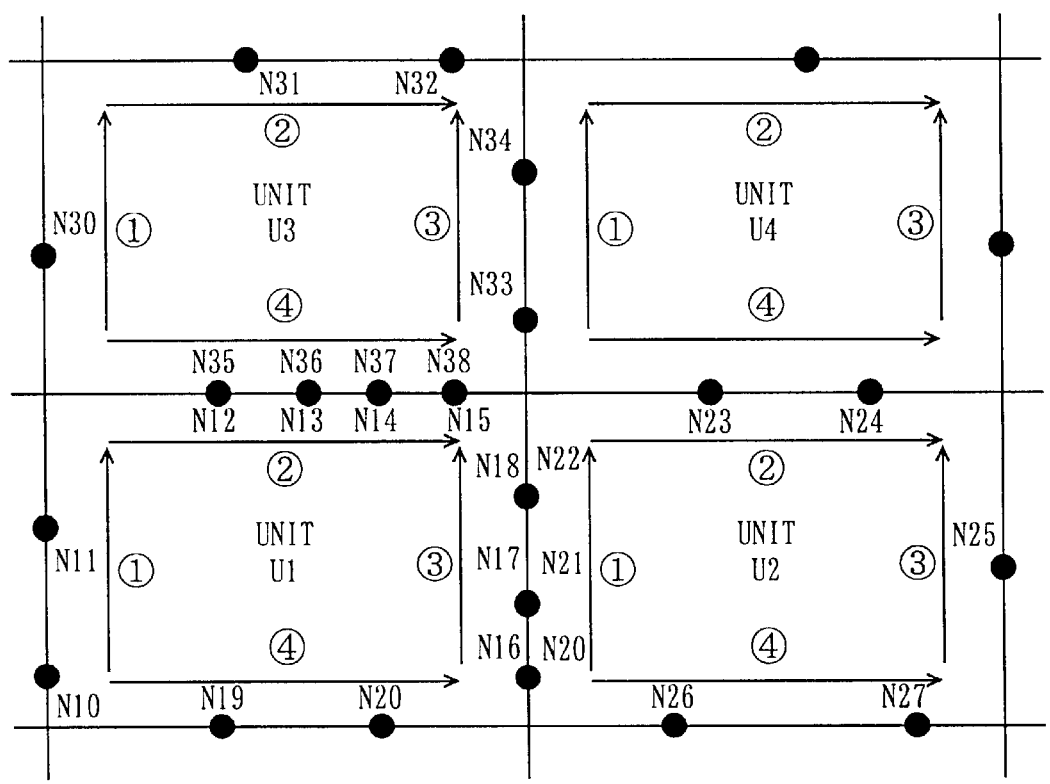
FIG. 39 is a diagram showing an order in which the node records NR of neighboring nodes are recorded.

As described referring to FIG. 26, the neighboring node records NR are arranged according to the preference order: the left side of the unit U (rectangle)→upper side→right side→lower side. Further, the node records NR of the neighboring nodes located on the left and right sides are arranged in ascending order of latitudes and those on the upper and lower sides are arranged in ascending order of longitudes. The non-neighboring node records NR are first arranged in the ascending order of latitudes and non-neighboring node records NR having the same latitude coordinate are arranged in the ascending order of longitudes. This arrangement further speeds up the processing of retrieving the entry node. For example, according to the arrangement rules above, the node records NR of the neighboring nodes N10 to N20 of FIG. 39 are recorded in the cartographic file CF of the unit U1 in the order of N10→N11→N12→N13→N14→N15→N16→N17→N18→N19→N20. Similarly, the node records NR of the neighboring nodes N20 to N27 in the node table U2 are recorded in the cartographic file CF of the unit U2 in the order of N20→N21→N22→N23→N24→N25→N26→N27. Further, in the cartographic file CF of the unit U3, the node records NR are recorded in the order of N30→N31→N32→N33→N34→N35→N36→N37→N38.

In the route search process, usually, when the search is proceeded in a read cartographic file CF and the route being traced reaches a neighboring node, that neighboring unit NU is newly read out. In this embodiment, when the cartographic file CF of the neighboring unit NU is read out, all neighboring nodes on the boundary between the units are associated with each other between the previously read cartographic file CF and the currently read cartographic file CF. In this process, the fact that the neighboring node records NR are recorded in the above-described order in the node tables speeds up the neighboring node associating process. For example, if the search has found the neighboring node N35 of the unit U3 which represents the same position as the neighboring node N12 of the unit U1, then the neighboring node N36 of the unit 3 which corresponds to the next neighboring node N13 of the unit 1 is always located in the record next to N35. Similarly, if the search has found the neighboring node N16 of the unit U1 which corresponds to the neighboring node N20 of the unit 2, then the neighboring node N17 of the unit 1 which corresponds to the next neighboring node N21 of the unit 2 is always located in the record next to N16. In this way, arranging the neighboring nodes according to the above-described rules speeds up the process of retrieving the neighboring nodes between the neighboring units.

Figure 31:
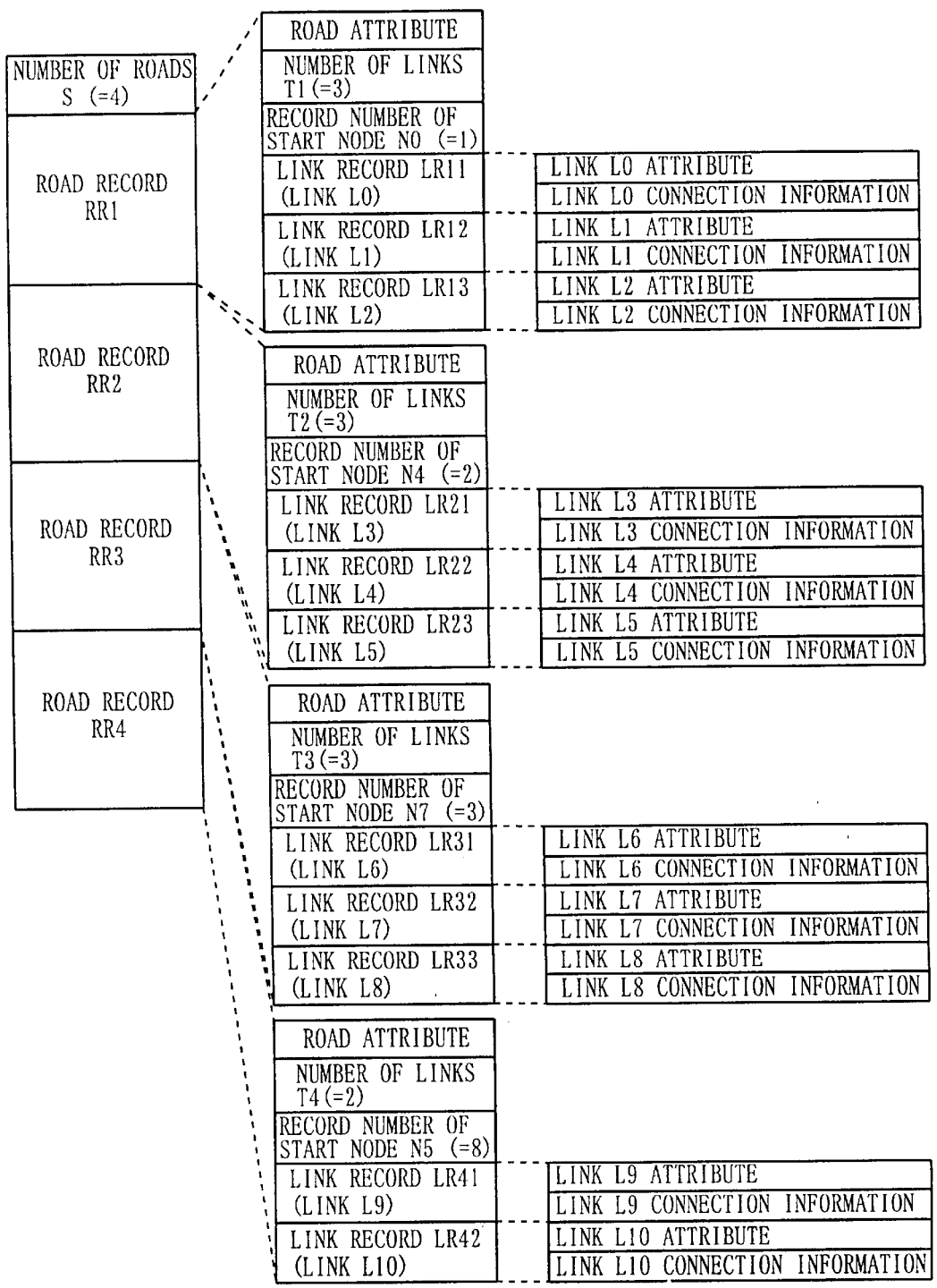
FIG. 31 is a diagram used to explain link connection information recorded in each link record LR.

When the data processing portion 13 has found the entry node in the step S304, it refers to the connection information (the node record number or offset address) of the entry node N20 and searches the cartographic file CF of the unit U2 (more specifically the first or second link table) to find the link record LR of the link L20 connected to the entry node N20 (see FIGS. 30 and 31). The link L20 connected to the entry node N20 is referred to as entry link L20 hereinafter. The data processing portion 13 then extracts the attribute information about the entry link L20 from the link record LR thus found (step S305).

Next, the data processing portion 13 checks whether the attribute information about the exit link L12 extracted in the step S301 is the same as the attribute information about the entry link L20 extracted in the step S305 (step S306). If the two pieces of attribute information differ, the data processing portion 13 returns to the step S303 to search for a new entry node N. In this embodiment, as has been explained referring to FIG. 2, the first storage device 19 contains some cartographic files CF which represent maps on different scales. A cartographic file CF at a lower level shows a detailed road network; hence, when a difference between two sets of node coordinates is equal to or lower than a given threshold, it is relatively more likely that the two nodes N represent the same position. However, a cartographic file CF at a higher level shows only a rough road network; therefore, even if the difference between two sets of node coordinates do not exceed the given threshold, it is relatively less likely that the two nodes N represent the same position. In this embodiment, the step S306 checks whether the attributes of the exit link and the entry link agree/disagree with each other so that the data processing portion 13 can correctly trace the same road, i.e. so that it will not trace from one road to a different road. That is to say, the process of the step S306 can be omitted when the cartographic files CF belong to a lower level.

When the data processing portion 13 decides in the step S306 that the attribute information about the exit link L12 and that of the entry link L20 agree with each other, it recognizes that it is correctly tracing one road and exits from the flowchart of FIG. 38 and moves to the step S107 of FIG. 34. When the data processing portion 13 decides that the condition has been satisfied to end the search at the level the cartographic files CF read this time belong to, it checks whether the route from the starting point SP and the route from the destination point DP have been connected (step S108). When the routes from the starting point SP and the destination point DP have been connected with each other, the data processing portion 13 decides that it has found the shortest route between the two points and ends the route search process. On the other hand, when the routes from the starting and destination points SP and DP have not been connected yet, the data processing portion 13 goes to the step S109, where it moves to the next higher level and continues the route search by using cartographic files CF showing larger areas and rougher road networks.

Next, the process of moving from a lower level to a higher level is described in detail. In this process, the data processing portion 13 moves from a node N where the search at the lower level ended (the end of the route being traced) to a node N which shows the same position in a cartographic file CF at a higher level. It is therefore necessary that all nodes N contained in the higher-level cartographic file CF can be retrieved from the nodes N in the child unit CU so that the data processing portion 13 can certainly move to the higher level.

Figure 40:
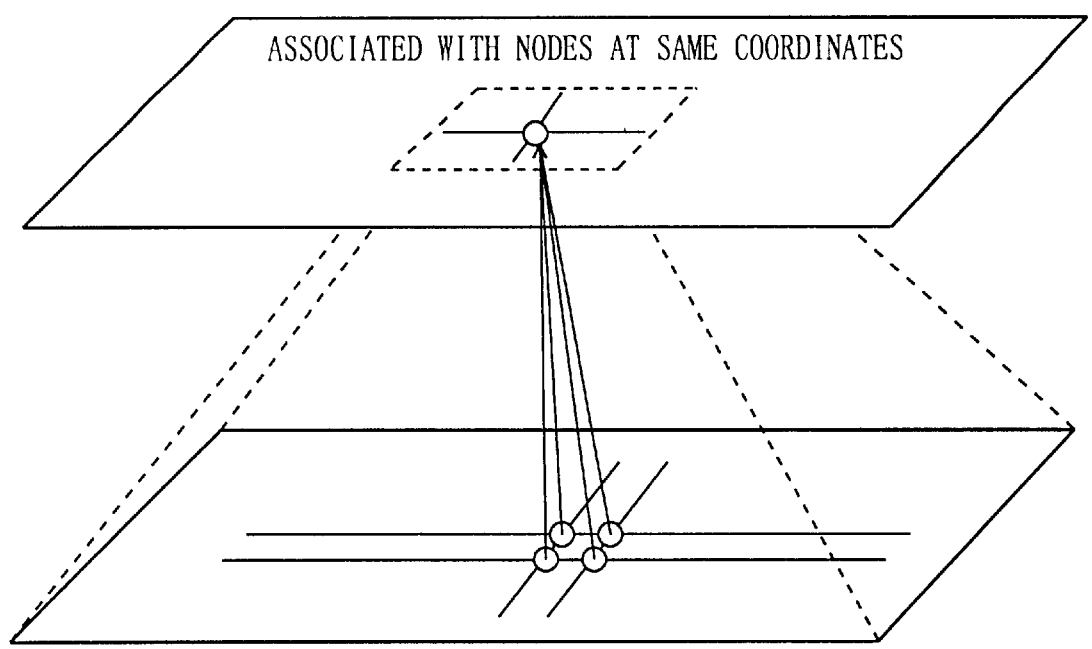
FIG. 40 is a diagram used to explain a problem which would be encountered during a process in which nodes N are associated with each other between lower-level and higher-level cartographic files CF.

In order to realize such retrieval, in conventional methods, the node records contained node numbers, offset addresses, etc. of the higher-level nodes N which represent the same positions as the nodes N at the lower level. However, when the lower-level cartographic file contains such information as is related to the internal data structure of the higher-level cartographic file, updating the higher-level cartographic file requires updating the lower-level cartographic file so that the process of moving from the lower to higher level can be smoothly achieved. Accordingly, in this embodiment, the cartographic files CF do not contain any information which is directly related to the internal data structure of higher-level cartographic files CF; the process of changing levels is achieved by referring to the node coordinate information and the link attribute information. In this case, however, a higher-level cartographic file CF generally has lower coordinate resolution than a map expressed by a lower-level cartographic file CF. Therefore, as shown in FIG. 40, between lower-level and high-level cartographic files CF, two nodes N having different coordinates may be represented by the same coordinates because of a rounding error produced at the higher level. Hence the higher-level node N corresponding to the lower-level node N cannot be uniquely specified with the node coordinates only.

Accordingly, this embodiment utilizes not only the node coordinates but also the order (arrangement) in which the node records NR are recorded. That is, in the first or second node table, the node records NR of both of the neighboring and non-neighboring nodes are arranged according to the clearly defined rules. Accordingly, even if a higher-level unit U has rounding errors in coordinates, the node records NR are recorded in the ascending orders of coordinates on the basis of the normalized longitude/latitude coordinates which do not contain the rounding errors. Accordingly, when the data processing portion 13 traces from a lower-level node N to a node N which is contained also in the parent unit PN and represents the same position, it can uniquely specify the corresponding node N in the parent unit PU according to the order of the node records NR, from among the nodes N which are recorded in the lower-level unit U and also in the parent unit U and which will be located at the same coordinates because of the rounding error on the higher level.

More specifically, among the cartographic files CF, as already stated, a parent file PU has longitudinal and latitudinal unit widths eight times larger than those of its child unit CU at the level immediately below. On the other hand, regardless of the level, each node has normalized coordinates which are normalized with 8000h (16 bits) both in the longitude and latitude directions of the unit U. That is to say, the coordinate resolution of the parent unit PU is ⅛ of that of the child unit CU both in the longitude and latitude directions. Therefore, if nodes N in the child unit CU have the same upper 13 bits in their normalized 16-bit longitude and latitude coordinates, they will have the same normalized coordinates in the parent unit PU.

Figure 41:
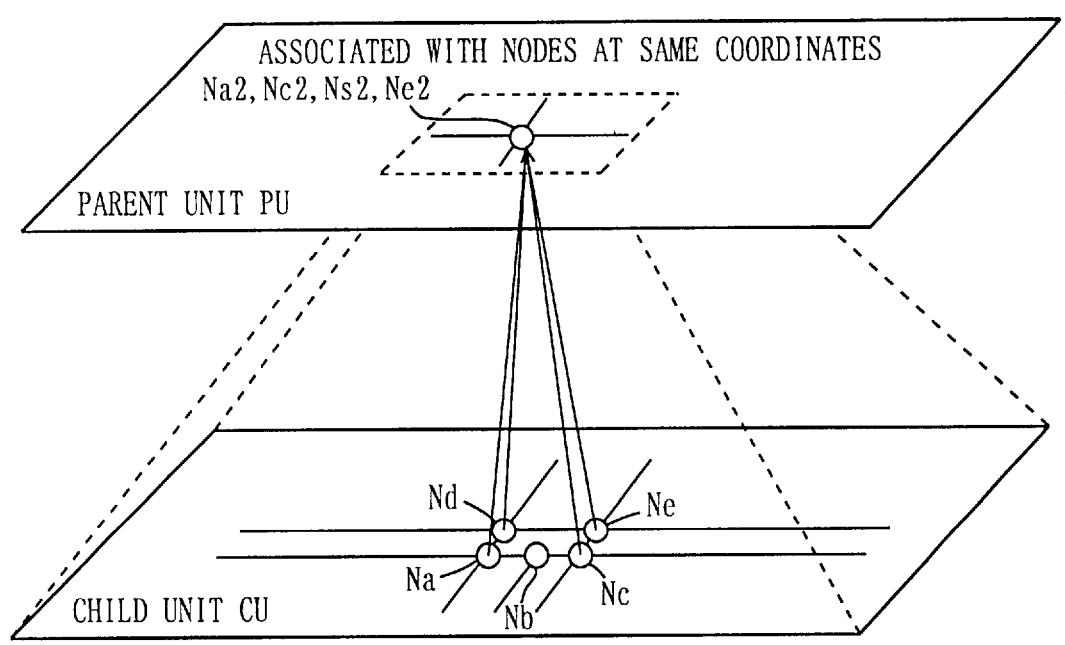
FIG. 41 is a diagram used to explain the correspondence between the nodes N in the lower-level and the higher-level cartographic files CF.
Figure 42:
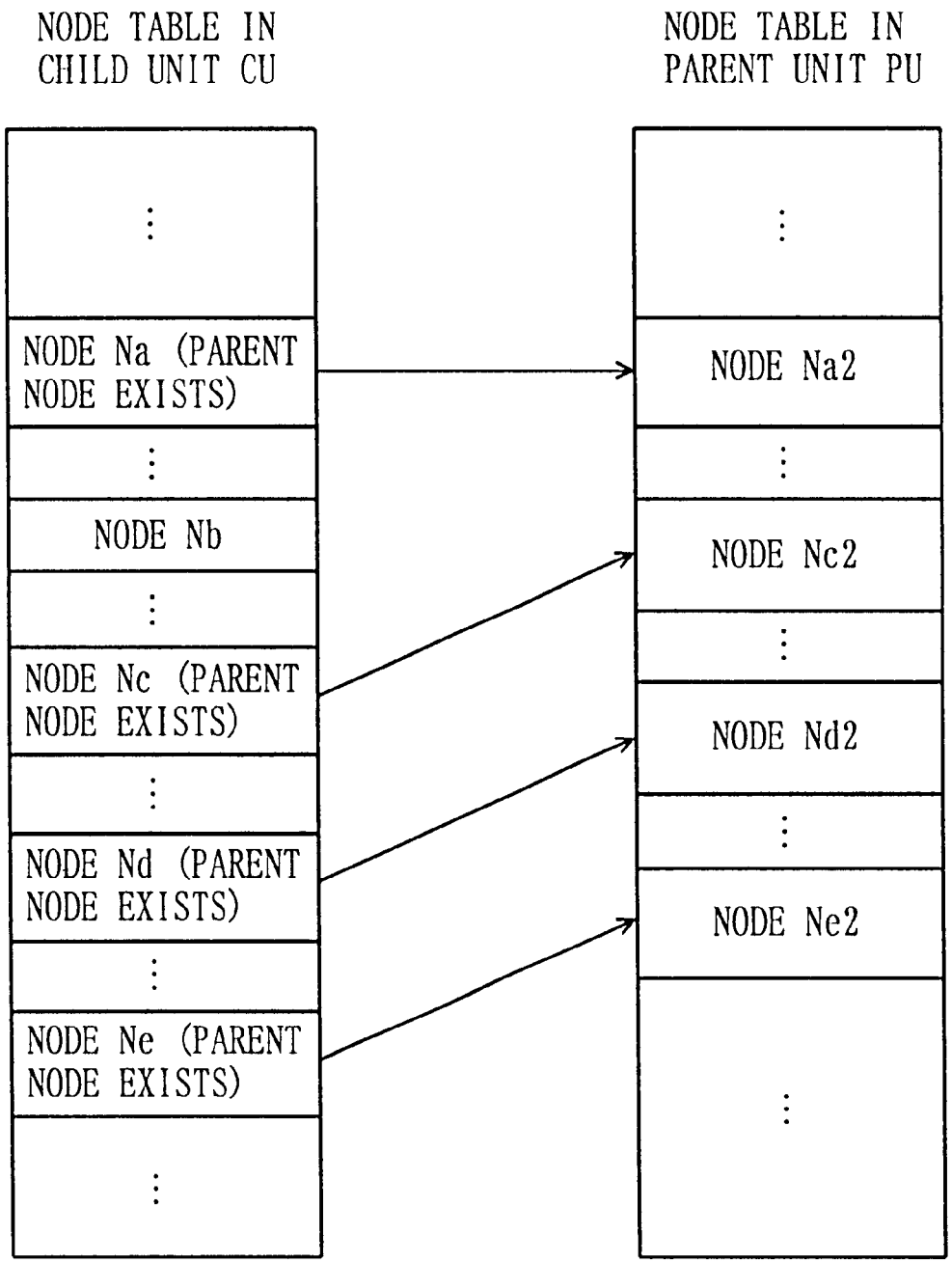
FIG. 42 is a diagram used to explain a method for searching, from a node Nd in a child unit CU, for a node having the corresponding coordinates in a parent unit PU, on the basis of the normalized coordinates and the order in which the node records NR are recorded.

For example, as shown in FIG. 41, suppose that the five nodes Na, Nb, Nc, Nd and Ne recorded in the child unit CU have the same upper 13 bits in their normalized 16-bit longitude and latitude coordinates and that the four nodes Na, Nc, Nd and Ne respectively have their parent nodes Na2, Nc2, Nd2 and Ne2 recorded in the parent unit PU (each node record NR has a flag or code showing the presence of its parent node UP). In this case, in the node table of the child unit CU, as shown in FIG. 42, the five node records NR of the nodes Na, Nb, Nc, Nd and Ne are recorded in the order of Na→Nb→Nc→Nd→Ne according to the order of ascending latitudes and longitudes (as already explained). Note that the five node records NR of the nodes Na, Nb, Nc, Nd and Ne are not necessarily successively recorded in the node table.

When the node table of the parent unit PU is generated, the node records NR of the parent nodes Na2, Nc2, Nd2 and Ne2, respectively corresponding to the nodes Na, Nc, Nd and Ne, are recorded in this order on the basis of the arrangement of the five node records NR (they are not necessarily recorded in successive positions). As a result, the parent node Nd2 in the parent unit PU can be identified for the node Nd recorded in the child unit CU as follows. First, in the node table, among the nodes N which have the same upper 13 bits in their 16-bit normalized coordinates and have their parent nodes N, the node Nd in the child unit CU is recorded in the third node record NR. Next, the normalized coordinates in the parent unit PU are calculated from the normalized coordinates of the node Nd in the child unit CU. Next, the node table of the parent unit PU is searched and the nodes N having the calculated normalized coordinates are found. As a result, in the example shown in FIGS. 41 and 42, the four nodes Na2, Nc2, Nd2 and Ne2 are detected. Next, since the parent node Nd corresponding to the node Nd in the child unit CU must be recorded in the third position among these four nodes Na2, Nc2, Nd2 and Ne2, it is known that the parent node of the node Nd is the node Nd2.

After having moved to the higher level, the data processing portion 13 repeats the steps S103 to S108 at that level and ends the route search when the searches from the starting point SP and the destination point DP have been connected.

In this way, the cartographic data of this invention is filed in units divided in rectangular areas and the individual units do not contain any record numbers, record addresses, etc. which are related to the internal data structure of other units, both between neighboring units at the same level and between parent and child units at different levels; this allows the cartographic data to be flexibly updated by replacing a unit file representing an arbitrary area at an arbitrary level.

(Process of Transmitting/Receiving the Cartographic Files CF)

Recently, systems in which the center station 2 provides maps to the terminal device 1 are being studied and developed. Such systems allow the terminal device 1 to extract a required map on demand. Therefore the second database 25 in the second storage device 24 of the center station 2 is generally larger in scale than the first database 111 in the terminal device 1. In this embodiment, the aforementioned file systems manage some cartographic files CF in the first database 111 and the second database 25. The center station 2 and the terminal device 1 transmit/receive the cartographic files CF as described below.

First, the terminal device 1 requests the center station 2 to transmit a cartographic file CF. FIG. 43(a) is a flowchart showing the procedure in which the terminal device 1 requests the center station 2 to transmit a certain cartographic file CF. FIG. 43(b) is a diagram showing the format of the request REQ sent as control data through the procedure of FIG. 43(a). When the user of the terminal device 1 wants to add a new cartographic file CF to the first storage device 19 or update an old cartographic file CF to a newer version, the user operates the input device 11 to activate the map request/receive function. Next, the user operates the input device 11 according to a menu screen displayed on the display of the output device 110 to enter the area and the level (hierarchical level) of the desired map. In response to the input from the user, the input device 11 outputs information indicative of the map area and level to the data processing portion 13 (step S401). In the process of entering the map area, the user may operate the input device 11 to enclose the desired area with a rectangular region on a wide-area map displayed on the display, or may operate the input device 11 to specify the area by using an address index.

Receiving the area and level information from the input device 11, the data processing portion 13 converts the area information into longitude and latitude coordinates. The data processing portion 13 then outputs the longitude and latitude coordinates and the level information to the request generating portion 14. The request generating portion 14 generates a request REQ having the format shown in FIG. 43(b) by using the input longitude and latitude coordinates and level information (step S402). In FIG. 43(b), the request REQ includes information showing the level of the cartographic file CF the user requires, and the longitude and latitude coordinates specifying the area of the map the cartographic file CF covers. More specifically, when the user specifies the area by enclosing it in a rectangular region on a wide-area map, the longitude and latitude coordinates are composed of its lower left longitude coordinate, lower left latitude coordinate, upper right longitude coordinate and upper right latitude coordinate. The request generating portion 14 then outputs the generated request REQ to the first transmit/receive portion 15 and the first transmit/receive portion 15 sends out the input request REQ onto the uplink UL through the antenna 16 (step S403).

Figure 44:
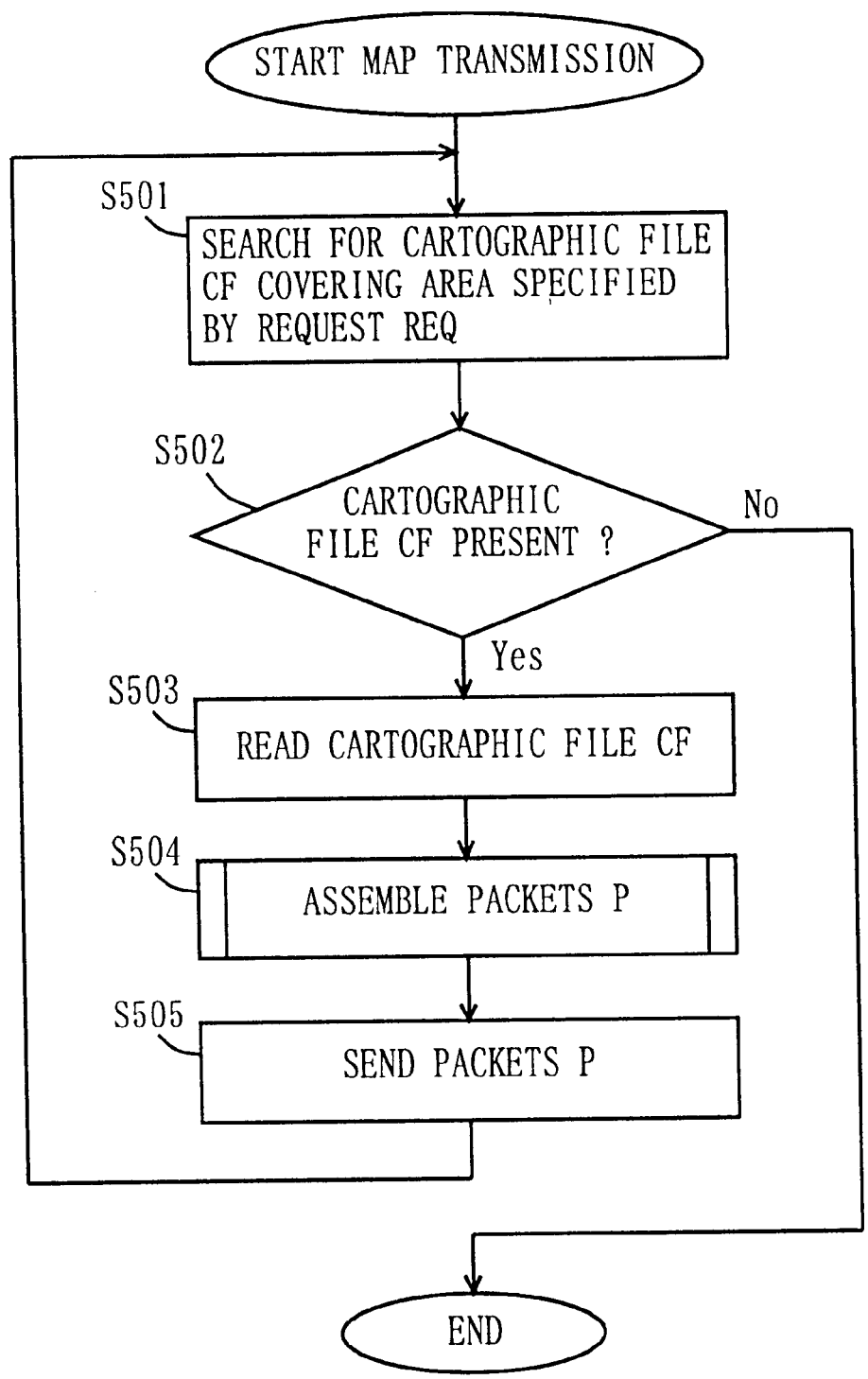
FIG. 44 is a flowchart showing the procedure which the center station 2 executes after receiving a request REQ.

Next, the process in which the center station 2 transmits the cartographic file CF is described. The request REQ sent from the terminal device 1 is received at the second transmit/receive portion 21 in the center station 2 through the uplink UL in the communication network 3. The second transmit/receive portion 21 outputs the received request REQ to the received request analyzing portion 22. FIG. 44 is a flowchart showing the procedure which the center station 2 executes after receiving the request REQ. The received request analyzing portion 22 analyzes the input request REQ and outputs the analyzed results to the read control portion 23. The read control portion 23 searches the second database 25 for the cartographic file CF specified by the analyzed results (step S501). The request REQ contains the level (hierarchical level) of the cartographic file CF requested from the terminal device 1 and the lower left longitude coordinate, lower left latitude coordinate, upper right longitude coordinate and upper right latitude coordinate of the map represented by that cartographic file CF. The received request analyzing portion 22 first extracts the lower left longitude and latitude coordinates from the request REQ and then derives the path name of the requested cartographic file CF according to the procedure shown by the flowchart of FIG. 35, during which it refers to the lower left longitude and latitude coordinates as the representative point.

Next, the received request analyzing portion 22 checks whether the cartographic file CF having the derived path name is stored in the second storage device 24 (step S502). When the cartographic file CF is absent, the center station 2 ends the process of FIG. 44. On the other hand, when the cartographic file CF is present, the read control portion 23 receives the path name derived by the received request analyzing portion 22 and reads out the requested cartographic file CF from the second storage device 24 according to the path name. The read control portion 23 transfers the read cartographic file CF to a memory in the packet assembler 25. The packet assembler 25 then reads in the requested cartographic file CF (step S503). The packet assembler 25 assembles packets P on the basis of the read cartographic file CF (step S504) and outputs them to the second transmit/receive portion 21. The second transmit/receive portion 21 sends out the input packets P onto the downlink DL (step S505). The step S504 will be described in detail later.

When the step S505 ends, in order to check whether the second database 25 contains a further cartographic file CF which represents the area specified by the request REQ, the received request analyzing portion 22 adds the longitude width W and the latitude width H at the level specified by the request REQ to the representative point coordinates previously specified in the step S501 and sets this value as a new representative point. The received request analyzing portion 22 then checks whether the longitude coordinate and the latitude coordinate of the new representative point exceed the upper right longitude coordinate and the upper right latitude coordinate specified by the request REQ. If the longitude and latitude coordinates of the new representative point do not exceed the upper right longitude and latitude coordinates, the center station 2 then performs the steps S502 to S505, where packets P are assembled on the basis of another cartographic file CF and transmitted to the terminal device 1. When the longitude coordinate and the latitude coordinate of the new representative point exceed the upper right longitude coordinate and the upper right latitude coordinate, the center station 2 recognizes that it has sent all requested cartographic files CF to the terminal device 1 and ends the process of FIG. 44.

The center station 2 repeats the steps S501 to S505 to send to the terminal device 1 cartographic files CF representing the map of the level and area as requested from the terminal device 1.

Figure 45:
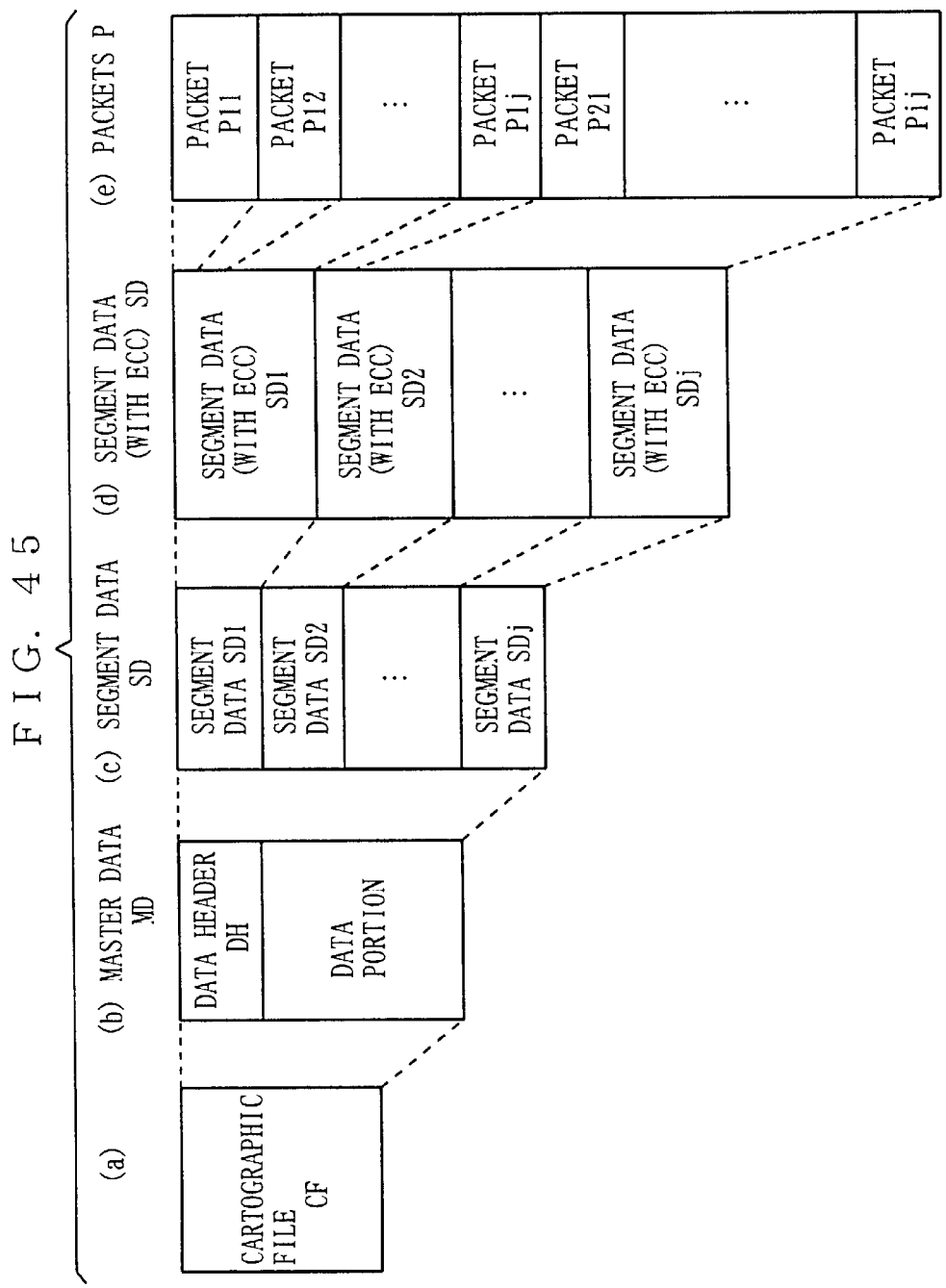
FIG. 45 is a diagram showing the structure of data generated during the process of assembling packets P from the cartographic file CF.
Figure 46:
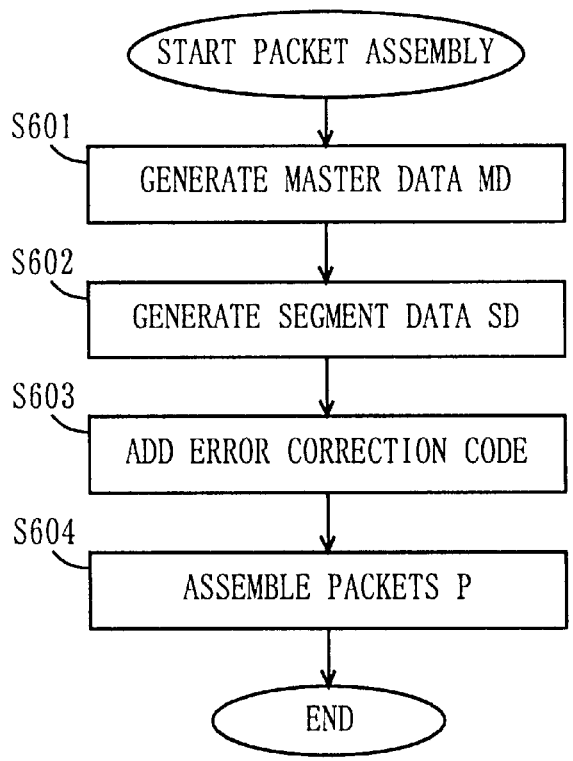
FIG. 46 is a flowchart showing the detailed procedure of step S504.
Figure 47:
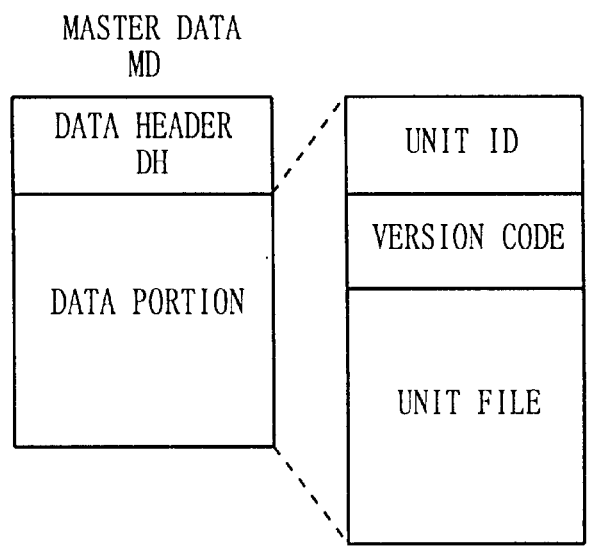
FIG. 47 is a diagram showing the detailed internal data structure of master data MD.

FIG. 45 shows the structure of data generated during the process in which the packets P are assembled from a cartographic file CF. When the step S503 ends, the packet assembler 25 contains one cartographic file CF as shown in FIG. 45(a). The packet assembler 25 executes the step S504. FIG. 46 is a flowchart showing the detailed procedure of the step S504. Referring to FIGS. 45 and 46, the operation of the packet assembler 25 is described in detail. First, the packet assembler 25 generates master data MD on the basis of the cartographic file CF contained therein (step S601). As shown in FIG. 45(b), the master data MD includes a data header DH and a data portion. FIG. 47 shows the detailed internal data structure of the master data MD. In FIG. 47, the data header DH includes a unit ID and a version code.

The unit ID is a code which specifies the cartographic file CF on which the master data MD is based. The version code is a code which represents the format version and contents version of the cartographic file CF on which the master data MD is based. The unit ID and the version code are both stored in the unit header of the cartographic file CF (see FIG. 7); the packet assembler 25 extracts them when it reads in the cartographic file CF and holds them. The unit ID and the version code are used by the terminal device 1 as will be described later.

The cartographic file CF itself is set in the data portion of the master data MD. As already stated, the cartographic file CF includes various kinds of tables (see FIG. 7). These tables do not contain information which would be referred to by each other. In order words, the terminal device 1 can use each table independently. For example, as shown in FIG. 8(a), the terminal device 1 can display only the basic background table on the output device 110. That is to say, each table has a separable data structure. Therefore the data portion may be formed with only the basic data of the basic background table, basic character/symbol table, highway node table and highway link table (i.e. data which represents a schematic map). Alternatively, the data portion may be formed with only the detailed data of the detailed background table, detailed character/symbol table, street node table and street link table. Part of the cartographic file CF may be set in the data portion in this way.

As shown in FIG. 7, the unit header contains the unit ID and the version code. The unit ID and the version code are contained in the data header DH (see FIG. 47). In this way, as the unit ID and the version code are set in the data portion of the master data MD, two unit IDs and two version codes are contained in the master data MD. Therefore this data portion do not necessarily have to contain the unit ID and the version code.

The packet assembler 25 divides the generated master data MD into i pieces. As shown in FIG. 45(c), i pieces of segment data SD1 to SDi are thus generated (step S602). In this step S602, the packet assembler 25 does not consider the data header DH and the data portion (i.e. the cartographic file CF) contained in the master data MD. That is to say, part of the data header DH and part of the data portion may be mixed in a piece of segment data SD. The i pieces of segment data SD are provided with numbers (which are referred to as segment numbers hereinafter). These segment numbers are preferably serial numbers which do not overlap among the segment data pieces. This facilitates operation of the terminal device 1 as will be described later.

The packet assembler 25 also attaches an error correction code (or error detection code) to the i pieces of segment data SD1 to SDi (step S603). As shown in FIG. 45(d), i pieces of segment data (with error correction code) SD1 to SDi are thus generated. The packet assembler 25 further divides each piece of segment data (with error correction code) SD1 to SDi into j pieces. Thus j packets are generated for each piece of the segment data SD as shown in FIG. 45(e) (step S604). As a result, the packet assembler 25 generates a total of i×j packets P11, P12 . . . P1j . . . Pij on the basis of one cartographic file CF. The i×j packets P11, P12 . . . P1j . . . Pij are provided with numbers (referred to as packet numbers hereinafter). The packet numbers are preferably serial numbers which do not overlap among the packets. This facilitates operation of the terminal device 1 as will be described later. The packet numbers allow the terminal device 1 to easily check whether the separately transmitted i×j packets P11, P12 . . . P1j . . . Pij are all present. When the step S604 ends, the packet assembler 25 exits from the subroutine of FIG. 46 and returns to the process of FIG. 44. It then performs the step S505. In the step S505, the packets P11, P12 . . . P1j . . . Pij are sequentially sent from the second transmit/receive portion 21 onto the communication network 3 (downlink DL) to the terminal device 1.

Next, referring to the flowchart of FIG. 48, the procedure in which the terminal device 1 receives the cartographic file CF will be described. The packets P11, P12 . . . P1j . . . Pij sent from the center station 2 are inputted to the antenna 16 of the terminal device I through the communication network 3. The first transmit/receive portion 15 sequentially receives the packets P11, P12 . . . P1j . . . Pij from the antenna 16 (step S701). The first transmit/receive portion 15 has a buffer memory not shown. The first transmit/receive portion 15 sequentially stores the received packets P11, P12 . . . P1j . . . Pij into the buffer memory.

The packet disassembler 17 periodically accesses the buffer memory of the first transmit/receive portion 15 to check whether the i×j packets P11, P12 . . . P1 . . . Pij sent from the center station 2 have been all stored in the buffer memory (step S702). The check in the step S702 is made on the basis of the packet numbers attached to the packets P11, P12 . . . P1j . . . Pij. More specifically, when the packet numbers are serial numbers, the packet disassembler 17 checks whether the packet numbers are all present from 1 to (i×j).

If all packets P are not present in the step S702, the packet disassembler 17 performs the step S701 again, instead of moving to the step S703. As a result, the first transmit/receive portion 15 eventually receives the lacking packets P.

On the other hand, when the step S702 shows that all packets P are present, the packet disassembler 17 moves to the step S703. The packet disassembler 17 disassembles the packets $P_{11}, P_{12} \ldots P_{1j} \ldots P_{ij}$ received in the step S701 to make up the master data MD (step S703). The step S703 also effects the error correction as needed. The disassembled master data MD is outputted to the data processing portion 13. The data processing portion 13 generates the cartographic file CF on the basis of the input master data MD and stores the generated cartographic file CF into the first storage device 19 in cooperation with the read/write control portion 18 (step S704).

After the step S704, the data processing portion 25 checks whether there still remains any series of packets P to be received (step S705). When there are packets P to be received, it returns to the step S701 to continuously receive the packets P. When there is no more packets to be received, it ends the process of FIG. 48.

Figure 48:
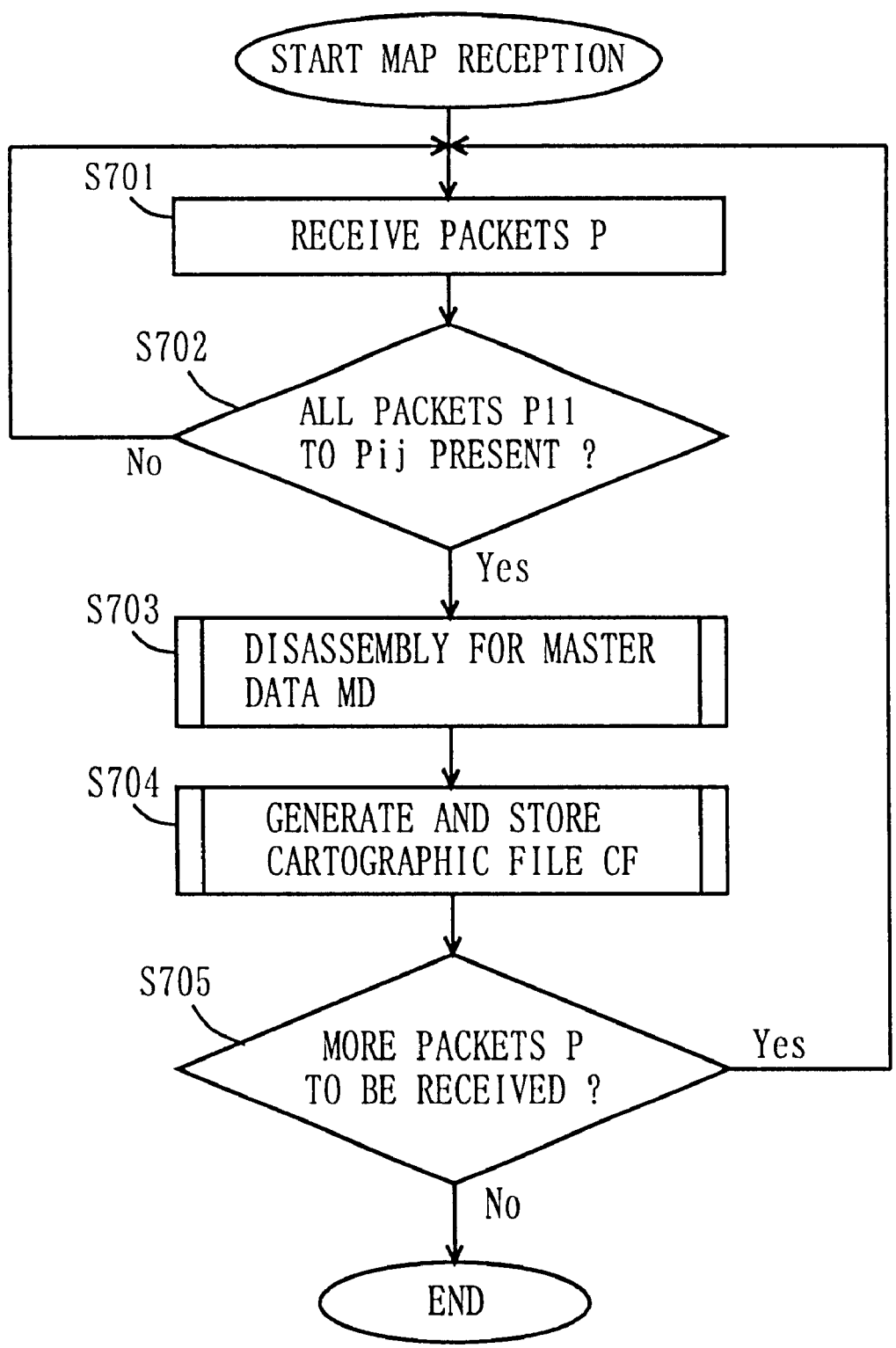
FIG. 48 is a flowchart showing the procedure in which the terminal device 1 receives a cartographic file CF.
Figure 49:
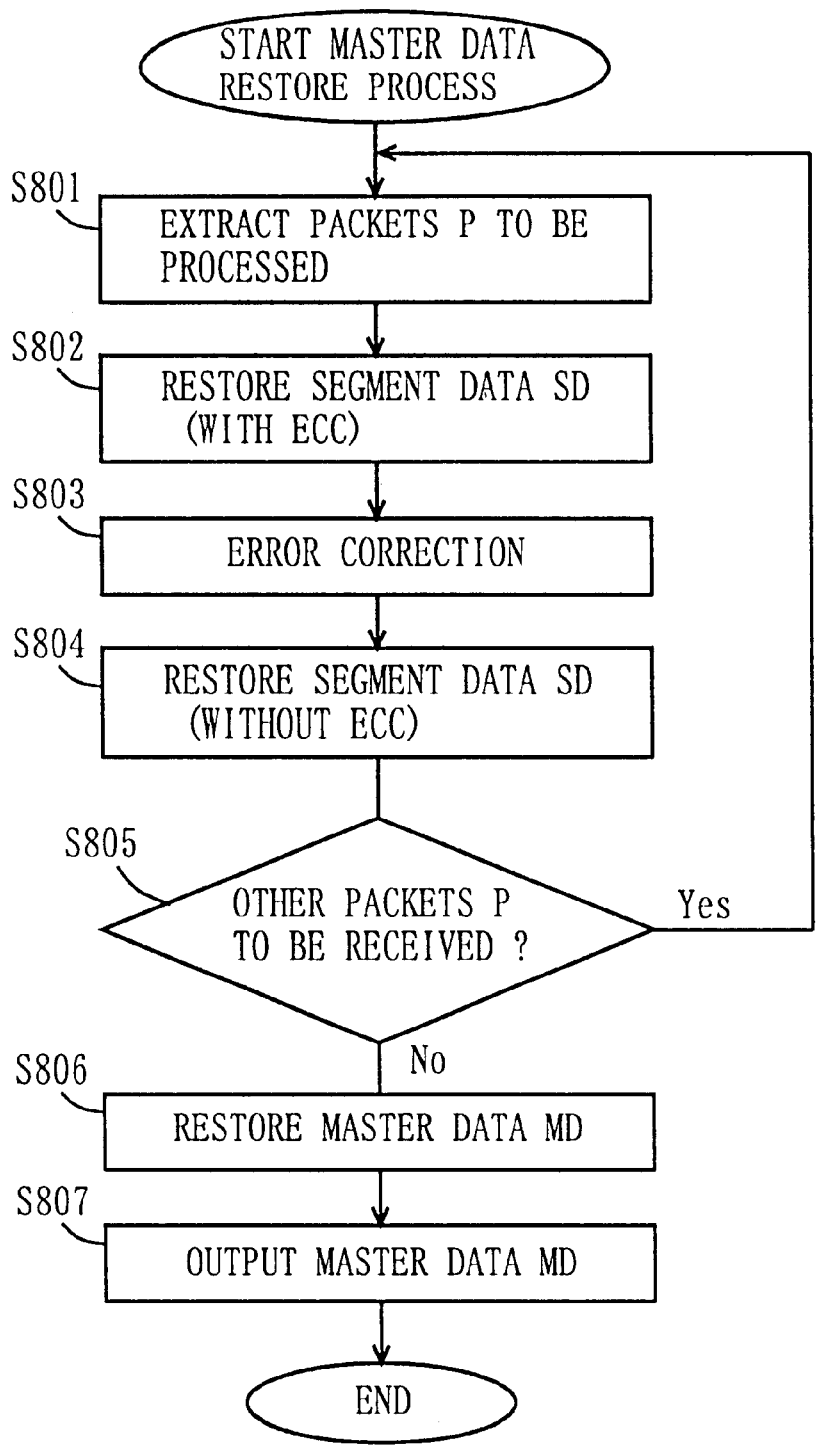
FIG. 49 is a flowchart showing the detailed procedure of the step S703 of FIG. 48.
Figure 50:
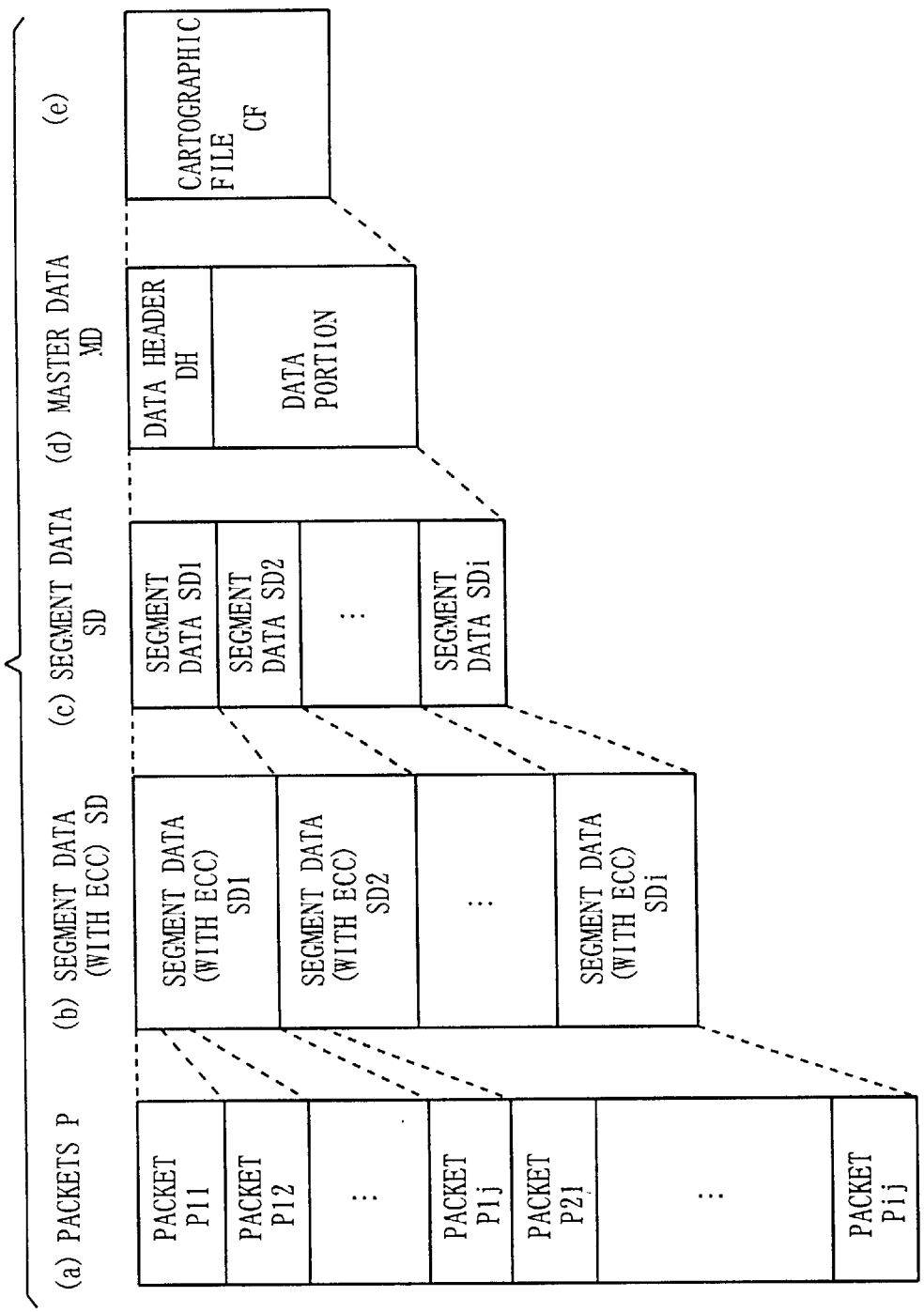
FIG. 50 is a diagram showing the structure of data generated during the process of generating a cartographic file CF from the packets P11, P12 . . . P1j . . . Pij.

FIG. 49 is a flowchart showing the detailed procedure of the step S703 of FIG. 48. FIG. 50 shows the structure of data generated during the process in which the cartographic file CF is generated from the packets P11, P12 . . . P1j . . . Pij. As is clear from the explanation above, when the step S703 of FIG. 48 begins, the series of packets P11, P12 . . . P1j . . . Pij are all present as shown in FIG. 50(a) in the first transmit/receive portion 15. The packet disassembler 17 extracts the packets P to be processed from the packets P11, P12 . . . P1j . . . Pij buffered in the first transmit/receive portion 15 (step S801). It is now assumed that the packet disassembler 17 extracts the packets P11, P12 . . . P1j.

Next, the packet disassembler 17 removes the packet number from each packet P extracted in the step S801. The packet disassembler 17 unites the packets P, from which the numbers have been removed, to restore one piece of segment data SD as shown in FIG. 50(b) (step S802). Under the assumption above, the packets P11, P12 . . . P1j are combined together to restore the segment data SD1.

Each segment data SD has the error correction code (or error detection code). After the step S802, by utilizing the error correction code, the packet disassembler 17 corrects errors possibly present in the restored segment data SD (with error correction code) (step S803).

Next, the packet disassembler 17 removes the error correction code from the segment data SD (with error correction code) and thereby restores the segment data SD (without error correction code) as shown in FIG. 50(c) (step S804). The restored segment data SD is held in the storage region in the packet disassembler 17. Under the assumption above, the segment data SD1 is error-corrected and held in the storage region of the packet disassembler 17.

After the step S804, the packet disassembler 17 checks whether there still remain any packets P to be processed in the first transmit/receive portion 15 (step S805). When there are packets P to be processed, the packet disassembler 17 returns to the step S801; it carries out the steps S801 to S804 to restore the segment data SD from the packets P as shown in FIG. 50(a) to (c). In this description, at the beginning of the process of FIG. 49, there are (i×j) packets P in the first transmit/receive portion 15. Therefore the loop of the steps S701 to S705 is repeated i times. As a result, the i pieces of segment data SD1 to SDi are restored.

When this loop has been repeated a required number of times, no packets P to be processed are left in the first transmit/receive portion 15. When the decision of the step S805 is made in this condition, the packet disassembler 17 moves to the step S806. When all packets P have been processed, the i pieces of segment data SD1 to SDi are being held in the packet disassembler 17. As stated above, the segment data SD1 to SDi each have a segment number. The packet disassembler 17 arranges the segment data SD1 to SDi in order according to the segment numbers, i.e. in the order of the serial segment numbers. Subsequently the segment numbers are removed from the segment data SD1 to SDi. The packet disassembler 17 then unites together the segment data SD1 to SDi from which the segment numbers have been removed. The master data MD is thus restored as shown in FIG. 50(d) (step S806). The restored master data MD is outputted to the data processing portion 13 (step S807).

Now, not only this map providing system but any communication system may encounter communication troubles. Therefore the terminal device 1 cannot always correctly restore all pieces of segment data SD. Correctly restored segment data SD is segment data SD which is identical to that the center station 2 generated. For example, suppose that the segment data SD2 was not correctly restored and other segment data SD1, SD3 to SDi were correctly restored. In such a case, the packet disassembler 17 can correct the segment data SD2 by using the error correction code attached to the segment data SD1, SD3 to SDi.

Figure 51:
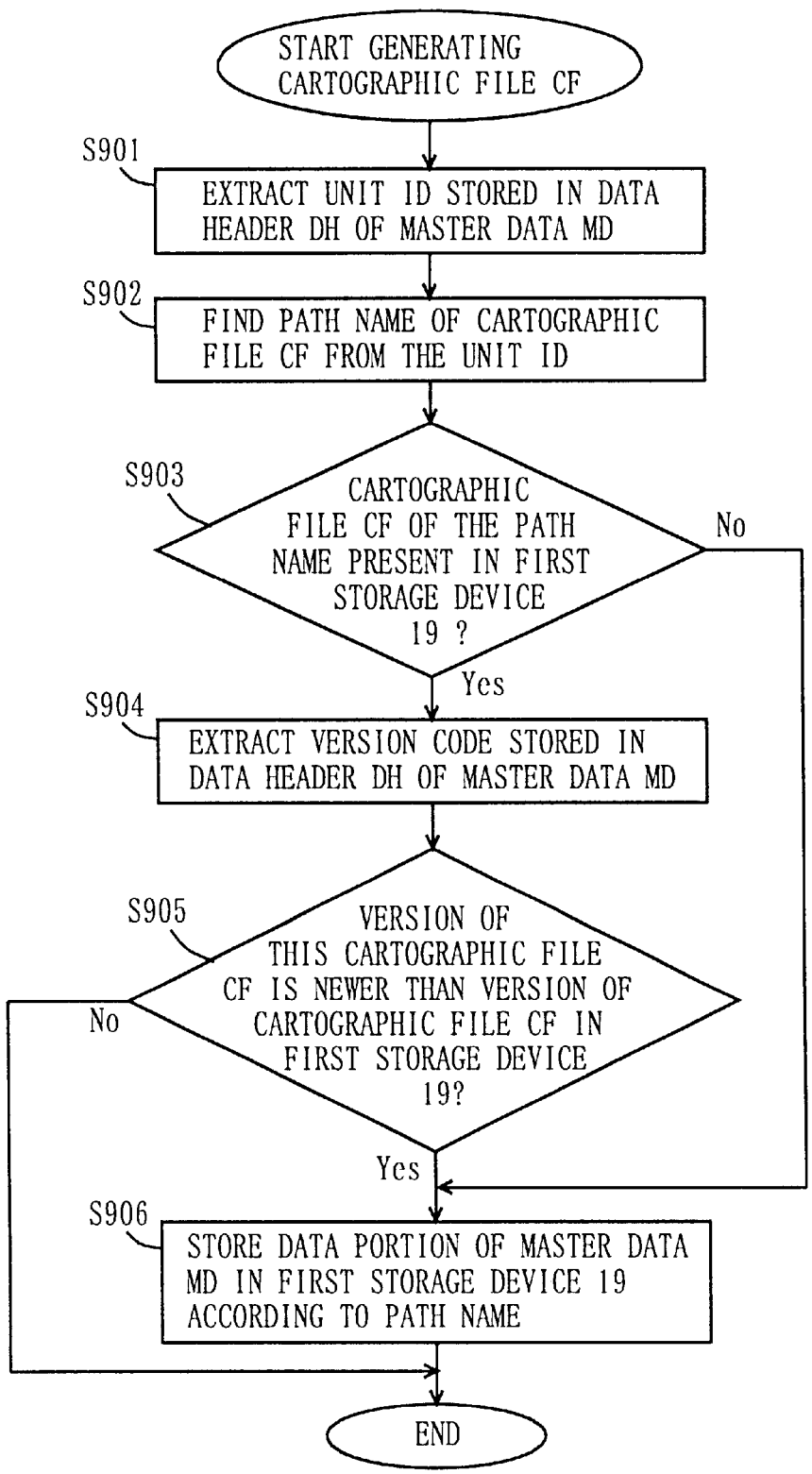
FIG. 51 is a flowchart showing the detailed procedure of the step S704 of FIG. 48.

In response to input of the master data MD, the data processing portion 13 starts the step S704. As already stated, this step S704 includes the process of generating the cartographic file CF from the master data MD and the process of storing the generated cartographic file CF in the first storage device 19. FIG. 51 is a flowchart which shows the detailed procedure of the step S704 of FIG. 48.

First, the data processing portion 13 extracts the unit ID from the data header DH of the input master data MD (step S901). As stated above, the unit ID and the path name of the unit are convertible from each other. The data processing portion 13 derives the path name of the cartographic file CF in the master data MD from the extracted unit ID.

The data processing portion 13 checks whether a cartographic file CF having the path name derived in the step S902 is already stored in the first storage device 19 (step S903). If not, the data processing portion 13 removes the data header DH from the master data MD and extracts the cartographic file CF. Then the data processing portion 13 transfers the derived path name and the cartographic file CF which has been received this time to the read/write control portion 18. The read/write control portion 18 stores the cartographic file CF received this time into the first storage device 19 according to the transferred path name. The new cartographic file CF has thus been added to the first database 111.

On the other hand, when the step S903 shows that a cartographic file CF having the path name derived in the step S902 is already present in the first storage device 19, the process proceeds as below. In this case, the data processing portion 13 moves to the step S904 and extracts the version code stored in the data header DH of the master data MD. Also, in cooperation with the read/write control portion 18, the data processing portion 13 reads out the cartographic file CF having the path name derived in the step S902 from the first storage device 19. The data processing portion 13 extracts the version code recorded in the unit header of the cartographic file CF read from the first storage device 19 and compares it with the version code extracted in the step S904. When the data processing portion 13 decides that the version code extracted from the master data MD is newer, it moves to the step S906 to extract only the data portion of the master data MD and stores the newer-version cartographic file CF in the first storage device 19. The old cartographic file CF in the first database 111 has thus been updated to a newer version.

On the other hand, when the cartographic file CF read from the first storage device 19 is newer, the data processing portion 13 discards the received master data MD. That is to say, the cartographic file CF currently received is not stored into the first storage device 19.

As described above, the cartographic files CF of this embodiment are generated as digital data in which maps on a plurality of scales are each sectioned into units. The region (logical region) where the cartographic files CF are stored is represented by the path names which are specified in a tree structure representing their parent-child relation and neighboring relation. The cartographic files CF are thus efficiently managed. Since each unit U does not contain any information related to the data structure of other units, the plurality of units U are remotely related with each other. Therefore, even when one cartographic file CF has been updated, other cartographic files CF do not have to be updated. In this way, according to the cartographic files CF of this embodiment, it is very easy to newly store and update the cartographic files CF in the first storage device 19.

When tracing the connection of a road network extending over adjacent units U of the cartographic files CF, the data processing portion 13 refers to the coordinate information about an exit node and an entry node and/or the attribute information about an exit link and an entry link. That is to say, the data processing portion 13 does not refer to information which is related to the internal data structure of the neighboring units NU, such as the record numbers or offset addresses of nodes N or links L recorded in the neighboring units NU. Therefore, even if one cartographic file CF in the first storage device 19 has been updated, the road network connection can be correctly traced between adjacent cartographic files CF, without the need to update the cartographic files CF of the neighboring units NU.

In this embodiment, when the road network connection is traced over the boundary between a unit U and a neighboring unit NU, it is necessary to retrieve the entry node and entry link of the neighboring unit NU. In each unit U, the node records NR and the link records LR are arranged according to the predetermined rules. This speeds up the process of retrieving the entry node and the entry link.

Furthermore, in the route search process of this embodiment, the data processing portion 13 has to find, from a node N at a lower level, a node N representing the same position in a cartographic file CF at a higher level. Also in this case, between the units U at the higher and lower levels, the child unit CU does not contain any information related to the internal data structure of the parent unit PU, and the parent unit PU does not contain any information related to the internal data structure of the child unit CU; hence, even if only the cartographic file CF at the higher level has been updated, it is not necessary to update the cartographic files CF which represent its child units CU.

Moreover, even when a partial area map, e.g. a unit U, has been updated to a new one, the data matching between neighboring units and between upper and higher levels can be retained; when the center station 2 provides cartographic files CF through wire or by wireless to the terminal device 1, it can send only a cartographic file CF the terminal device 1 requires. This reduces the data transmission time and the communication cost.

This embodiment has described a car navigation system as an example of the terminal device 1. However, this embodiment can be applied also to systems in which a database of the cartographic files CF is created in a personal computer and the personal computer displays map or executes route search. That is to say, this embodiment can be applied not only to mobile terminal devices but also to stationary terminal devices.

With a stationary terminal device, the communication network 3 does not have to be a wireless transmission path but it can be wired.

In this embodiment, the terminal device 1 makes bidirectional communication with the center station 2 through the communication network 3 so as to inform the center station 2 of the area of a map the user requires and to receive the cartographic file CF of that area. However, the center station 2 may transmit the cartographic file CF to the terminal device 1 in a broadcasting manner.

Further, in this embodiment, the first database 111 and the second database 25 contain cartographic files CF having a four-level hierarchical structure including levels "0" to "3". However, the cartographic files CF in the first database 111 and the second database 25 may be generated at any number of levels; i.e. it is not limited to the four-level structure.

Moreover, in this embodiment, the map at each level is divided at equal intervals in the longitude and latitude directions to form the rectangular areas (units U). However, the map at each level may be divided at various intervals in the longitude and latitude directions in such a manner that the cartographic files CF at each level contain an almost equal amount of data. However, it is necessary in this case that each cartographic file CF be provided with information which specifies the division sizes in the longitude and latitude directions.

Also, in this embodiment, one cartographic file CF is generated for one unit U. However, each cartographic file CF may be formed with a plurality of units U and management information for managing the plurality of units U. In this case, it is desired that the number of units U collected in one cartographic file CF be limited to about 64 at most and that the management information for managing the collection of units U be simple, so that the cartographic files CF can be easily updated.

In one cartographic file CF, the node records NR of the neighboring nodes may be recorded in an order tracing the boundary of the unit U in one direction. For example, suppose that the node records NR of the neighboring nodes are recorded in a clockwise order starting from the lower left corner of the unit U. Under this assumption, in the unit U1 of FIG. 39, the node records NR of the neighboring nodes are recorded in the order of :N10→N11→N12→N13→N14→N15→N18→N17→N16→N20→N19. Also, the node records NR of the neighboring nodes contained in the unit U3 are recorded as:N30→N31→N32→N34→N33→N38→N37→N36→N35. Further, the node records NR of the neighboring nodes contained in the unit U2 are recorded as: N20→N21→N22→N23→N24→N25→N27→N26. Now a specific example is described, where the data processing portion 13 searches for the neighboring nodes N37 and N38 which correspond to the neighboring nodes N14 and N15. As stated above, in the cartographic file CF of the unit U1, the node records NR of the neighboring nodes N14 and N15 are recorded in the order of N14→N15. In the cartographic file CF of the unit U3, the node records NR of the neighboring nodes N37 and N38 are recorded in the order of N38→N37. Then, when the data processing portion 13 has found the neighboring node N37 which corresponds to the neighboring node N14, the neighboring node corresponding to the neighboring node N15 is recorded in the position immediately preceding the node record NR of the neighboring node N37. The data processing portion 13 can thus quickly find the neighboring node corresponding to the neighboring node N15. In this way, when the node records NR of the neighboring nodes are recorded in an order which follows along the boundary of the unit U, the neighboring nodes located on the boundary between the unit N and its neighboring unit are successively arranged in reverse orders in their respective cartographic files CF, which allows the data processing portion 13 to quickly find a correspondence between a neighboring node of the unit and a neighboring node in the neighboring unit.

Second Embodiment

FIG. 52 shows the structure of a map providing system according to a second embodiment of the invention. This map providing system contains a center station 101 and a terminal device 102. The center station 101 and the terminal device 102 are connected trough a wireless transmission path 103. The wireless transmission path 103 at least contains a downlink from the center station 101 to the terminal device 102. The center station 101 has a map server 1011 and an antenna 1012. The map server 1011 includes a first storage device 1013, a read control portion 1014, a packet assembler 1015 and a transmitting portion 1016. The terminal device 102 is typically a car navigation system, which comprises an antenna 1021, a receiving portion 1022, a data processing portion 1023 containing a packet disassembler 1024 and a file managing portion 1025, and a second storage device 1026.

Next, the structure of the center station 101 is described. The first storage device 1013 contains at least one cartographic file which can be provided to the terminal device 102. Details of the cartographic file CF will be described later. The first storage device 1013 is typically composed of a hard disk drive, CD-ROM drive or D-V-D-ROM drive.

The read control portion 1014, when required, reads part of the cartographic file CF from the first storage device 1013 as cartographic data CD to be provided to the terminal device 102. The cartographic data CD will be described in detail later. The read cartographic data CD is outputted to the packet assembler 1015.

The packet assembler 1015 assembles packets P on the basis of the input cartographic data CD. Detailed operation of the packet assembler 1015 and the form of the packets P will be described later. The assembled packets P are outputted to the transmitting portion 1016.

The transmitting portion 1016 sends out the input packets P onto the wireless transmission path 103 through the antenna 1012 and thereby the cartographic data CD is sent to the terminal device 102 as the packets P. The transmitting portion 1016 and the antenna 1012 are typically realized with a mobile communication device such as a mobile phone, or with a broadcasting device for ground wave digital broadcast or satellite digital broadcast, for example.

Next, the structure of the terminal device 102 is described. The receiving portion 1022 receives the packets P sent from the center station 101 through the wireless transmission path 103. The antenna 1021 and the receiving portion 1022 are typically formed with a mobile communication device such as a mobile phone or with a receiver device for ground wave digital broadcast or satellite digital broadcast, for example. The receiving portion 1022 outputs the received packets P to the packet disassembler 1024.

The packet disassembler 1024 disassembles the input packets P to restore the cartographic data CD. The restored cartographic data CD is outputted to the file managing portion 1025.

The file managing portion 1025 processes the input cartographic data CD according to a predetermined procedure. This procedure will be described later. This processing generates the cartographic file CF. The cartographic file CF has the same structure as the cartographic file CF cartographic data in the center station 101. The cartographic file CF will be described in detail later.

The second storage device 1026 has a readable and writable large-capacity storage medium. The second storage device 1026 is typically composed of an HDD, DVD-RAM driving device. The cartographic file CF generated by the file managing portion 1025 is written on this storage medium. As is known, the second storage device 1026 manages the storage region in clusters.

While the data processing portion 1023 thus carries out the decoding and file management operations, it also performs various other operations (e.g. route search, map matching and route guide). Further, as required, the data processing portion 1023 extracts part of a cartographic file CF in the second storage device 1026 and outputs it to an output device described later. The terminal device 102 comprises an input device and an output device as well as the components depicted in the drawing. However, these operations and the input and output devices are not described in detail herein and not shown in the drawings, since they are not main features of this invention.

The input device and the output device are now only briefly described. The input device is operated by a user of the terminal device 102. Through the input device, the user requests the terminal device 102 to scroll the map, to change the scale, etc. The output device is mainly composed of a display and a speaker. The display displays a map as required. The display also displays the results of route search or route guide carried out by the data processing portion 1023. The speaker provides the user, through speech, with the results of the route guide process performed by the data processing portion 1023.

Next, referring to FIG. 53, the structure of each cartographic file CF is described. First, as shown in FIG. 53(*a*), a map α which covers a certain area is sectioned into M×N areas (M and N are arbitrary natural numbers) of a predetermined shape to form units $U_{0,0}$ to $U_{M-1, N-1}$ (for convenience, the map is sectioned in rectangular shape in this embodiment). The units $U_{0,0}$ to $U_{M-1, N-1}$ are processed into data to form unit data $UD_{0,0}$ to $UD_{M-1, N-1}$. The unit data $UD_{0,0}$ to $UD_{M-1, N-1}$ form part of unit records $UR_{0,0}$ to $UR_{M-1, N-1}$ described later. A cartographic file CF is generated on the basis of the units $U_{0,0}$ to $U_{M-1, N-1}$ and stored in a given address region in the first storage device 1013.

As shown in FIG. 53(*b*), each cartographic file CF contains a file header FH, unit management information $MI_{UNIT}$, and M×N unit records $UR_{0,0}$ to $UR_{M-1, N-1}$. The file header FH contains information which specifies the area the cartographic file CF (map α) covers. More specifically, the file header FH includes the minimum latitude $LAT_{MIN}$ and longitude $LON_{MIN}$, the maximum latitude $LAT_{MAX}$ and longitude $LON_{MAX}$, the real distance $D_{LAT}$ in the latitude direction, and the real distance $D_{LON}$ in the longitude direction. As shown in FIG. 53(*a*), $LAT_{MIN}$, $LON_{MIN}$, $LAT_{MAX}$ and $LON_{MAX}$ indicate the minimum latitude, minimum longitude, maximum latitude and maximum longitude of the map α. As shown in FIG. 53(*a*), $D_{LAT}$ and $D_{LON}$ indicate the real distances of the map α in the latitude and longitude directions. Thus $LAT_{MIN}$, $LON_{MIN}$, $LAT_{MAX}$, $LON_{MAX}$, $D_{LAT}$ and $D_{LON}$ define the area the cartographic file CF (i.e. the map α) covers.

The unit management information $MI_{UNIT}$ contains information for managing the unit records $UR_{0,0}$ to $UR_{M-1, N-1}$. More specifically, the unit management information $MI_{UNIT}$ contains the number of unit records contained in the cartographic file CF, NOU, and offset values $X_{0,0}$ to $X_{M-1, N-1}$ of the unit records. NOU is the value M×N. The offset values $X_{0,0}$ to $X_{M-1, N-1}$ each represent the offset from the top address of the cartographic file CF (the position where it is stored in the first storage device 1013) to the top address where the unit records $UR_{0,0}$ to $UR_{M-1, N-1}$ are stored. FIG. 53(*b*) shows, by way of example, the offset value $X_{0,0}$ of the unit record $UR_{0,0}$.

The unit records $UR_{0,0}$ to $UR_{M-1, N-1}$ are stored in the storage medium of the first storage device 1013 on the basis of the addresses specified by the offset values $X_0$ to $X_{N-1}$ in the unit management information $MI_{UNIT}$. As shown in FIG.

54, the unit records $UR_{0,0}$ to $UR_{M-1, N-1}$ contain the unit data $U_{0,0}$ to $U_{M-1, N-1}$. The unit data $U_{0,0}$ to $U_{M-1, N-1}$ are provided with their respective unit headers $UH_{0,0}$ to $UH_{M-1, N-1}$. The unit records $UR_{0,0}$ to $UR_{M-1,N-1}$ are formed in this way.

Now, to specifically explain each unit record UR, the unit record $UR_{0,0}$ is described as an example. First, as shown in FIG. 53, the unit data $UD_{0,0}$ is data which represents one of the areas sectioned in the map α; it is real data which forms the map of the area which the corresponding unit $U_{0,0}$ represents. Now, for clear explanation, the map in the area represented by the unit $U_{0,0}$ is referred to as a map $β_{0,0}$. More specifically, the unit data $UD_{0,0}$ includes background data $BD_{0,0}$, character/symbol data $CD_{0,0}$, and road network data $ND_{0,0}$ about the map $β_{0,0}$.

Figure 54:
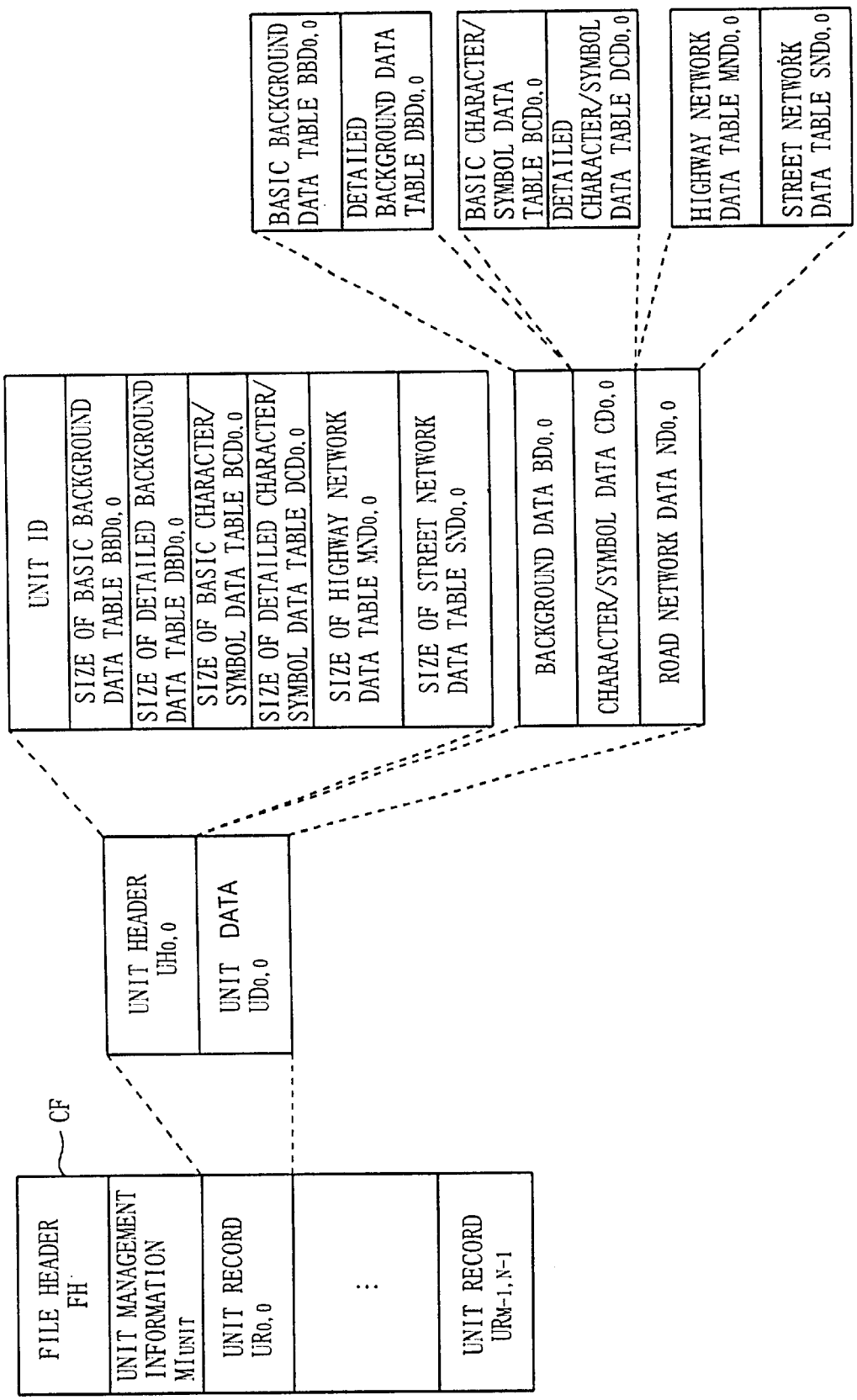
FIG. 54 is a diagram showing the detailed structure of each unit record UR shown in FIG. 53(b)
Figure 55:
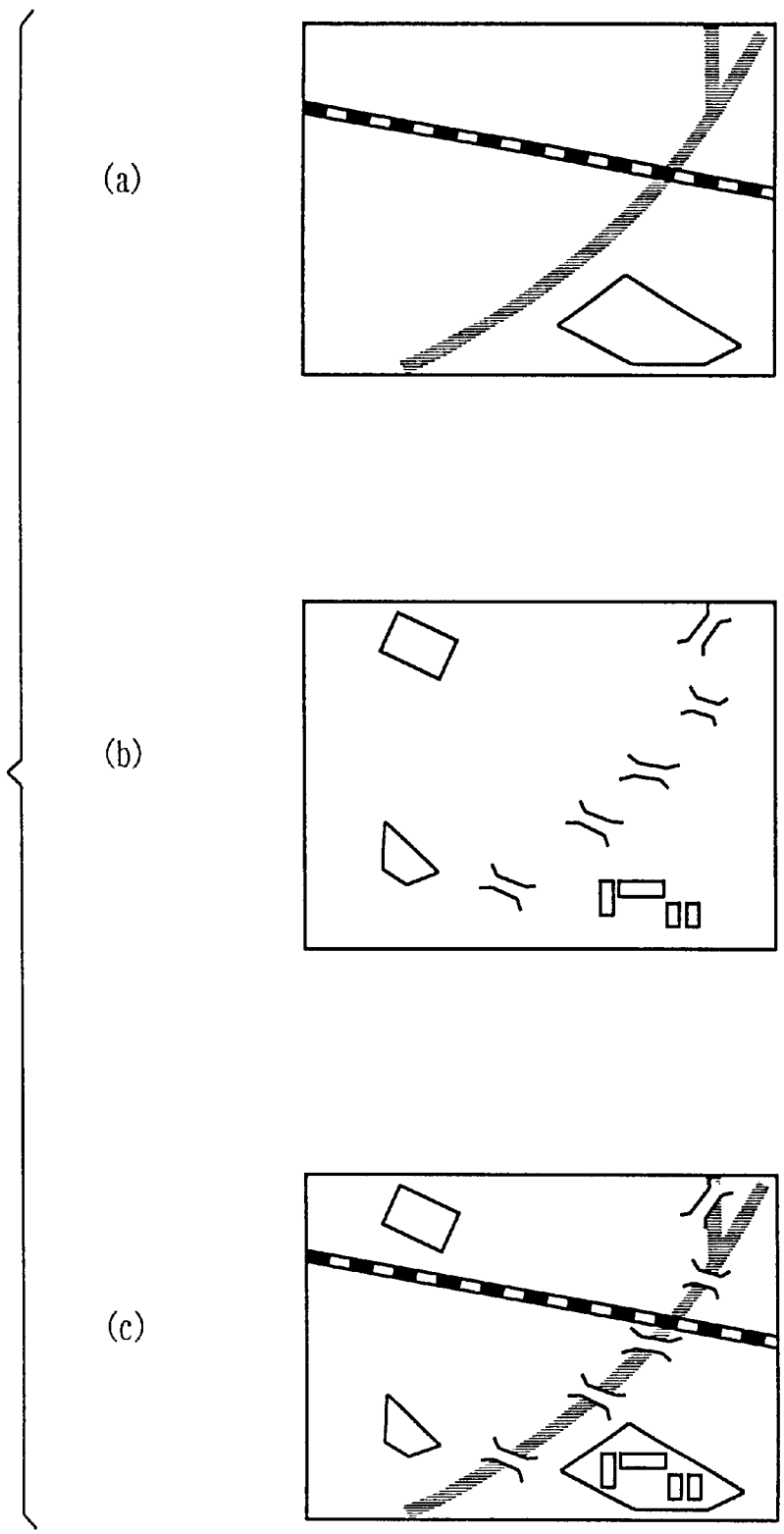
FIG. 55 is a diagram used to explain background data BD shown in FIG. 54.

The background data $BD_{0,0}$ is graphic data for displaying a river, railroad, green belt, buildings, bridges, etc. on the map $β_{0,0}$. As shown in FIG. 54, the background data $BD_{0,0}$ is composed of a basic background data table $BBD_{0,0}$ and a detailed background data table $DBD_{0,0}$. As shown in FIG. 55(a), the basic background data table $BBD_{0,0}$ contains graphic data for displaying basic elements (i.e. background) on the map $β_{0,0}$ such as a river, railroad, green belt, etc. As shown in FIG. 55(b), the detailed background data table $DBD_{0,0}$ contains graphic data about buildings, bridges, etc. to display the basic background on the map $β_{0,0}$ in greater detail.

As shown in FIG. 54, the basic background data table $BBD_{0,0}$ and the detailed background data table $DBD_{0,0}$ have independent structures. Therefore the center station 101 and the terminal device 102 can separate the basic background data table $BBD_{0,0}$ and the detailed background data table $DBD_{0,0}$ and use them independently. That is to say, as shown in FIG. 55(a), the terminal device 102 can display the basic background data table $BBD_{0,0}$ alone. Further, as shown in FIG. 55(c), the terminal device 102 can superimpose the detailed background data table $DBD_{0,0}$ on the basic background data table $BBD_{0,0}$.

The background of the map $β_{0,0}$ is formed by superimposing the background displayed by the basic background data table $BBD_{0,0}$ and that displayed by the detailed background data table $DBD_{0,0}$. That is, seen from a different aspect, the detailed background data table $DBD_{0,0}$ is the differential data between the background data $BD_{0,0}$ and the basic background data table $BBD_{0,0}$.

Figure 56:
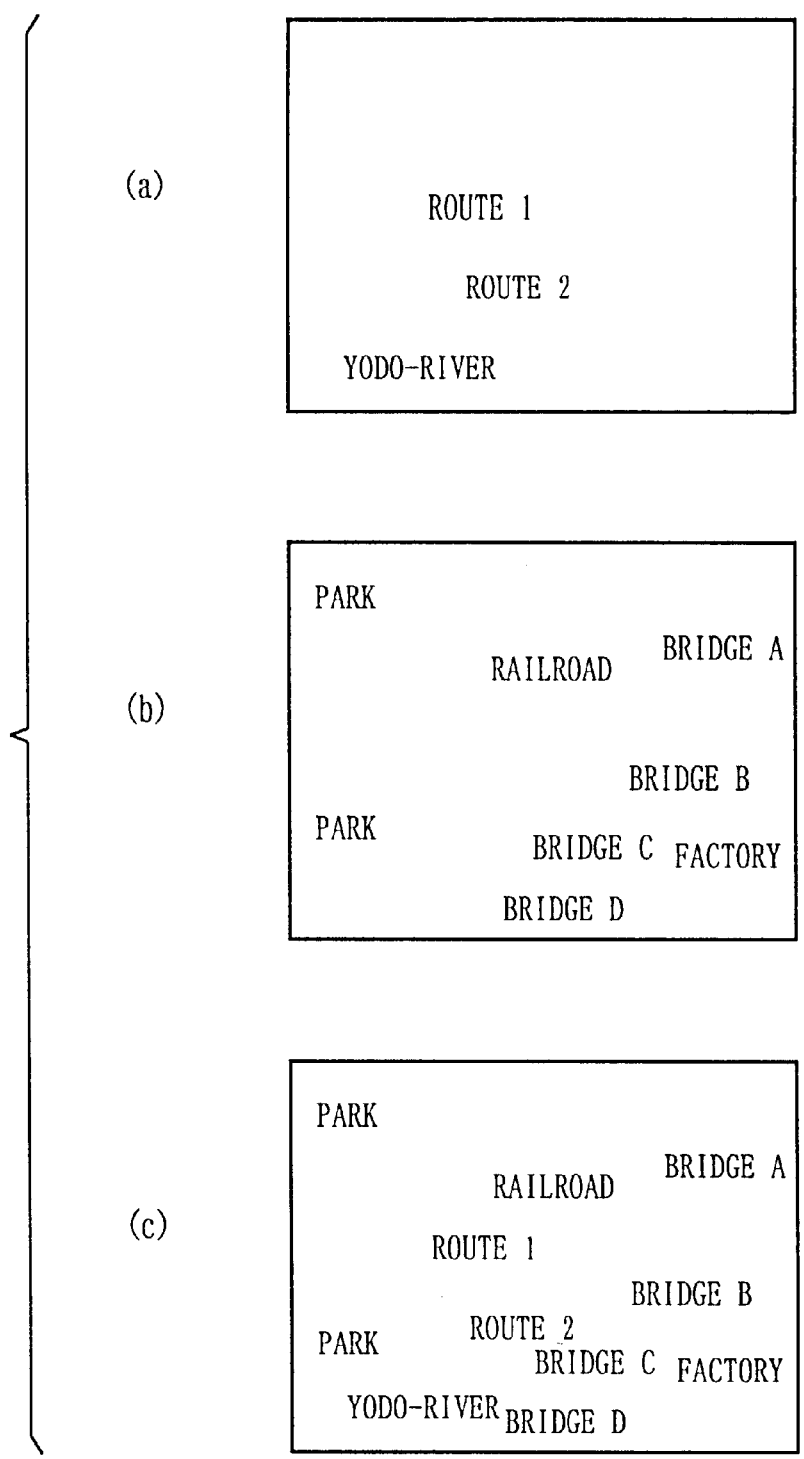
FIG. 56 is a diagram used to explain character/symbol data CD shown in FIG. 54.

The character/symbol data $CD_{0,0}$ is data which represents character strings and/or map symbols on the map $β_{0,0}$. The character/symbol data $CD_{0,0}$ shows the names of places, roads, and facilities, map symbols, etc. on the map $β_{0,0}$. As shown in FIG. 54, the character/symbol data $CD_{0,0}$ is composed of a basic character/symbol data table $BCD_{0,0}$ and a detailed character/symbol data table $DCD_{0,0}$. As shown in FIG. 56(a), the basic character/symbol data table $BCD_{0,0}$ contains basic data about the map $β_{0,0}$ such as the names of places and roads, map symbols, etc. As shown in FIG. 56(b), the detailed character/symbol data table $DCD_{0,0}$ contains data required to display the details of the map $β_{0,0}$, such as the names of parks, railroads, bridges, factories, etc.

As shown in FIG. 54, the basic character/symbol data table $BCD_{0,0}$ and the detailed character/symbol data table $DCD_{0,0}$ have independent structures. This allows the basic character/symbol data table $BCD_{0,0}$ and the detailed character/symbol data table $DCD_{0,0}$ to be used independently. That is to say, the terminal device 102 can display the basic character/symbol data table $BCD_{0,0}$ alone as shown in FIG. 56(a), or superimpose the detailed character/symbol data table $DCD_{0,0}$ on the basic character/symbol data table $BCD_{0,0}$ as shown in FIG. 56(c).

The detailed character/symbol data table $DCD_{0,0}$ is the differential data between the character/symbol data $CD_{0,0}$ and the basic character/symbol data table $BCD_{0,0}$.

Figure 57:
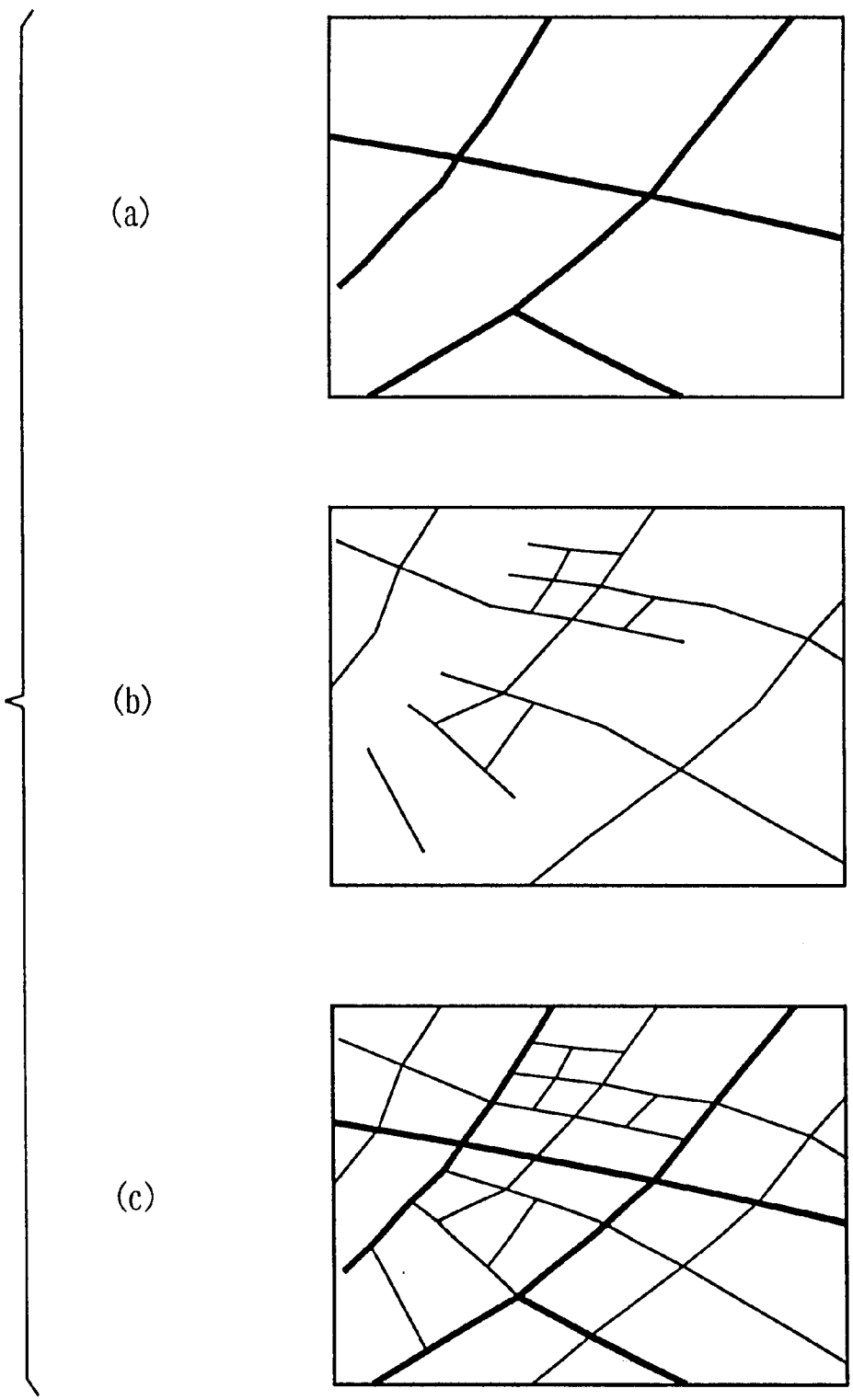
FIG. 57 is a diagram used to explain road network data ND shown in FIG. 54.

The road network data $ND_{0,0}$ is data which is used together with the background data $BD_{0,0}$ and the character/symbol data $CD_{0,0}$ to display roads on the map $β_{0,0}$. This road network data $ND_{0,0}$ is also used during the process of map matching, route search, or route guide. The road network data $ND_{0,0}$ is composed of a highway network data table $MND_{0,0}$ and a street network data table $SND_{0,0}$. As shown in FIG. 57(a), the highway network data table $MND_{0,0}$ contains road network data about relatively wide roads (e.g. 5.5 meters or larger), i.e. road network data about highways. It is desired that, in the highway network data table $MND_{0,0}$, the road network data is classified according to road type, such as freeway, general national road, prefectural road, etc. As shown in FIG. 57(b), the street network data table $SND_{0,0}$ contains road network data about relatively narrow roads (e.g. between 3.0 and 5.5 meters), i.e. road network data about streets.

Like the basic background data table $BBD_{0,0}$ and the detailed background data table $DBD_{0,0}$, the highway network data table $MND_{0,0}$ and the street network data table $SND_{0,0}$ have their respective independent structures. Therefore, as shown in FIG. 57(a), the terminal device 102 can display only the highways by using the highway network data table $MND_{0,0}$ alone. The terminal device 102 can also display, as shown in FIG. 57(b), only streets by using the street network data table $SND_{0,0}$ alone. Further, as shown in FIG. 57(c), the terminal device 102 can also superimpose the street network data table $SND_{0,0}$ on the highway network data table $MND_{0,0}$ to display the highways and streets.

The street network data table $SND_{0,0}$ is the differential data between the road network data $ND_{0,0}$ and the highway network data table $MND_{0,0}$.

During the map matching process etc., the terminal device 102 can use the highway network data table $MND_{0,0}$ alone, or can use both of the highway network data table and the street network data table $SND_{0,0}$.

The highway network data table $MND_{0,0}$ and the street network data table $SND_{0,0}$ are used also to trace the connection between a highway and a street. A node representing the intersection of the highway and the street is used to trace such connection.

As shown in FIG. 58(a), the terminal device 102 can generate a relatively rough map $β_{0,0}$ by superimposing the basic background data table $BBD_{0,0}$, the basic character/symbol data table $BCD_{0,0}$, and the highway network data table $MND_{0,0}$. It can also generate a more detailed map $β_{0,0}$ as shown in FIG. 58(b) by superimposing the detailed background data table $DBD_{0,0}$, the detailed character/symbol data table $DCD_{0,0}$, and the street network data table $SND_{0,0}$ on the rough map $β_{0,0}$ shown in FIG. 58(a).

The detailed structure of the unit data $UD_{0,0}$ has thus been explained. Like the unit data $UD_{0,0}$, other unit data $UD_{0,1} \ldots UD_{0, N-1}, \ldots UD_{1,0} \ldots UD_{M-1, N-1}$ also have the structure described referring to FIGS. 54 to 58 for their own areas.

As already stated, the unit records $UR_{0,0}$ to $UR_{M-1, N-1}$ include the unit headers $UH_{0,0}$ to $UH_{M-1, N-1}$. The unit headers $UH_{0,0}$ to $UH_{M-1, N-1}$ contain attribute information about the unit data $UD_{0,0}$ to $UD_{M-1, N-1}$. More specifically, for example, the unit header $UH_{0,0}$ contains a unit ID which identifies the unit data $UD_{0,0}$ and the sizes of the basic background data table $BBD_{0,0}$, detailed background data table $DBD_{0,0}$, basic character/symbol data table $BCD_{0,0}$, detailed character/symbol data table $DCD_{0,0}$, highway network data table $MND_{0,0}$ and street network data table $SND_{0,0}$. Like the unit header $UH_{0,0}$, other unit headers $UH_{0,1}$ to $UH_{M-1, N-1}$ also contain the attribute information about the corresponding unit data $UD_{0,1}$ to $UD_{M-1, N-1}$. Any information can be used as the unit IDs in the unit headers $UH_{0,0}$ to $UH_{M-1, N-1}$, as long as it can specify the corresponding unit data $UD_{0,0}$ to $UD_{M-1, N-1}$; typical examples include serial numbers, longitudes and latitudes, etc.

Figure 59:
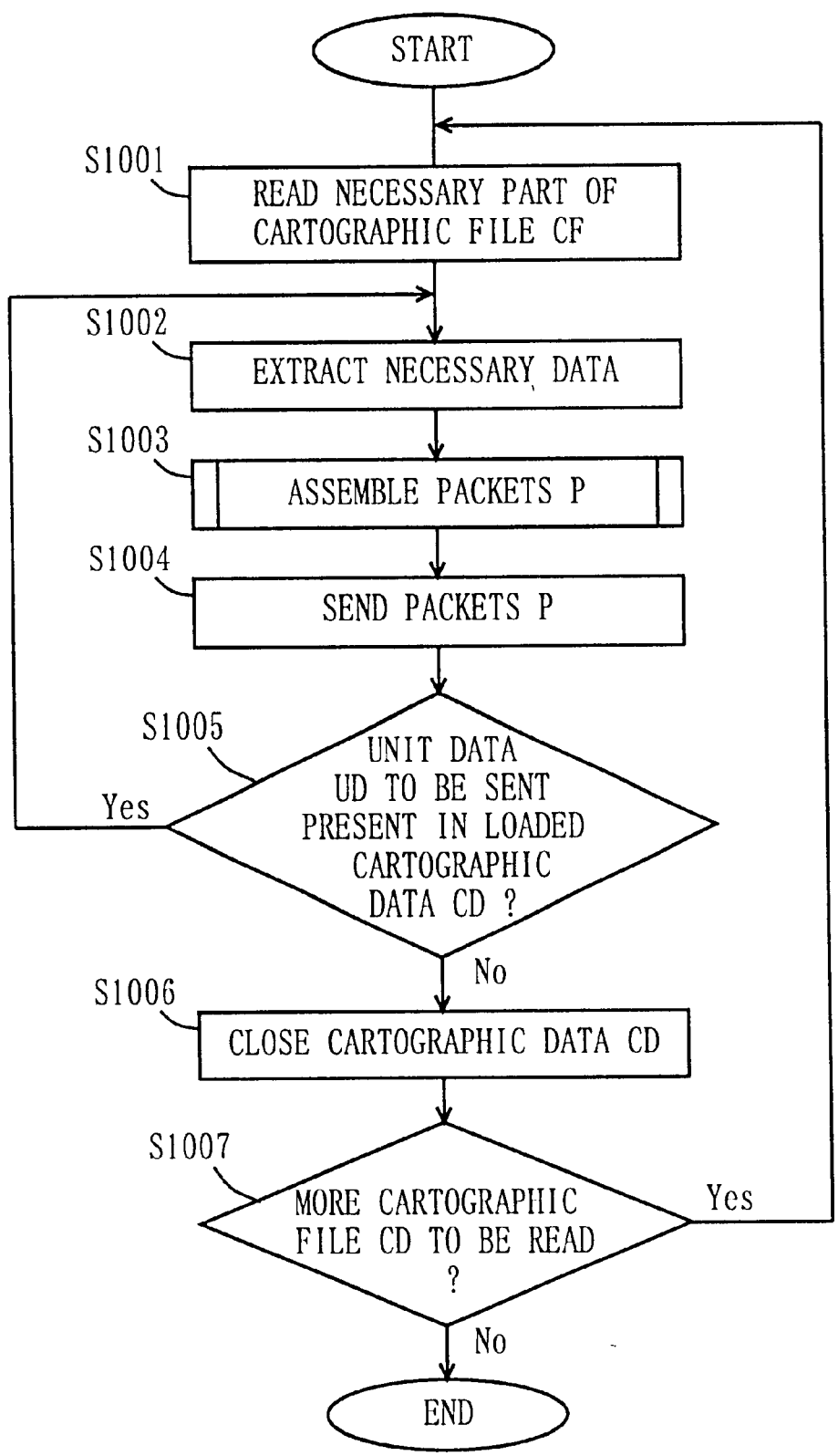
FIG. 59 is a flowchart showing a procedure performed by a center station 101 shown in FIG. 52.

Next, referring to the flowchart of FIG. 59, the procedure in which the center station 101 sends the cartographic data will be described. As already stated, the first storage device 1013 contains one or more cartographic files CF previously stored therein (see FIGS. 53 and 54). When required, the read control portion 1014 reads out part or the entirety of predetermined some cartographic files CF from the first storage device 1013 (step S1001). In this embodiment, part of a cartographic file CF means the file header FH, the unit management information $MI_{UNIT}$, and some unit records UR in the cartographic file CF. The entirety of a cartographic file CF means the file header FH, the unit management information $MI_{UNIT}$, and all unit records UR in the cartographic file CF. In the description below, part or the entirety of a cartographic file CF read by the read control portion 1014 is referred to as cartographic data CD. The read cartographic data CD is loaded in the storage region (typically a RAM) in the packet assembler 1015.

After the step S1001, the packet assembler 1015 extracts information required for transmission to the terminal device 102, i.e. the file header FH, the unit management information $MI_{UNIT}$ (see FIG. 53(b)) and one unit record UR (see FIG. 53(b)) from the cartographic data CD loaded in the internal storage region (step S1002).

The packet assembler 1015 assembles packets P on the basis of the unit record UR, file header FH and unit management information $MI_{UNIT}$ extracted in the step S1002 (step S1003). The step S1003 will be described in detail later. The assembled packets P are outputted to the transmitting portion 1016. The transmitting portion 1016 sends out the input packets P onto the wireless transmission path 103 through the antenna 1012 to transmit the packets P to the terminal device 102 (step S1004).

After the step S1004, the packet assembler 1015 checks whether there still remains any unit data UD to be transmitted in the cartographic data CD loaded in the internal storage region (step S1005). When unit data UD to be transmitted still exists, the packet assembler 1015 returns to the step S1002 to extract the necessary data. On the other hand, when no unit data UD to be transmitted exists, the packet assembler 1015 informs the read control portion 1014 of this information.

In response to the information from the packet assembler 1015, the read control portion 1014 closes the cartographic data CD read in the step S1001 (step S1006). Next, the read control portion 1014 checks whether there is cartographic data CD (a different piece from that closed in the step S1006) which contains unit data UD to be sent to the terminal device 102 (step S1007). When another piece of cartographic data CD is present, the read control portion 1014 returns to the step S1001 to read out the cartographic data CD. When no other cartographic data CD exists, the center station 101 ends the series of processes shown in the flowchart of FIG. 59.

Figure 60:
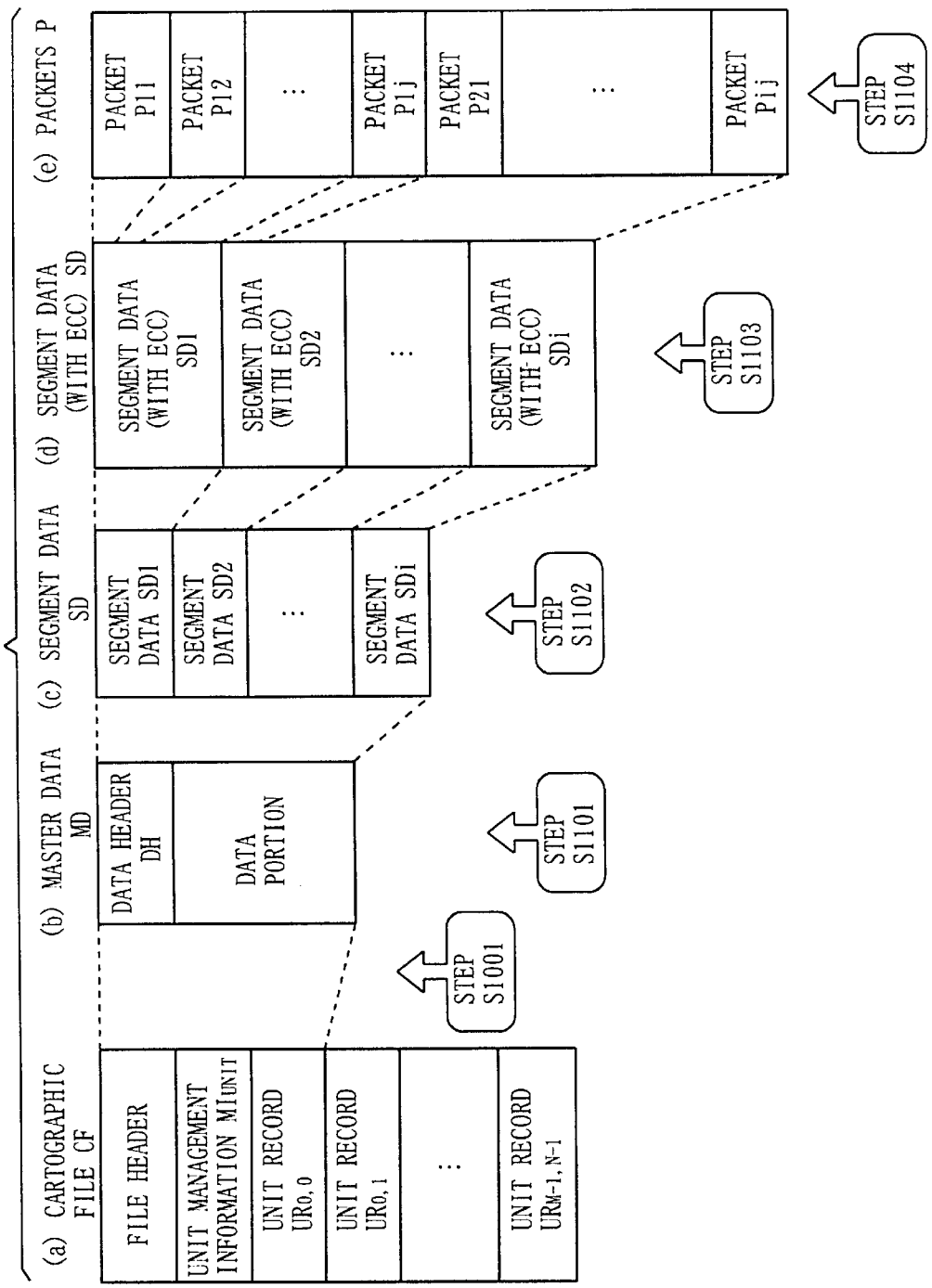
FIG. 60 is a diagram showing the structure of data generated during the process in which the center station 101 shown in FIG. 52 generates packets P from a cartographic file CF.

FIG. 60 shown the structure of data generated during the process in which the packets P are generated form the cartographic data CD.

Figure 61:
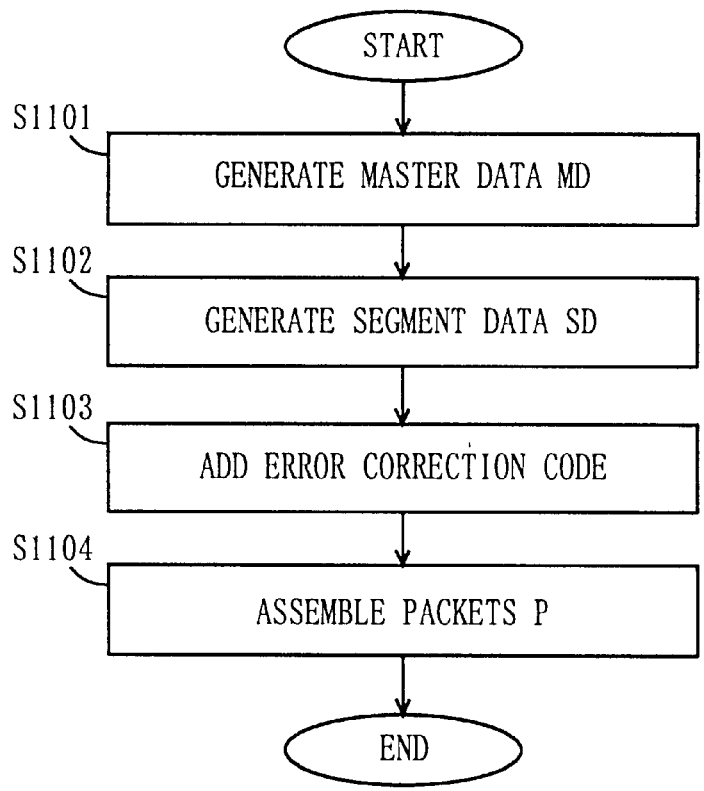
FIG. 61 is a flowchart showing the detailed procedure contained in the step S1003 shown in FIG. 59.

When the step S1001 ends (see FIG. 59), the read control portion 1014 contains the cartographic data CD as shown in FIG. 60(a). When the step S1002 ends, the packet assembler 1015 is holding the file header FH and some unit records UR. FIG. 60(a) shows an example in which the unit record $UR_{0,0}$ is being held. The packet assembler 1015 then carries out the step S1003. FIG. 61 is a flowchart showing the detailed procedure of the step S1003. Referring to FIG. 61, the operation of the packet assembler 1015 is now described in detail. First, master data MD is generated on the basis of the file header FH, unit management information $MI_{UNIT}$, and one unit record UR held in the packet assembler 1015 (step S1101). The master data MD is not generated directly from the cartographic file CF but is generated on the basis of the one unit record UR held in the packet assembler 1015. With this generating method, even if an error occurs because of an external or internal factor in the steps S1001 to S1007 of FIG. 59, the error affects only the one unit record UR. That is to say, this method prevents an error from affecting the entire cartographic data CD.

Figure 62:
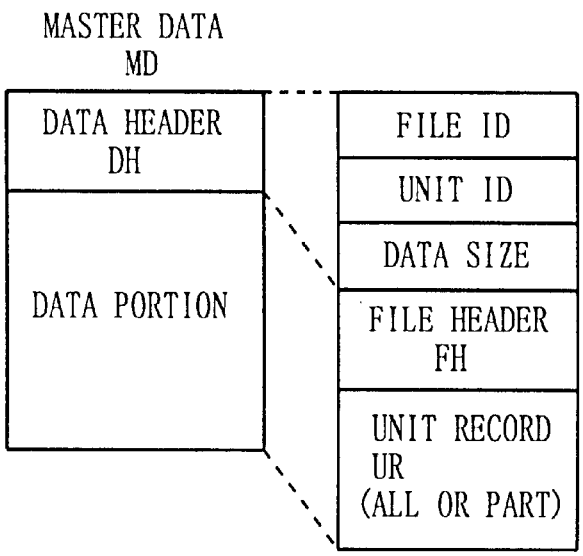
FIG. 62 is a diagram showing the detailed structure of master data MD shown in FIG. 60(b)

As shown in FIG. 60(b), the master data MD is composed of a data header DH and a data portion. FIG. 62 shows the detailed structure of the master data MD. In FIG. 62, the data header DH includes a file ID, a unit ID and a unit size.

The file ID is a code which specifies the cartographic data CD on which the master data MD is based (i.e. the one which is currently loaded in the packet assembler 1015). An example of a method for generating this file ID is explained. The packet assembler 1015 holds the file header FH. As already stated, the file header FH contains the information which specifies the area the cartographic file CF (map α) covers (see FIG. 53(b)). Therefore the file header FH can specify the cartographic file CF, too. The packet assembler 1015 generates the file ID by using this file header FH.

The unit ID is a code which specifies the unit record UR on which the master data MD is based (i.e. the one which was extracted in the step S1002). When the step S1002 ends, the packet assembler 1015 is holding a unit record UR to be sent (see FIG. 54). The packet assembler 1015 extracts the unit ID from the unit record UR being held. The extracted unit ID is set in the data header DH.

The two IDs and the unit size are used by the terminal device 102 as will be described later.

The file header FH and the entirety or part of the data of the unit record UR are set in the data portion of the master data MD. The file header FH and the unit record UR thus set are those held in the packet assembler 1015. Now, as stated above, the unit record UR contains various tables (see FIG. 54). These tables have structures which can be separated from each other. Therefore the data portion may be formed with only the basic data of the basic background data table BBD, the basic character/symbol data table BCD, and the highway network data table MND (i.e. data which represents a schematic map). The data portion may also be formed with only the detailed data of the detailed background data table DBD, the detailed character/symbol data table DCD, and the street network data table SND. Part of the unit record UR may be set in this way.

As shown in FIG. 54, the unit header UH contains the unit ID. This unit ID is contained in the data header DH (see FIG. 62). Therefore, when the unit ID is set in the data portion of the master data MD, two unit IDs are contained in the master data MD. Hence the unit ID does not necessarily have to be contained in the data portion.

The data size in the data header DH is the size of the data portion. It can be easily extracted since the sizes of the file header FH and the entire unit record UR are determined when the cartographic file CF is generated in the first storage device 1013. When part of the unit record UR is set in the data portion, the size of the partial unit record UR is obtained on the basis of the sizes set in the corresponding unit header UH.

The packet assembler 1015 divides the generated master data MD into i pieces. As shown in FIG. 60(*c*), the i pieces of segment data $SD_1$ to $SD_i$ are thus generated (step S1102). In this step S1102, the packet assembler 1015 does not consider the data header DH and the data portion (i.e. the unit record UR) contained in the master data MD. That is to say, part of the data header DH and part of the data portion may be mixed in a piece of segment data SD. Numbers are assigned to the i pieces of segment data SD (referred to as segment numbers hereinafter). The segment numbers are preferably serial numbers which do not overlap among the segment data pieces. This facilitates operation of the terminal device 102 as will be described later.

The packet assembler 1015 also attaches error correction code (or error detection code) to the i pieces of segment data $SD_1$ to $SD_i$ (step S1103). As shown in FIG. 60(*d*), the i pieces of segment data (with error correction code) $SD_1$ to $SD_i$ are thus generated. The packet assembler 1015 further divides each piece of the segment data (with error correction code) $SD_1$ to $SD_i$ into j pieces. Then j packets are generated for each piece of the segment data SD as shown in FIG. 60(*e*) (step S1104). As a result, the packet assembler 1015 has generated a total of i×j packets $P_{11}, P_{12} \ldots P_{1j} \ldots P_{ij}$ on the basis of one unit record UR extracted in the step S1002. The i×j packets $P_{11}, P_{12} \ldots P_{1j} \ldots P_{ij}$ are provided with numbers (referred to as packet numbers hereinafter). The packet numbers are preferably serial numbers which do not overlap among the packets. This facilitates operation of the terminal device 102 as will be described later. The packet numbers allow the terminal device 102 to easily check whether the separately transmitted i×j packets $P_{11}, P_{12} \ldots P_{1j} \ldots P_{ij}$ are all present. When the step S1104 ends, the packet assembler 1015 exits from the subroutine of FIG. 61 and returns to the process of FIG. 59. It then performs the step S1004. In the step S1004, the packets $P_{11}, P_{12} \ldots P_{1j} \ldots P_{ij}$ are sequentially sent from the transmitting portion 1016 onto the wireless transmission path 103 through the antenna 1012 to the terminal device 102.

Next, referring to the flowchart of FIG. 63, the procedure in which the terminal device 102 receives the cartographic data will be described. The packets $P_{11}, P_{12} \ldots P_{1j} \ldots P_{ij}$ sent from the center station are inputted to the antenna 1021 of the terminal device 102 through the wireless transmission path 103. The receiving portion 1022 sequentially receives the packets $P_{11}, P_{12} \ldots P_{1j} \ldots P_{ij}$ outputted from the antenna 1021 (step S1201). The receiving portion 1022 has a buffer memory not shown. The receiving portion 1022 sequentially stores the received packets $P_{11}, P_{12} \ldots P_{1j} \ldots P_{ij}$ into the buffer memory.

The packet disassembler 1024 periodically accesses the buffer memory in the receiving portion 1022 to check whether the i×j packets $P_{11}, P_{12} \ldots P_{1j} \ldots P_{ij}$ sent from the center station 101 have been all stored in the buffer memory (step S1202). The check in the step S1202 is made on the basis of the packet numbers attached to the packets $P_{11}, P_{12} \ldots P_{1j} \ldots$ Pij. More specifically, when the packet numbers are serial numbers, the packet disassembler 1024 checks whether the packet numbers are all present from 1 to (i×j).

If all packets P are not present in the step S1202, the packet disassembler 1024 performs the step S1201 again, instead of moving to the step S1203. As a result, the receiving portion 1022 eventually receives the lacking packets P.

On the other hand, when the step S1202 shows that all packets P are present, the packet disassembler 1024 moves to the step S1203. The packet disassembler 1024 disassembles the packets $P_{11}, P_{12} \ldots P_{1j} \ldots P_{ij}$ received in the step S1201 to restore the master data MD (step S1203). The restored master data MD is outputted to the file managing portion 1025. The file managing portion 1025 generates a cartographic file CF on the basis of the input master data MD. The generated cartographic file CF is stored into the second storage device 1026 (step S1204).

After the step S1204, the data processing portion 1023 checks whether there still remains any series of packets P to be received (step S1205). When packets P to be received still remain, it returns to the step S1201 to continuously receive the packets P. When there is no packet to be received, it ends the process of FIG. 63.

Figure 63:
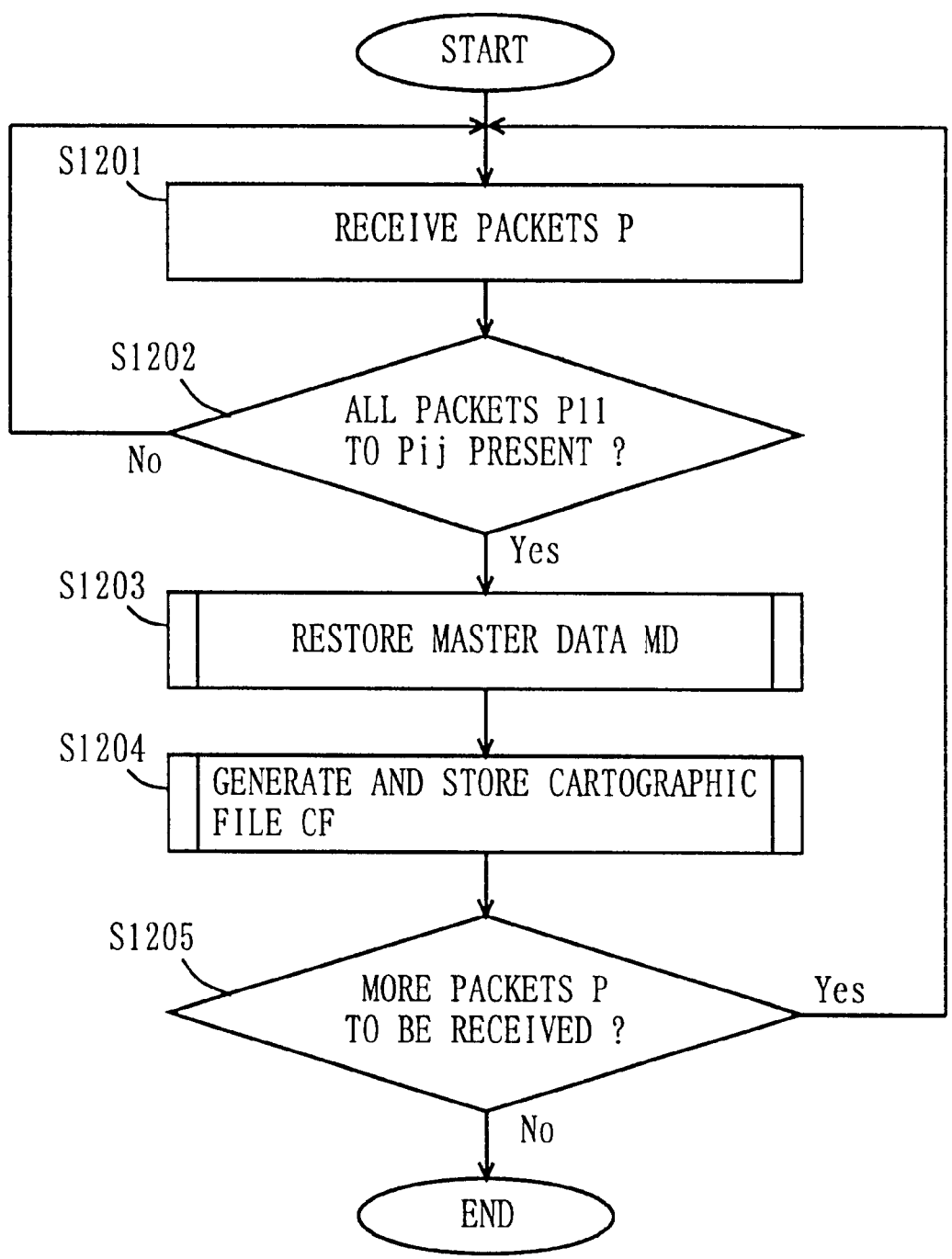
FIG. 63 is a flowchart showing a procedure performed by terminal device 102 shown in FIG. 52.
Figure 64:
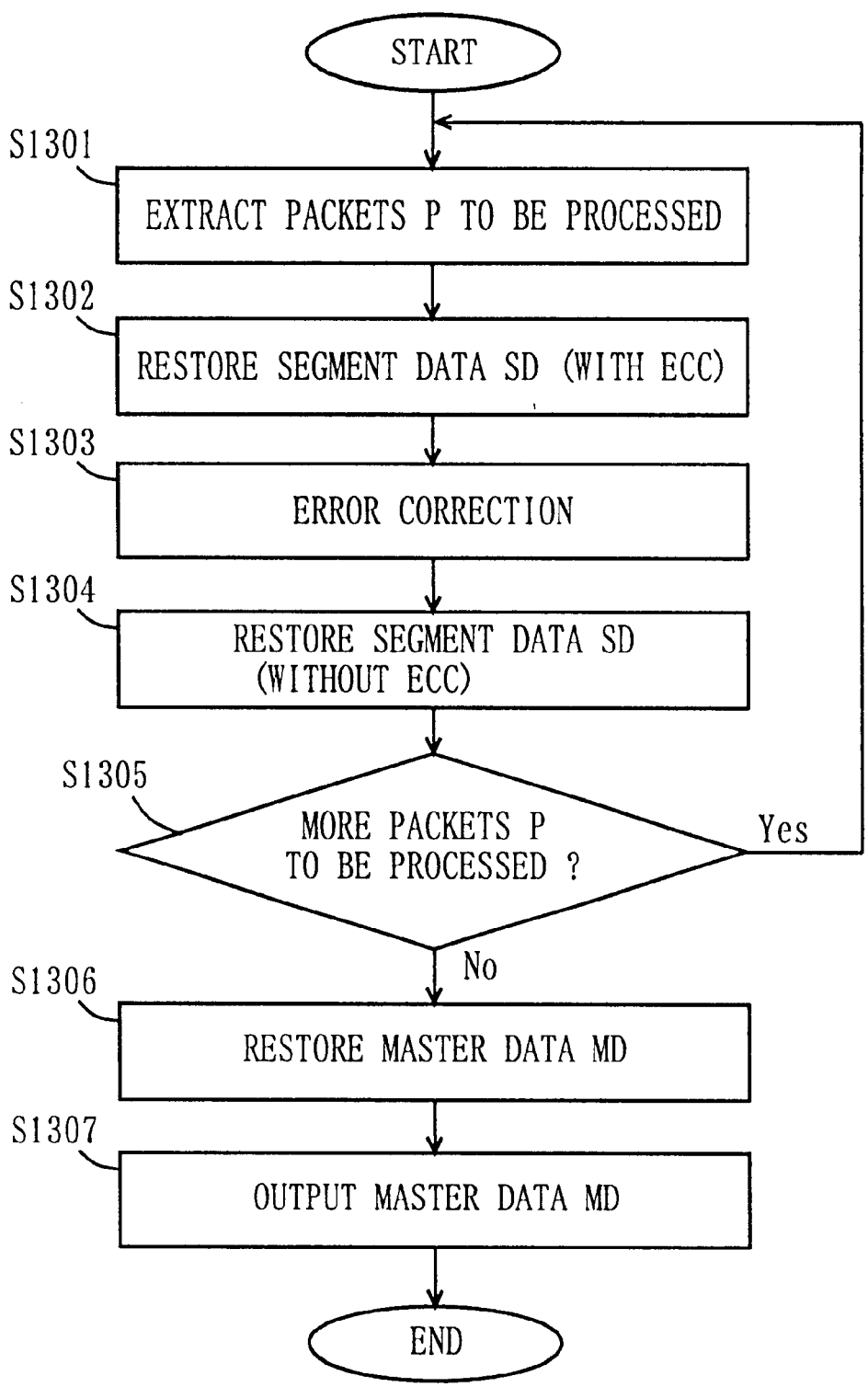
FIG. 64 is a flowchart showing the detailed procedure of the step S1203 of FIG. 63.
Figure 65:
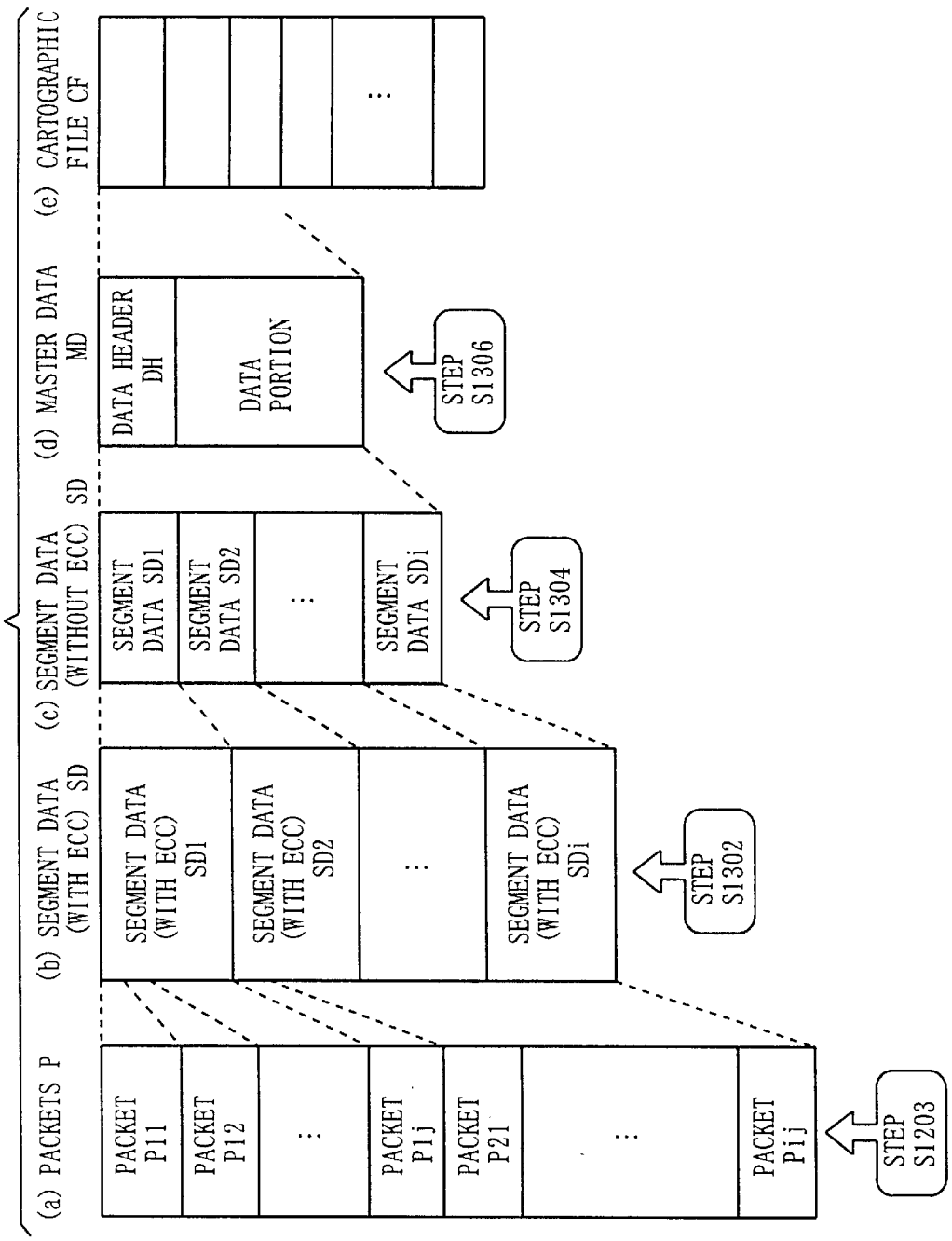
FIG. 65 is a diagram showing the structure of data generated during the process in which the terminal device 102 shown in FIG. 52 generates a cartographic file CF from the packets P.

FIG. 64 is a flowchart which shows the detailed procedure of the step S1203 of FIG. 63. FIG. 65 shows the structure of data formed during the process in which the cartographic file CF is generated from the packets $P_{11}, P_{12} \ldots P_{1j} \ldots$ Pij. As is clear from the explanation above, at the time when the step S1203 of FIG. 63 starts, the series of packets $P_{11}, P_{12} \ldots P_{1j} \ldots P_{ij}$ are all present as shown in FIG. 65(*a*) in the receiving portion 1022. The packet disassembler 1024 extracts packets P to be processed from among the packets $P_{11}, P_{12} \ldots P_{1j} \ldots P_{ij}$ held in the receiving portion 1022 (step S1301). It is now assumed that the packet disassembler 1024 extracts the packets $P_{11}, P_{12} \ldots P_{1j}$.

Next, the packet disassembler 1024 removes the packet number from each packet P extracted in the step S1301. The packet disassembler 1024 unites the packets P together, from which the numbers have been removed, to restore one piece of segment data SD as shown in FIG. 65(*b*) (step S1302). Under the assumption above, the packets $P_{11}, P_{12} \ldots P_{1j}$ are combined together to restore the segment data $SD_1$.

Each piece of segment data SD has the error correction code (or error detection code). After the step S1302, the packet disassembler 1024 corrects errors possibly present in the restored segment data SD (with error correction code) by utilizing the error correction code (step S1303).

Next, the packet disassembler 1024 removes the error correction code from the segment data SD (with error correction code) and thereby restores the segment data SD (without error correction code) as shown in FIG. 65(*c*) (step S1304). The restored segment data SD is held in the storage region in the packet disassembler 1024. Under the assumption above, the segment data $SD_1$ is error-corrected and then held in the storage region of the packet disassembler 1024.

After the step S1304, the packet disassembler 1024 checks whether packets P to be processed still remain in the receiving portion 1022 (step S1305). When there are packets P to be processed, the packet disassembler 1024 returns to the step S1301; it carries out the steps S1301 to S1304 to restore segment data SD from the packets P as shown in FIGS. 65(*a*) to (*c*). In this description, there are (i×j) packets P in the receiving portion 1022 at the beginning of the process of FIG. 64. Therefore the loop of the steps S1201 to S1205 is repeated i times. As a result the i pieces of segment data $SD_1$ to $SD_i$ are restored.

When this loop has been repeated a required number of times, no packets P to be processed are left in the receiving portion 1022. When the decision of the step S1305 is made in this condition, the packet disassembler 1024 moves to the step S1306. When all packets P have been processed, the i pieces of segment data $SD_1$ to $SD_i$ are being held in the packet disassembler 1024. As stated above, the segment data $SD_1$ to $SD_i$ each have a segment number. The packet disassembler 1024 arranges the segment data $SD_1$ to $SD_i$ according to the segment numbers, i.e. in the order of the serial segment numbers. Subsequently the segment numbers are removed from the segment data $SD_1$ to $SD_i$. The packet disassembler 1024 then unites together the segment data $SD_1$ to $SD_i$ from which the segment numbers have been removed. The master data MD is thus restored as shown in FIG. 65(d) (step S1306). The restored master data MD is outputted to the file managing portion 1025 (step S1307).

Now, not only this map providing system but any communication system may encounter communication troubles. Therefore the terminal device 102 cannot always correctly restore all pieces of segment data SD. Correctly restored segment data SD is segment data SD which is identical to that the center station 101 generated. For example, suppose that the segment data $SD_2$ was not correctly restored and other segment data $D_1$, $SD_3$ to $SD_i$ were correctly restored. In such a case, the packet disassembler 1024 can correct the segment data $SD_2$ by using the error correction code attached to the segment data $D_1$, $SD_3$ to $SD_i$.

Figure 66:
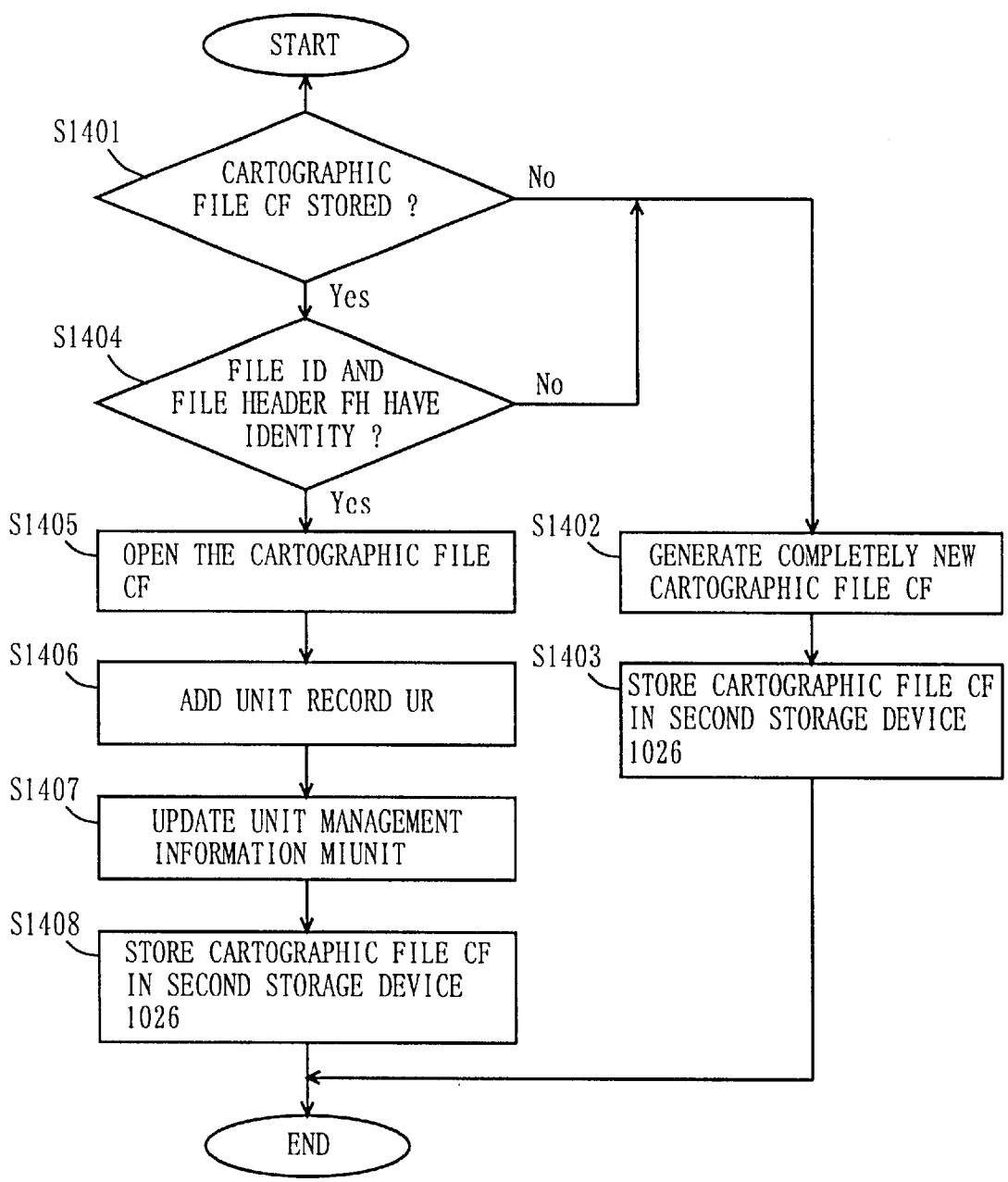
FIG. 66 is a flowchart showing the detailed procedure contained in the step S1204 shown in FIG. 63.

In response to input of the master data MD, the file managing portion 1025 starts the step S1204. As already stated, this step S1104 includes the process of generating a cartographic file CF from the master data MD and the process of storing the generated cartographic file CF in the second storage device 1026. FIG. 66 is a flowchart showing the detailed procedure of the step S1204 of FIG. 63.

By the way, at the beginning of the step S1204, the second storage device 1026 may already contain a cartographic file or cartographic files CF generated before. Or it may contain no cartographic file CF. After receiving the input master data MD, the file managing portion 1025 checks whether any cartographic file CF is present in the second storage device 1026 (step S1401). When any cartographic file CF is present, the file managing portion 1025 moves to the step S1404 which will be described later. When no cartographic file CF is present, the file managing portion 1025 generates a completely novel cartographic file CF on the basis of the present master data MD (step S1402). This cartographic file CF has the same data structure as the cartographic file CF (see FIGS. 53(b) and 54).

A method for generating the cartographic file CF is now described. As shown in FIG. 62, the master data MD contains, in the data header DH, the cartographic file ID, the unit ID and the data size. This master data MD further contains, in the data portion, the file header FH and the entirety or part of a unit record UR. The file managing portion 1025 extracts the file header FH from the master data MD.

As already stated, the master data MD contains only one unit record UR. The file managing portion 1025 generates a completely novel cartographic file CF in this time. Therefore the file managing portion 1025 generates the initial value "1" as the number of units, NOU. Further, on the basis of the data size of the file header FH and the number of units NOU, the file managing portion 1025 extracts the offset value $X_{0,0}$ to the unit record UR extracted this time. The unit management information $MI_{UNIT}$ is thus generated.

Figure 67:
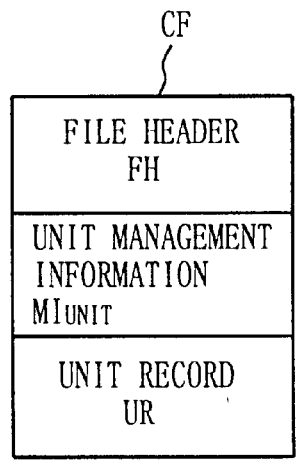
FIG. 67 is a diagram showing the structure of cartographic file CF shown in FIG. 52.

The file managing portion 1025 has thus extracted all information required to generate the completely novel cartographic file CF. The file managing portion 1025 unites together the file header FH, the unit management information $MI_{UNIT}$ and the unit record UR extracted this time, in order to generate a cartographic file CF. This cartographic file CF has the data structure shown in FIG. 67. The cartographic file CF thus generated is stored in the second storage device 1026 (step S1403).

Next, when a cartographic file or cartographic files CF are found in the step S1401, the process is performed as shown below. The step S1404 is carried out in this case. The file managing portion 1025 extracts the file ID from the master data MD provided as the present input. As already stated, the file ID specifies which cartographic file CF the unit record UR in the master data MD belonged to. As described referring to FIG. 61, this file ID was generated by the packet assembler 1015 by using the file header FH of the cartographic file CF.

The file managing portion 1025 also extracts the file header FH of each cartographic file CF in the second storage device 1026. The file header FH specifies the area the cartographic file CF covers. As explained about the step S1402, the file header FH of the cartographic file CF was generated on the basis of the cartographic file CF managed in the center station 101.

Therefore if the file ID and the file header FH have identity, it shows that the present unit record UR is part of the cartographic file CF. The file managing portion 1025 therefore checks them for identity (step S1404).

When the step S1404 shows absence of identity, it means that the cartographic file CF of which the input unit record UR is a constituent element has not been generated before. In this case, the file managing portion 1025 performs the above-described steps S1402 and S1403. That is to say, a completely novel cartographic file CF is generated and stored in the second storage device 1026.

On the other hand, if the step S1404 decides that the file ID and the file header FH have identity, it means that the cartographic file CF of which the input unit record UR is a constituent element has already been generated. In this case, the file managing portion 1025 selects this cartographic file CF as a target to be processed. The file managing portion 1025 opens this target cartographic file CF (step S1405) and adds the input unit record UR to the target cartographic file CF (step S1406). That is to say, in the step S1406, the input unit record UR and the cartographic file CF are combined together to generate an updated cartographic file CF.

The step S1406 is now described in greater detail. The file managing portion 1025 extracts the unit ID from the present master data MD. The unit ID extracted from the input master data MD is referred to as a first unit ID hereinafter. As explained referring to FIG. 62, the first unit ID specifies the unit record UR on which the present input master data MD is based. The file managing portion 1025 also extracts all unit IDs from the cartographic file CF opened in the step S1405. Each unit ID extracted from the cartographic file CF is referred to as a second unit ID hereinafter. The second unit IDs may or may not contain one which agrees with the first unit ID.

Figure 68:
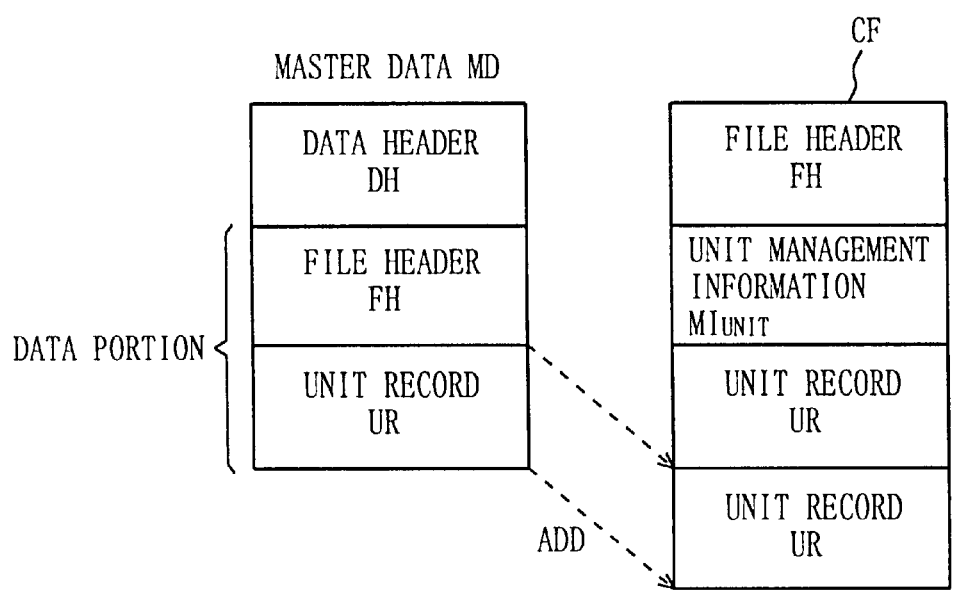
FIG. 68 is a diagram showing the process which the file management portion 1025 performs in the step S1406 of FIG. 66 when the first and second unit IDs do not agree.
Figure 71:
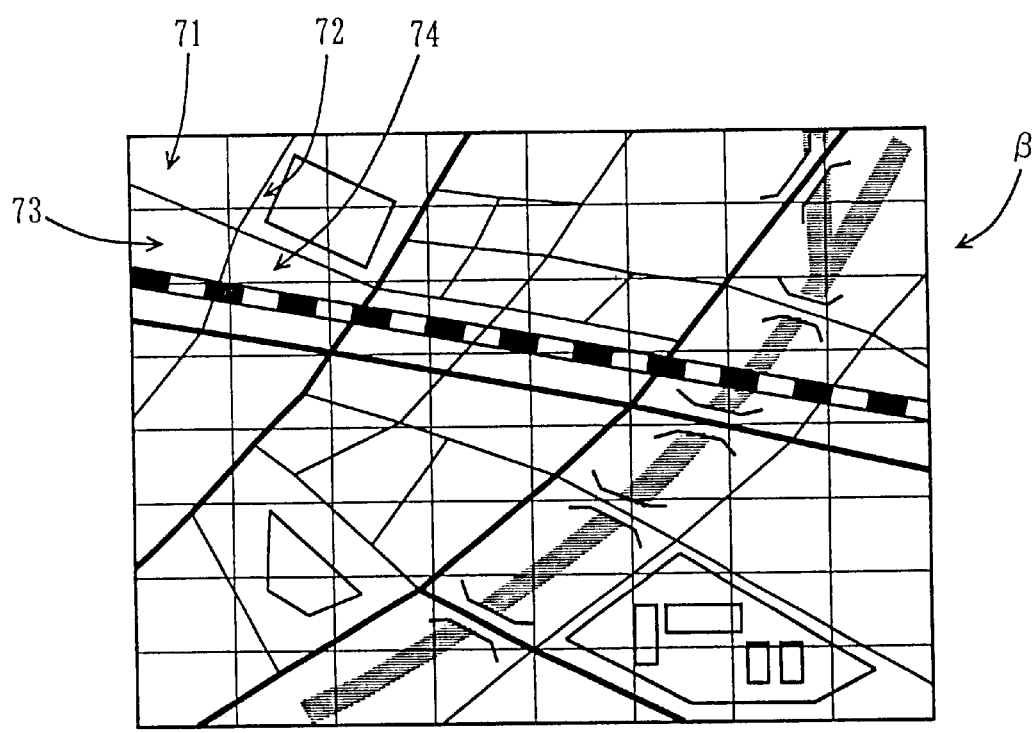
FIG. 71 is a diagram showing a map β which covers a certain area divided into 64 rectangular units.
Figure 72:
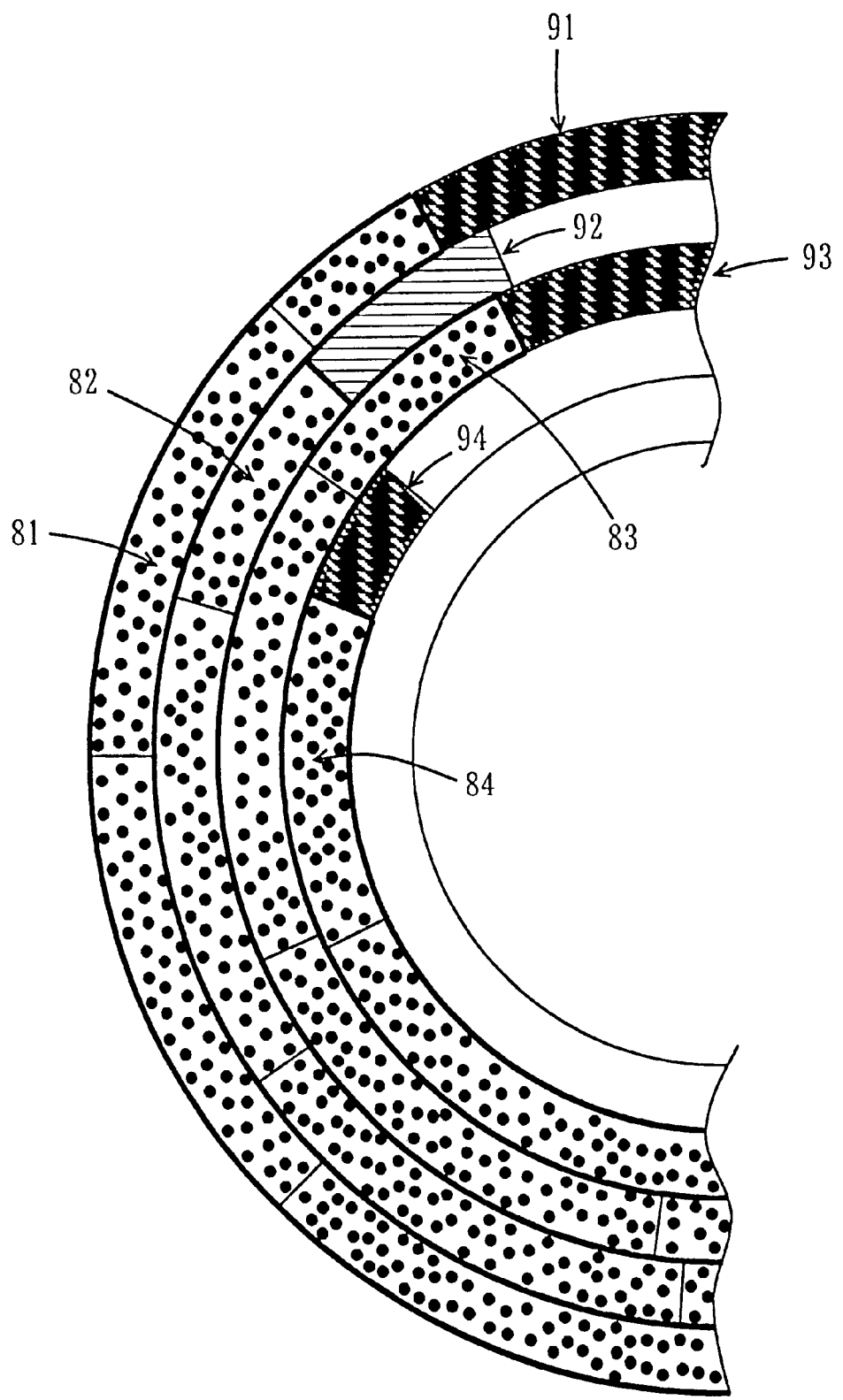
FIG. 72 is a diagram showing four clusters 91 to 94 having vacant areas in the storage device of the terminal device.
Figure 73:
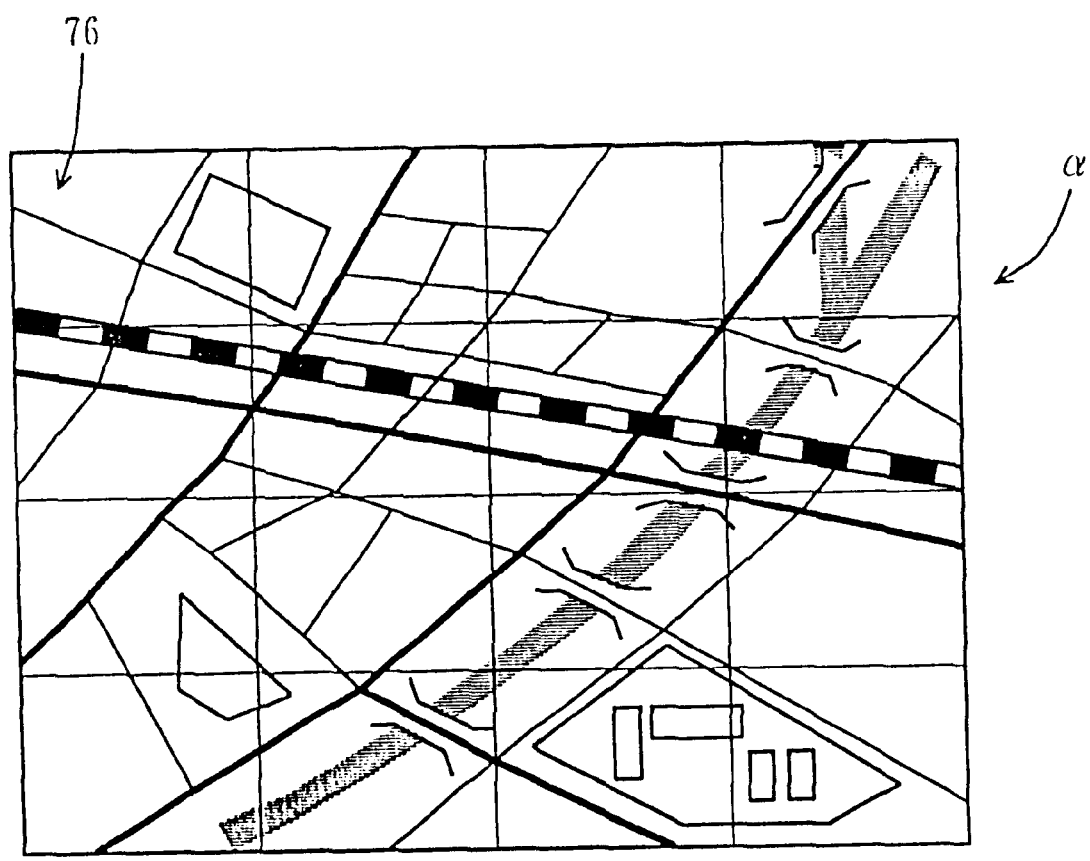
FIG. 73 is a diagram showing the map β covering a certain area divided into 16 rectangular units.
Figure 74:
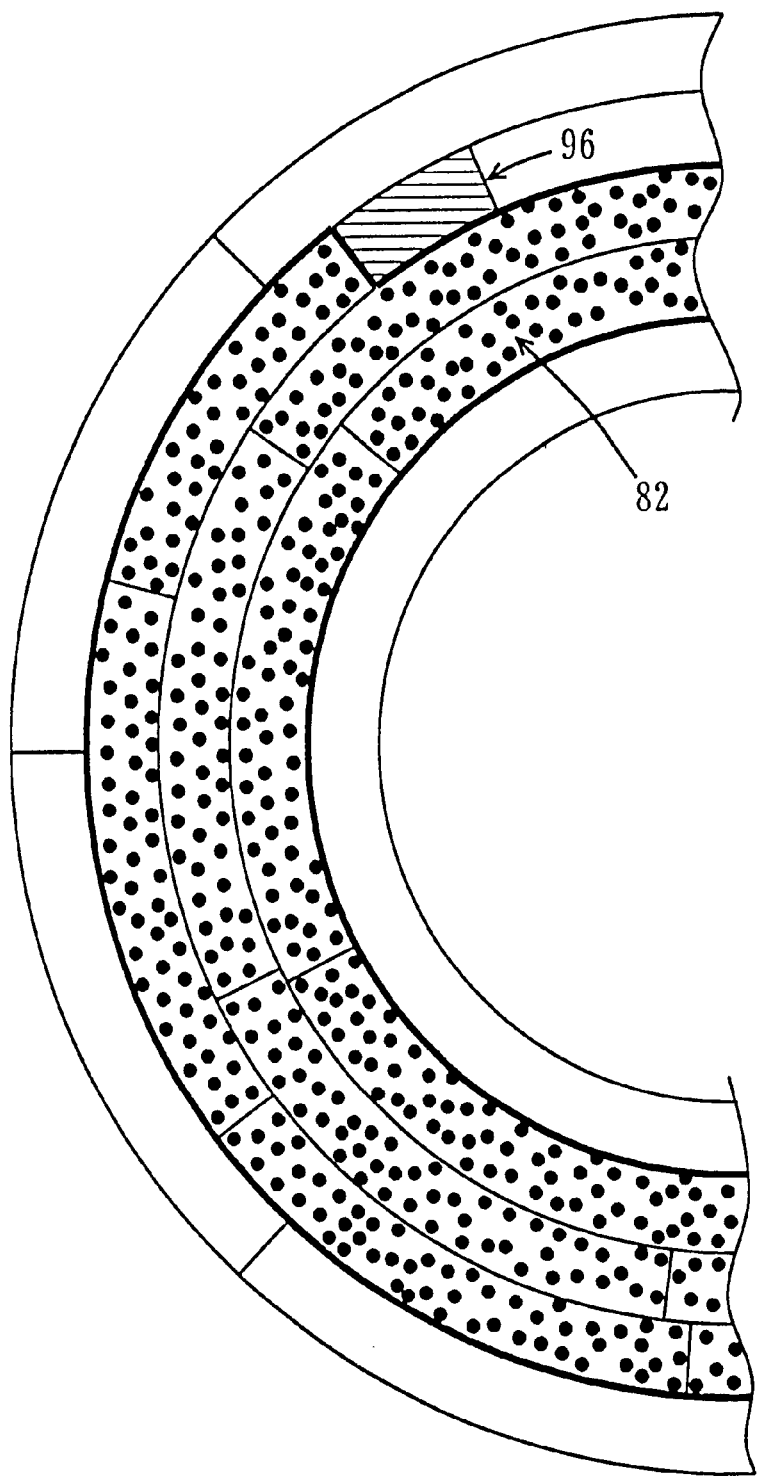
FIG. 74 is a diagram showing one cluster 96 having a vacant area in the storage device of the terminal device, which is used to explain that the efficiency of use of the wireless transmission path is deteriorated in such a case.

When the first unit ID does not agree with any of the second unit IDs, the file managing portion 1025 extracts the unit record UR from the present input master data MD and adds it to the currently opened cartographic file CF as shown in FIG. 68 to update the cartographic file CF.

When the first ID agree with one of the second unit IDs, it means that the present input unit record UR has been already provided to the terminal device 102 from the center station 101. For example, in the step S1204, the terminal device may already contain only the basic data (rough data)

formed of the basic background data table BBD, the basic character/symbol data table BCD, and the highway network data table MND etc. in the unit record UR having the structure shown in FIG. 54. In this case, the cartographic file CF currently opened has the structure as shown in FIG. 69. In this case, as shown in FIG. 70, the file managing portion 1025 adds the unit record UR extracted from the present input master data to the unit record UR having the same unit ID in the currently opened cartographic file CF. Thus the cartographic file CF is updated.

Further, the file managing portion 1025 updates the unit management information $MI_{UNIT}$ according to the data size of the current input master data MD (step S1407). Next, the file managing portion 1025 stores the updated cartographic file CF in the second storage device 1026 (step S1408).

In this way, according to this map providing system, the first storage device 1013 contains the cartographic file CF. The packet assembler 1015 receives from the read control portion 1014 only partial map to be sent to the terminal device 102 and generates a series of packets P representing the map. The series of packets P are transmitted on the wireless transmission path 103. What is transmitted on the wireless transmission path 103 is only the data which represents partial map. Therefore, in this map providing system, the amount of data sent on the wireless transmission path 103 is reduced even if the cartographic file CF itself is large in size. This prevents the wireless transmission path 103 from being congested.

The terminal device 102 thus sequentially receives data which represents the partial map. However, at first, the terminal device 102 separately files the partial cartographic data. However, when an existing cartographic file CF satisfies a given condition, the terminal device 102 adds the received partial cartographic data to that cartographic file CF and unites them together. Therefore, this map providing system can prevent generation of a large number of files in the terminal device 102. Hence vacant areas are less apt to form in the clusters in the second storage device 1026. As a result, this map providing system can effectively use the storage region in the second storage device 1026.

Further, as shown in FIG. 53, a cartographic file CF is formed with a map a about a predetermined area which is sectioned into a plurality of areas, i.e. units U. Dividing the map α into units allows the read control portion 1014 to easily read out required part of the map from the first storage device 1013. The formation of units also allows the center station 101 to easily send out an optimum amount of data onto the wireless transmission path 103 so that the traffic on the wireless transmission path 103 will not be congested.

When the center station 101 has transmitted a plurality of unit records UR, the terminal device 102 may fail to receive some unit records UR because of a communication error. In such a case, the terminal device 102 generates a cartographic file CF by using the successfully received unit records UR. The terminal device 102 can perform various operations on the basis of the generated cartographic file CF. That is to say, even if some of the unit records UR sent from the center station 101 are lacking, the lack does not affect other unit records received at the terminal device 102. Dividing the map into units provides this effect, too.

Furthermore, in the unit record UR, the basic cartographic data (rough data) and detailed cartographic data are described in a plurality of independent tables. Therefore the individual tables can be used independently even though they are stored in one unit record UR. That is to say, for example, when providing a map to the terminal device 102, the center station 101 can send basic data (rough data) alone or detailed data alone, or both in combination. This allows the center station 101 to provide a map according to the condition or purpose of the terminal device 102.

For example, when the terminal device 102 desires to quickly receive a wide-area map rather than a detailed map, the center station 101 can preferentially send basic data (rough data) only. Further, the center station 2 can send the detailed data after the terminal device 102 has completely received the basic data (rough data). This allows the terminal device 102 to use the basic data (rough data) and the detailed data in combination.

As already stated, mobile communication devices can be used as the transmitting portion 1016 and the receiving portion 1022. In this case, the bidirectional communication between the center station 101 and the terminal device 102 can be easily realized so that the terminal device 102 can inform the center station 101, in real time, of the desired type of the map (information showing whether it desires rough data or detailed data).

Alternatively, a broadcasting device for ground wave digital broadcast etc. and a device receiving the broadcast can be used as the transmitting portion 1016 and the receiving portion 1022. In this case, the center station 101 can control the times at which the basic data (rough data) and the detailed data are received and the map areas which can be received through these data by assigning different channels to the basic data (rough data) and the detailed data.

In the embodiment described above, the file header FH of the cartographic file CF in the first storage device 1013 is directly used as the file header FH of the cartographic file CF in the second storage device 1026. That is to say, the two cartographic files CF cover the same area. However, the center station 101 and the terminal device 102 usually have different processing capabilities. For example, the storage capacity of the second storage device 1026 is usually smaller than that of the first storage device 1013. Hence, the terminal device 102 may generate a cartographic file CF which covers a smaller area than the map area represented by the cartographic file CF. That is to say, the terminal device 102 may independently define the area the cartographic file CF covers.

The second embodiment has explained a car navigation system as an example of the terminal device 102. However, this embodiment can be applied also to devices in which a database of the cartographic files CF is generated in a personal computer and the personal computer displays map or performs route search. That is to say, the technical field of the invention is not limited to the mobile terminal devices but can be applied also to stationary terminal devices.

In a stationary terminal device, the communication network 103 is not necessarily a wireless transmission path but it can be wired.

INDUSTRIAL APPLICABILITY

The present invention relates to terminal devices, and the present invention is suitable for a terminal device which receives a cartographic file and stores it in a storage device in a system in which a server connected to the Internet, a broadcasting station, etc. sends cartographic files which contain digital data generated about individual units defined by dividing a map into a plurality of areas.

What is claimed is:

1. A terminal device for reading a cartographic file from a storage device in which cartographic files are stored as digital data generated about individual units defined by dividing a map into a plurality of areas, wherein:

each said unit containing a road network represented by nodes and links, each of the cartographic file comprises node records generated for respective nodes and link records generated for respective links;

the node records each containing information about a non-neighboring node representing an intersection on the road network or information about a neighboring node defining a connection of roads between its unit and another unit adjoining said unit; and the information about the neighboring node being coordinate information about the neighboring node;

said terminal device comprising:

an input device responsive to an operation by a user for generating information specifying a map area;

a data processing portion for specifying a record region where a necessary cartographic file is stored on the basis of the information generated by said input device; and a read control portion for reading the cartographic file from said storage device on the basis of the record region specified by said data processing portion;

wherein said data processing portion performs a given process by using the node records and the link records recorded in the cartographic file read by said read control portion; and wherein said data processing portion traces a connection from a road in one unit to a road in another neighboring unit on the basis of the coordinate information about the neighboring nodes of the one unit and the neighboring another unit.

2. The terminal device according to claim 1, wherein each link record contains attribute information which shows an attribute of the road represented by said link; and said data processing portion traces the connection from the road in the one unit to the road in the neighboring another unit also on the basis of the attribute information about the links connected to the neighboring nodes of the one unit and the neighboring another unit.

3. The terminal device according to claim 1, wherein the node records which contain the information about the neighboring nodes are successively recorded in each cartographic file.

4. The terminal device according to claim 3, wherein said data processing portion traces the connection from the road in the one unit to the road in the neighboring another unit by searching only the node records which contain the information about the neighboring nodes in the cartographic file representing the neighboring another unit.

5. The terminal device according to claim 1, wherein in each cartographic file, the node records which contain the information about neighboring nodes are successively recorded in an ascending or descending order of the coordinates of the neighboring nodes.

6. The terminal device according to claim 5, wherein said data processing portion traces the connection from the road in the one unit to the road in the neighboring another unit by searching only the node records which contain the information about the neighboring nodes in the cartographic file representing the neighboring another unit.

7. The terminal device according to claim 1, wherein in each cartographic file, the node records which contain the information about the neighboring nodes are successively recorded in an order in which the neighboring nodes follow one after another in one direction along the boundary of the unit.

8. The terminal device according to claim 7, wherein when said data processing portion traces the connection from the road in the one unit to the road in the neighboring another unit, said data processing portion searches, in the cartographic file representing the neighboring another unit, only the node records which contain the information about the neighboring nodes which are located on the boundary between the neighboring another unit and the one unit, in an order reverse to the order in which the node records of the one unit are recorded.

9. The terminal device according to claim 3, wherein the units are formed by dividing the map into polygonal areas, and in each cartographic file, the node records which contain the information about the neighboring nodes located on each side of the unit are successively recorded.

10. The terminal device according to claim 9, wherein said data processing portion traces the connection from the road in the one unit to the road in the neighboring another unit by searching, in the cartographic file representing the neighboring another unit, only the node records which contain the information about the neighboring nodes which are located on a given side of the neighboring unit, wherein the given side of the neighboring unit adjoins the side of the one unit to which the neighboring nodes belong.

11. The terminal device according to claim 9, wherein the node records which contain the information about the neighboring nodes located on each side of the unit are recorded in an ascending or descending order of the coordinate information about the neighboring nodes.

12. The terminal device according to claim 11, wherein when said data processing portion traces the connection from the road in the one unit to the road in the neighboring another unit, said data processing portion searches, in the cartographic file representing the neighboring another unit, only the node records which contain the information about the neighboring nodes located on a given side of the neighboring unit, in the order in which said node records are recorded; and wherein the given side of the neighboring unit adjoins the side of said one unit to which the neighboring nodes belong.

13. A terminal device for reading a cartographic file from a storage device in which cartographic files are stored as digital data generated for individual units formed by dividing a map into a plurality of areas, wherein each of the cartographic files stored in the storage device is provided with a file name uniquely corresponding to the map area represented by itself;

said terminal device comprising:

an input device responsive to an operation by a user for generating information specifying a map area;

a data processing portion for specifying a record region where a necessary cartographic file is recorded on the basis of the information generated by said input device; and a read control portion for reading the cartographic file from the storage device on the basis of the record region specified by said data processing portion.

14. The terminal device according to claim 13, wherein:

each unit contains a road network represented by nodes and links, and each cartographic file comprises node records generated for respective nodes and link records generated for respective links;

said data processing portion performs a process of searching for a route by using the node records and the link records recorded in the cartographic file which said read control portion has read this time; and when the route search ends in the area which the cartographic file read in this time represents, said data processing portion calculates a map area required for a further route search and specifies a record region where a cartographic file to be read next is stored on the basis of the calculated map area.

15. A terminal device for reading a cartographic file from a storage device in which cartographic files are stored as digital data generated for individual units formed by dividing a map into a plurality of areas, wherein:
 each of the unit contains a background which is divided into objects each capable of being drawn with one stroke, the plurality of objects being grouped so that ones having the same attribute are contained in the same group; and
 the cartographic file contains background records in which information about the objects is recorded for each group;
 said terminal device comprising:
  an input device responsive to an operation by a user for generating information specifying a map area;
  a data processing portion for specifying a record region where a necessary cartographic file is stored on the basis of the information generated by said input device;
  a read control portion for reading the cartographic file from the storage device on the basis of the record region specified by said data processing portion; and
  an output device;
  wherein said data processing portion causes said output device to display the background on the basis of the background records contained in the cartographic file read by said read control portion.

16. The terminal device according to claim 15, wherein each object comprises element points representing a shape;
 each background record contains coordinate values of the element points of each object, the coordinate values being arranged in the order in which the element points are traced in the one stroke; and
 the coordinate values of the element points are each represented by an absolute coordinate value based on an origin in the unit or by a relative coordinate value with respect to the coordinate value of another element point.

17. The terminal device according to claim 15, wherein, in each object, the element point which corresponds to a pen-down position is represented by the relative coordinate value when a given condition is satisfied.

18. The terminal device according to claim 17, wherein the given condition is satisfied when the distance between the pen-down position and the pen-up position immediately before is equal to or smaller than a given value.

19. The terminal device according to claim 17, wherein the given condition is satisfied when the relative coordinate value of the element point corresponding to the pen-down position can be represented in a predetermined or smaller number of bits.

20. The terminal device according to claim 15, wherein in each object, the element points are each represented by a direct coordinate value when a given condition is satisfied.

21. The terminal device according to claim 19, wherein the given condition is satisfied when the distance between an element point and the element point immediately before is equal to or larger than a given value.

22. The terminal device according to claim 19, wherein the given condition is satisfied when the coordinate value of the element point represented by the relative coordinate value exceeds a predetermined number of bits.

23. A recording medium in which cartographic files are recorded as digital data generated for individual units formed by dividing a map into a plurality of areas, the cartographic files having a predetermined data structure for reading by a computer device, said recording medium comprising:
 node records generated for respective nodes which form a road network in the unit in each cartographic file; and
 link records generated for respective links which form the road network in the unit in each said cartographic file;
 said node records each containing information about a non-neighboring node which represents an intersection on the road network, or coordinate information showing coordinates of a neighboring node which defines a connection of roads between a unit and a unit adjoining said unit;
 wherein said recording medium allows the computer device to:
 generating area information specifying a map area in response to an operation by a user;
 specify a record region where a required cartographic file is recorded on the basis of the generated area information;
 read the cartographic file on the basis of the specified record region; and
  while searching for a route by using the node records and the link records recorded in the read cartographic file, trace a connection from a road in one unit to a road in another neighboring unit on the basis of the coordinate information about the neighboring nodes of the one unit and the neighboring another unit.

24. The recording medium which contains the cartographic files according to claim 23, wherein:
 each of said link record contains attribute information which shows an attribute of the road represented by said link; and
 while searching for a route, the computer device traces the connection from the road in the one unit to the road in the neighboring another unit also on the basis of the attribute information about the links connected to the neighboring nodes of the one unit and the neighboring another unit.

25. The recording medium which contains the cartographic files according to claim 23, wherein said node records which contain the information about the neighboring nodes are successively recorded.

26. The recording medium which contains the cartographic files according to claim 23, wherein said node records which contain the information about the neighboring nodes are successively recorded in an ascending or descending order of the coordinates of the neighboring nodes.

27. The recording medium which contains the cartographic files according to claim 23, wherein said node records which contain the information about the neighboring nodes are successively recorded in an order in which the neighboring nodes follow one after another in one direction along the boundary of the unit.

28. A recording medium in which predetermined data is recorded for reading by a computer device, and in which cartographic files are recorded as digital data generated for individual units formed by dividing a map into a plurality of areas, having a structure, said recording medium comprising:

the cartographic files as digital data generated for the individual units formed by dividing the map into a plurality of areas; and management information for managing record regions where said cartographic files are recorded, where said cartographic files are provided with names represented in a tree structure;

wherein said recording medium allows the computer device to:

when area information specifying a map area is entered from outside, specify the name of a necessary cartographic file on the basis of the input area information; and reading the cartographic file from the record region uniquely corresponding to the name of the specified cartographic file by referring to said management information.

29. A recording medium in which cartographic files are recorded as digital data generated for individual units formed by dividing a map into a plurality of areas, said cartographic files having a predetermined data structure for reading by a computer device, wherein:

each of the unit containing backgrounds, each background being divided into objects each capable of being drawn with one stroke;

wherein said recording medium comprises:

information which show attributes of the backgrounds; and object records which contain information required to draw the objects;

wherein said information showing the attributes of the backgrounds and said object records of the objects are successively recorded so that the plurality of objects are grouped according to their respective attributes; and wherein said recording medium allows said computer device to draw a map on the basis of said attribute information about the backgrounds and said object records contained in the cartographic file.

30. The recording medium which contains the cartographic files according to claim 29, wherein each object comprises element points representing a shape of the object; and each of said object records contains coordinate values of the element points of its object, said coordinate values being arranged in an order in which the element points are traced in the one stroke; and wherein the coordinate values of said element points are each represented by an absolute coordinate value based on an origin in the unit or by a relative coordinate value with respect to the coordinate value of another element point.

31. The recording medium which contains the cartographic files according to claim 29, wherein in each object, the element point which corresponds to a pen-down position is represented by the relative coordinate value when a given condition is satisfied.

32. The terminal device according to claim 29, wherein in each object, the element points are each represented by a direct coordinate value when a given condition is satisfied.

33. A terminal device for reading a cartographic file from a storage device in which cartographic files are stored as digital data generated for individual units formed by dividing a plurality of maps on different scales each into a plurality of areas, wherein:

the plurality of cartographic files have a hierarchical structure based on the scales, each unit containing a road network represented by nodes and links, each cartographic file at least containing node records which are generated for respective nodes and contain coordinate information about nodes, and link records which are generated for respective links; and in each cartographic file, the node records are recorded in an ascending or descending order of the coordinate information about the nodes;

said terminal device comprising:

an input device for generating information specifying a map area;

a data processing portion for specifying a record region where a necessary cartographic file is recorded on the basis of the information generated by said input device; and a read control portion for reading the cartographic file from the storage device on the basis of the record region specified by said data processing portion;

wherein said data processing portion searches for a node in a unit at a higher level which corresponds to a node contained in a unit at a lower level on the basis of the coordinate information recorded in the cartographic file read by said read control portion.

34. The terminal device according to claim 33, wherein said data processing portion searches for the node in the unit at the higher level corresponding to the node contained in the unit at the lower level also on the basis of the order in which the node records are recorded.

35. A system in which a center station provides a cartographic file to a terminal device through a transmission path, said system comprising:

said center station which comprises:

a first storage device containing the cartographic file, the cartographic file representing a map of a predetermined area;

a read control portion for reading, as cartographic data, part or all of the cartographic file from said first storage device;

a packet assembler for assembling packets in a form appropriate for the transmission path by using the cartographic data read by said read control portion; and a transmitting portion for transmitting the packets assembled by said packet assembler to said terminal device through the transmission path;

said terminal device which comprises:

a receiving portion for receiving the packets transmitted by said transmitting portion through the transmission path;

a data processing portion for disassembling the packets received by said receiving portion and restoring the cartographic data; and a second storage device having an internal storage medium for storing a cartographic file;

wherein when a cartographic file related to the cartographic data restored this time is already stored in said second storage device, said data processing portion reads that cartographic file from said second storage device, and said data processing portion performs the process of adding the restored cartographic data to the second cartographic file thus read and stores the cartographic file in said second storage device.

36. The map providing system according to claim 35, wherein said data processing portion generates a plurality of cartographic files when necessary.

37. The map providing system according to claim 35, wherein the cartographic file comprises a plurality of units in which the map of predetermined area is sectioned into a plurality of areas and management information for managing each of the units, and wherein in said center station:

said read control portion reads the cartographic data, unit by unit, from the cartographic file stored in said first storage device; and said packet assembler assembles the packets by using the unit read by said read control portion, a file ID specifying the cartographic file, a unit ID specifying the unit, and data size of the unit.

38. The map providing system according to claim 37, wherein said data processing portion further extracts the file ID, the unit ID and the data size from the packets received at said receiving portion; and said data processing portion disassembles the packets received at said receiving portion and restores the cartographic data by using the extracted file ID, unit ID and data size.

39. The map providing system according to claim 35, wherein the cartographic file further comprises basic data schematically showing the predetermined area and detailed data showing the area in detail; and the basic data and the detailed data have data structures which can be separated from each other.

40. The map providing system according to claim 39, wherein:

the basic data further comprises basic background data representing background of the map, basic character/symbol data schematically representing a character and a symbol to be displayed in the map, and major road network data representing a major road network existing in the map;

the detailed data further comprises detailed background data representing details of the background of the map, detailed character/symbol data representing a detailed character and symbol to be displayed in the map, and minor road network data representing a minor road network existing in the map; and the detailed background data, the detailed character/symbol data and the minor road network data are formed as differential data of the basic background data, the basic character/symbol data and the major road network data, and the basic data and the detailed data are combined to represent a relatively detailed map.

41. The map providing system according to claim 39, wherein said read control portion further reads, as the cartographic data, only the basic data contained in the cartographic file stored in said first storage device.

42. The map providing system according to claim 41, wherein said read control portion further reads, as the cartographic data, only the detailed data contained in the cartographic file stored in said first storage device.

43. The map providing system according to claim 39, wherein said read control portion further reads, as the cartographic data, the basic data and the detailed data contained in the cartographic file stored in said first storage device.

44. The map providing system according to claim 41, wherein said data processing portion further disassembles the packets received by said receiving portion to restore the basic data.

45. The map providing system according to claim 44, wherein said read control portion in said center station further reads, as the cartographic data, only the detailed data contained in the cartographic file stored in said first storage device; and said data processing portion in said terminal device further disassembles the packets received by said receiving portion to restore the detailed data.

46. The map providing system according to claim 43, wherein said data processing portion further disassembles the packets received at said receiving portion to restore the basic data and the detailed data.

* * * * *

UNITED STATES PATENT AND TRADEMARK OFFICE
CERTIFICATE OF CORRECTION

PATENT NO. : 6,636,802 B1
DATED : October 21, 2003
INVENTOR(S) : Nobuyuki Nakano et al.

It is certified that error appears in the above-identified patent and that said Letters Patent is hereby corrected as shown below:

Title page,
Item [57], ABSTRACT,
Line 21, please replace "A terminal device for reading" with -- The present invention provides a terminal device for reading --.
Line 36, please replace "nodes of said one unit and said" with -- nodes of the one unit and the --.

Column 65,
Line 1, please replace "each said unit containing a road network" with -- each of the units contains a road network --.
Line 2, please replace "cartographic file" with -- cartographic files --.
Line 9, please replace "adjoining said unit;" with -- adjoining the unit --.
Line 20, please replace "from said storage" with -- from the storage --.
Line 33, please replace "by said link;" with -- by the link; --.

Column 66,
Line 21, please replace "neighboring unit," with -- neighboring unit; and --.
Line 37, please replace "which said node records" with -- which the node records --.
Line 45, please replace "areas, wherein" with -- areas, wherein: --.

Column 67,
Line 34, please replace "claim 15, wherein" with -- claim 15, wherein: --.

Column 68,
Line 20, please replace "adjoining said unit;" with -- adjoining the unit --.
Line 23, please replace "generating area information" with -- generate area information --.
Line 41, please replace "said link; and" with -- the link; and --.

UNITED STATES PATENT AND TRADEMARK OFFICE
CERTIFICATE OF CORRECTION

PATENT NO.   : 6,636,802 B1
DATED        : October 21, 2003
INVENTOR(S)  : Nobuyuki Nakano et al.

It is certified that error appears in the above-identified patent and that said Letters Patent is hereby corrected as shown below:

<u>Column 69,</u>
Line 14, please replace "reading the cartographic" with --read the cartographic --.
Line 23, please replace "each of the unit containing" with -- each of the units containing --.
Line 35, please replace "allows said computer" with -- allows the computer --.
Line 44, please replace "said coordinate values" with -- the coordinate values --.
Line 47, please replace "said element points" with -- the element points --.

Signed and Sealed this

Third Day of August, 2004

JON W. DUDAS
*Acting Director of the United States Patent and Trademark Office*